United States Patent
Mimura et al.

(10) Patent No.: US 11,077,862 B2
(45) Date of Patent: Aug. 3, 2021

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Yoshitaka Mimura, Wako (JP); Yoshihiro Oniwa, Wako (JP); Mineyuki Yoshida, Wako (JP); Yuko Ouchi, Wako (JP); Fue Kubota, Wako (JP); Toshiyuki Kaji, Wako (JP); Naotaka Kumakiri, Wako (JP); Hironori Takano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/992,303

(22) Filed: May 30, 2018

(65) Prior Publication Data
US 2018/0345988 A1    Dec. 6, 2018

(30) Foreign Application Priority Data

Jun. 2, 2017    (JP) .............................. JP2017-110192

(51) Int. Cl.
*B60W 50/12*    (2012.01)
*B60W 50/08*    (2020.01)
(Continued)

(52) U.S. Cl.
CPC ........ *B60W 50/082* (2013.01); *B60W 30/162* (2013.01); *B60W 50/12* (2013.01); *G05D 1/0088* (2013.01); *G05D 2201/0213* (2013.01)

(58) Field of Classification Search
None
See application file for complete search history.

(56) References Cited

U.S. PATENT DOCUMENTS

| 7,337,056 B2 * | 2/2008 | Arai ................... | B60K 31/0008 |
| | | | 180/170 |
| 2004/0195022 A1 * | 10/2004 | Inoue ................. | B60K 31/0008 |
| | | | 180/170 |

(Continued)

FOREIGN PATENT DOCUMENTS

| CN | 104024021 | 9/2014 |
| JP | 09-011859 | 1/1997 |

(Continued)

OTHER PUBLICATIONS

Japanese Office Action for Japanese Patent Application No. 2017-110192 dated Oct. 9, 2018.

(Continued)

*Primary Examiner* — Redhwan K Mawari
*Assistant Examiner* — Melanie J Patrick
(74) *Attorney, Agent, or Firm* — Amin, Turocy & Watson, LLP

(57) ABSTRACT

A vehicle control system includes a control unit configured to support a driving of a vehicle by selectively operating in one driving support mode among a plurality of driving support modes including a low speed following travel mode in which the vehicle travels while maintaining a constant inter-vehicle distance between a preceding traveling vehicle and the vehicle in a case where the speed is equal to or less than a predetermined speed, and an equipment control unit configured to release a use restriction on a specific function in which the line of sight of a driver is removed from the vehicle surroundings due to its utilization in a case where the control unit operates the low speed following travel mode is executed.

11 Claims, 35 Drawing Sheets

(51) Int. Cl.
*G05D 1/00* (2006.01)
*B60W 30/16* (2020.01)

(56) References Cited

U.S. PATENT DOCUMENTS

| | | | |
|---|---|---|---|
| 2005/0216169 | A1 | 9/2005 | Arai |
| 2016/0209840 | A1* | 7/2016 | Kim ................... G05D 1/0061 |
| 2016/0260415 | A1* | 9/2016 | Hatakeyama ............ G09G 5/00 |
| 2016/0280234 | A1* | 9/2016 | Reilhac ............... B60W 50/082 |
| 2016/0303972 | A1* | 10/2016 | Kuhne ................. B60W 30/12 |
| 2017/0015331 | A1* | 1/2017 | Laur ..................... B60W 50/14 |
| 2017/0158237 | A1* | 6/2017 | Sakamoto ............ G05D 1/0291 |
| 2017/0248954 | A1* | 8/2017 | Tomatsu ............... B60W 40/08 |
| 2018/0017969 | A1* | 1/2018 | Nagy .................. B60W 30/182 |
| 2018/0326992 | A1* | 11/2018 | Aoi ...................... B60W 50/14 |
| 2019/0025823 | A1* | 1/2019 | Christiansen ........ B62D 15/029 |

FOREIGN PATENT DOCUMENTS

| | | |
|---|---|---|
| JP | 11-165562 | 6/1999 |
| JP | 2001-157124 | 6/2001 |
| JP | 2004-032589 | 1/2004 |
| JP | 2006-111170 | 4/2006 |
| JP | 2008-173996 | 7/2008 |
| JP | 2009-113602 | 5/2009 |
| JP | 2010-036871 | 2/2010 |
| JP | 2011-016385 | 1/2011 |
| JP | 2014-223887 | 12/2014 |
| JP | 2015-217798 | 12/2015 |

OTHER PUBLICATIONS

Chinese Office Action for Chinese Patent Application No. 201810535910.8 dated Dec. 3, 2020.

* cited by examiner

FIG. 28
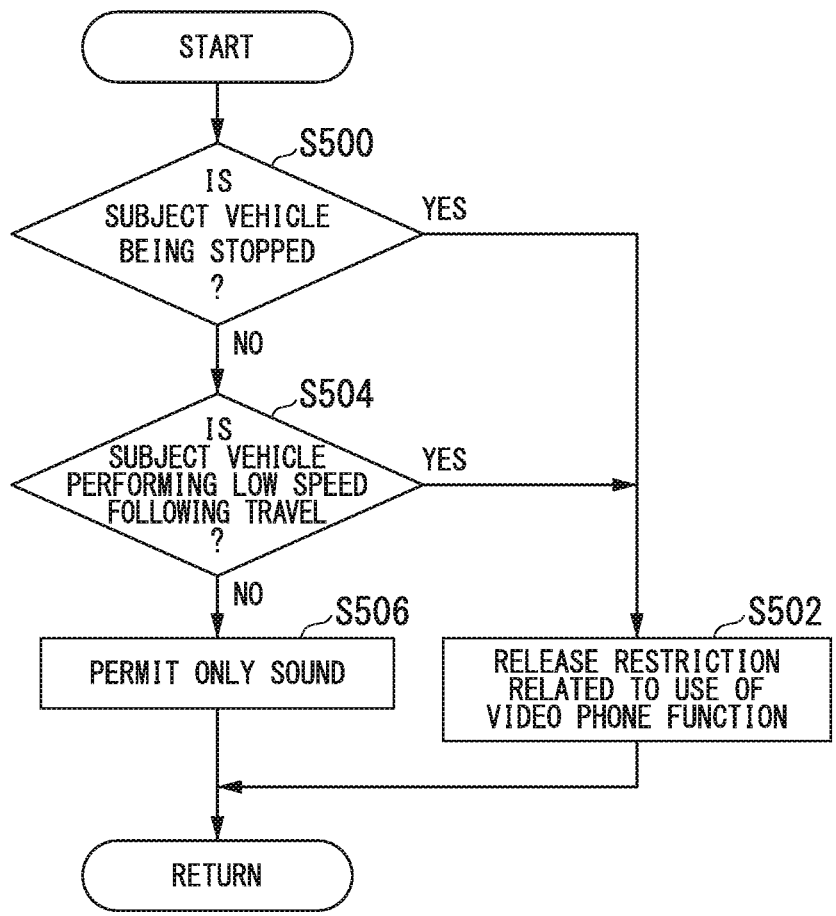
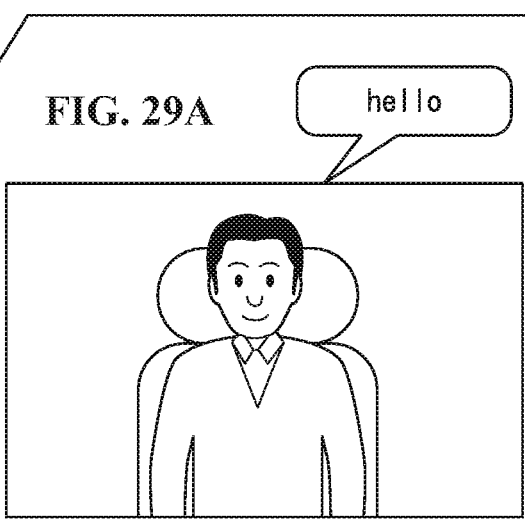
FIG. 29A
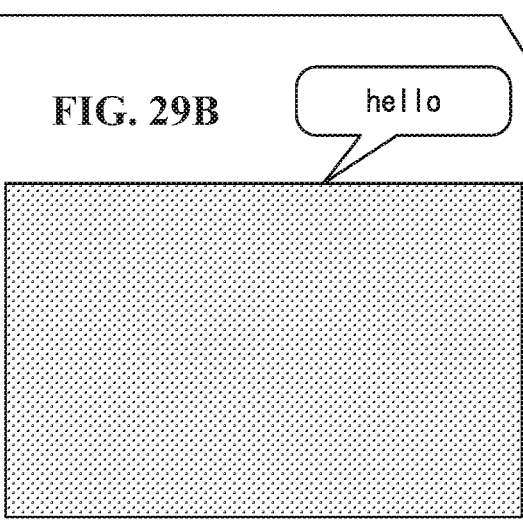
FIG. 29B

VEHICLE CONTROL SYSTEM, VEHICLE CONTROL METHOD, AND STORAGE MEDIUM

CROSS-REFERENCE TO RELATED APPLICATION

Priority is claimed on Japanese Patent Application No. 2017-110192, filed Jun. 2, 2017, the content of which is incorporated herein by reference.

BACKGROUND

Field of the Invention

The present invention relates to a vehicle control system, a vehicle control method, and a storage medium.

Description of Related Art

In recent years, research on a technique (hereinafter, automatic driving) for automatically controlling at least one of acceleration/deceleration and steering of a vehicle so that the vehicle travels to a destination along a route has progressed. In relation to this, a vehicle AV device including an operation restriction control means for restricting an operation of a predetermined function among AV functions at the time of manual driving, and automatic driving determination means for determining whether or not the vehicle is in an automatic driving travel state are provided, and control means for enabling the operation of an AV function in a state in which a restriction on the operation of a predetermined function is released in a case where the automatic driving determination means determines that the vehicle is in an automatic driving travel state has been disclosed (for example, Japanese Unexamined Patent Application, First Publication No. 2011-16385).

SUMMARY

However, in the device of the prior art, since the restriction on a predetermined function is released simply due to the vehicle undergoing automatic driving in some cases, there are cases where the awareness of the surroundings monitored by an occupant is reduced.

Aspects of the present invention are in consideration of the circumstances described above, and an object of one aspect of the present invention is to provide a vehicle control system, a vehicle control method, and a storage medium in which functions of equipment can be controlled more appropriately.

A vehicle control system, a vehicle control method, and a storage medium according to the present invention adopt the following constitution.

(1) A vehicle control system according to an aspect of the present invention includes a controller configured to support driving of a vehicle by selectively operating in one driving support mode among a plurality of driving support modes including a low speed following travel mode in which the vehicle travels while maintaining a constant inter-vehicle distance between a preceding traveling vehicle that is present in front of the vehicle and the vehicle in a case where the speed of the vehicle is equal to or less than a predetermined speed, and an equipment controller configured to release a use restriction on a specific function in which the line of sight of a driver is removed from the vehicle surroundings due to its utilization by an occupant of the vehicle in a case where the controller operates in the low speed following travel mode.

(2) In the vehicle control system of the aspect of (1), the specific function is a video phone function.

(3) In the vehicle control system of the aspect of (2), a display unit and a speaker are further included, and in a case where the controller stops operating in the low speed following travel mode in a state in which the controller is operating in the low speed following travel mode, the equipment controller stops a display of an image of a call counterpart of the video phone function on the display unit and continues outputting speech of a call counterpart with the speaker in a case where the video phone function is used as the specific function.

(4) In the vehicle control system of the aspect of (3), after stopping display of the image of the call counterpart on the display unit, in a case where the driving support mode is switched from a state in which operation is not in the low speed following travel mode to the state in which operation is in the low speed following travel mode, the equipment controller displays the image of the call counterpart of which the display was stopped on the display unit again.

(5) In the vehicle control system of the aspect of (2), an imaging unit configured to image the occupant is further included, and an image captured by the imaging unit is used in the video phone and in monitoring a state of the occupant by an occupant state monitoring controller that monitors the state of the occupant.

(6) A vehicle control method according to an aspect of the present invention causes an in-vehicle computer to support a driving of a vehicle by selectively operating in one driving support mode among a plurality of driving support modes including a low speed following travel mode in which the vehicle travels while maintaining a constant inter-vehicle distance between a preceding traveling vehicle that is present in front of the vehicle and the vehicle in a case where the speed of the vehicle is equal to or less than a predetermined speed, and release a use restriction on a specific function in which the line of sight of a driver is removed from the vehicle surroundings due to its utilization by an occupant of the vehicle in a case where the controller operates the low speed following travel mode.

(7) A storage medium according to an aspect of the present invention stores a program that causes an in-vehicle computer to support a driving of a vehicle by selectively operating in one driving support mode among a plurality of driving support modes including a low speed following travel mode in which the vehicle travels while maintaining a constant inter-vehicle distance between a preceding traveling vehicle that is present in front of the vehicle and the vehicle in a case where the speed of the vehicle is equal to or less than a predetermined speed, and release a use restriction on a specific function in which the line of sight of a driver is removed from the vehicle surroundings due to its utilization by an occupant of the vehicle in a case where the controller operates the low speed following travel mode.

According to the above-described aspects of (1) to (3), (6), or (7), it is possible to more appropriately control a function of equipment.

According to the above-described aspect of (4), in a case where the driving support mode is switched from the state in which the low speed following travel mode is not executed to the state in which the low speed following travel mode is executed, in order to display the image of the call counterpart of which the display is stopped on the display unit again, convenience for the occupant is improved.

According to the above-described aspect of (5), since the image captured by the imaging unit is used in the video phone and in monitoring the state of the occupant by the occupant state monitoring unit that monitors the state of the occupant, it is possible to reduce costs.

BRIEF DESCRIPTION OF THE DRAWINGS

FIG. 28 is a flowchart illustrating a flow of an execution process of a specific function by the HMI control unit.

FIGS. 29A and 29B are diagrams illustrating an example of a manner in which an image displayed on the third display unit is changed according to the degree of the driving.

DETAILED DESCRIPTION OF THE INVENTION

Hereinafter, embodiments of a vehicle control system, a vehicle control method, and a storage medium of the present invention will be described with reference to the drawings. The embodiment is applied to an automatic driving vehicle in which a vehicle control system may perform automatic driving (autonomous driving). In principle, automatic driving is a control aspect in which the vehicle travels in a state in which an operation by an occupant is not requested. It is considered that automatic driving is a type of driving support. The automatic driving vehicle may also be driven by manual driving. In the following description, although the "occupant" is described as an occupant sitting on a seat of a driver, that is, a seat where a driving operation member is provided as an example and an occupant may be sitting on another seat such as a passenger seat.

In the present embodiment, for example, a degree of a driving support includes a first degree, a second degree, and a third degree. For example, the first degree is when the driving support is executed by an operation of a driving support device such as an adaptive cruise control system (ACC) or a lane keeping assistance system (LKAS). The second degree is when a degree of control is higher than that in the first degree in a state in which the occupant is obligated to monitor surroundings to some degree, the occupant does not perform an operation on a driving operation element of the vehicle, and the automatic driving is executed by automatically controlling at least one of acceleration/deceleration and steering of the vehicle. The third degree is when the degree of control is higher than that in the second degree and the occupant is not obligated to monitor surroundings (or the occupant is in charge of the surroundings monitoring obligation to a lesser degree than in the second degree). In the present embodiment, the driving support of the second degree and the third degree corresponds to the automatic driving.

[Overall Constitution]

Figure 1:
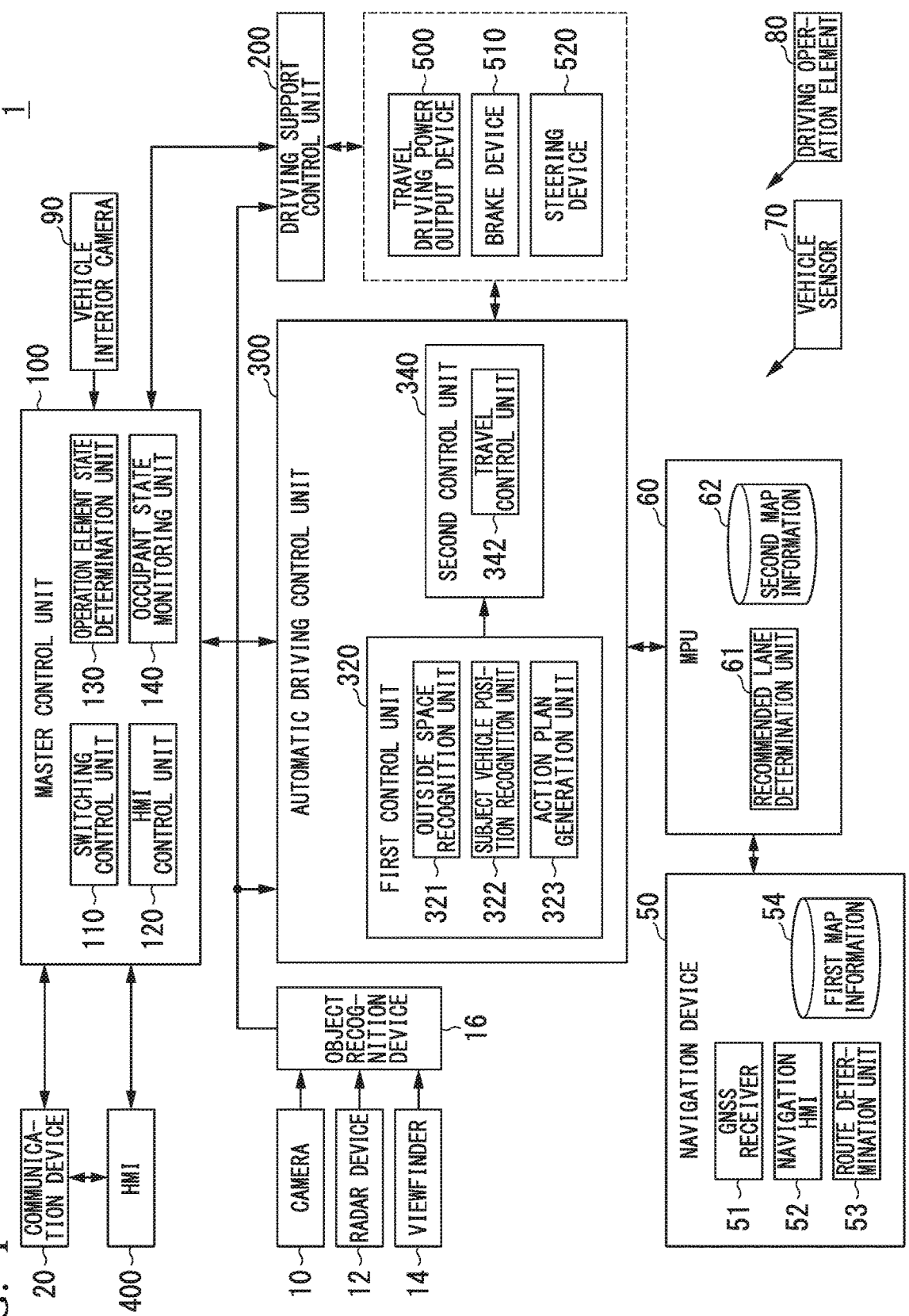
FIG. 1 is a constitution diagram of a vehicle system including a vehicle control system according to an embodiment.

FIG. 1 is a constitution diagram of a vehicle system 1 including a vehicle control system according to an embodiment. For example, a vehicle on which the vehicle system 1 is mounted (hereinafter referred to as a subject vehicle M) is, for example, a two-wheeled vehicle, a three-wheeled vehicle, or a four-wheeled vehicle. A driving source of the vehicle is an internal combustion engine such as a diesel engine or a gasoline engine, an electric motor, or a combination thereof. The electric motor is operated using electric power from an electric power generator connected to the internal combustion engine or discharge electric power of a secondary battery or a fuel cell.

For example, the vehicle system 1 includes a camera 10, a radar device 12, a viewfinder 14, an object recognition device 16, a communication device 20, a navigation device 50, a map positioning unit (MPU) 60, a vehicle sensor 70, a driving operation element 80, a vehicle interior camera 90, a master control unit 100, a driving support control unit 200, an automatic driving control unit (controller) 300, a human machine interface (HMI) 400, a travel driving force output device 500, a brake device 510, and a steering device 520. Such devices and pieces of equipment are connected to each other by a multiple communication line such as a controller area network (CAN) communication line, a serial communication line, a wireless communication network, or the like. The constitution shown in FIG. 1 is merely an example, and part of the constitution may be omitted, and other constituents may be added.

In the embodiment, for example, the "vehicle control system" includes the master control unit 100, the driving support control unit 200, the automatic driving control unit 300, and the HMI 400 among a plurality of elements included in the vehicle system 1. The master control unit 100, the driving support control unit 200, and the automatic driving control unit 300 are examples of a "control unit". An HMI control unit 120 is an example of an "equipment control unit".

For example, the camera 10 is a digital camera using a solid imaging element such as a charge coupled device (CCD) or a complementary metal oxide semiconductor (CMOS). One or a plurality of cameras 10 are attached to arbitrary positions on the subject vehicle M on which the vehicle system 1 is mounted. In a case of imaging in front, the camera 10 is attached to an upper portion of a front windshield, a rear surface of an interior mirror, or the like. In a case of imaging behind, the camera 10 is attached to an upper portion of a rear windshield, a back door, or the like. In a case of imaging a side, the camera 10 is attached to a door mirror or the like. For example, the camera 10 periodically repeats imaging the surroundings of the subject vehicle M. The camera 10 may be a stereo camera.

The radar device 12 radiates radio waves such as millimeter waves or the like to the surroundings of the subject vehicle M and detects at least the position (distance and direction) of an object by detecting radio waves (reflected waves) reflected by the object. One or a plurality of radar devices 12 are attached to an arbitrary position of the subject vehicle M. The radar device 12 may detect the position and the speed of the object by a frequency modulated continuous wave (FMCW) method.

The viewfinder 14 uses light detection and ranging or laser imaging detection and ranging (LIDAR) to measure scattered light with respect to the irradiation light and detect the distance to a target. One or a plurality of viewfinders 14 are attached to an arbitrary position of the subject vehicle M.

The object recognition device 16 performs a sensor fusion process on detection results from some or all of the camera 10, the radar device 12, and the viewfinder 14 such that the position, a type, a speed, and the like of the object are able to be recognized. The object recognition device 16 outputs a recognition result to the driving support control unit 200 and the automatic driving control unit 300.

For example, the communication device 20 communicates with another vehicle that is present in the surroundings of the subject vehicle M using a cellular network, a Wi-Fi network, Bluetooth (registered trademark), a dedicated short range communication (DSRC), or the like, or communicates with various server devices through a wireless base station. The communication device 20 communicates with a terminal possessed by a person outside the vehicle.

For example, the navigation device 50 includes a global navigation satellite system (GNSS) receiver 51, a navigation HMI 52, and a route determination unit 53, and stores first map information 54 in a storage device such as a hard disk drive (HDD) or a flash memory. The GNSS receiver 51 identifies the position of the subject vehicle M on the basis of a signal received from GNSS satellites. The position of the subject vehicle M may be specified or supplemented by an inertial navigation system using an output of the vehicle sensor 70. The navigation HMI 52 includes a display device, a speaker, a touch panel, a key, and the like. Part or all of the navigation HMI 52 may be shared with the HMI 400 that will be described later. For example, the route determination unit 53 may determine a route from the position of the subject vehicle M specified by the GNSS receiver 51 (or an input arbitrary position) to a destination input by the occupant using the navigation HMI 52 (for example, including information on a stopover when traveling to the destination) by referring to the first map information 54. For example, the first map information 54 is information in which a road shape is expressed by a link indicating a road and nodes connected by the link. The first map information 54 may include a curvature of the road, point of interest (POI) information, or the like. The route determined by the route determination unit 53 is output to the MPU 60. For example, the navigation device 50 may perform route guidance using the navigation HMI 52 on the basis of the route determined by the route determination unit 53. The navigation device 50 may be realized by a function of a terminal device such as a smartphone or a tablet terminal possessed by the user. The navigation device 50 may transmit the current position and the destination to a navigation server through the communication device 20 and acquire the route returned from the navigation server.

For example, the MPU 60 functions as a recommended lane determination unit 61 and holds second map information 62 in the storage device such as an HDD or a flash memory. The recommended lane determination unit 61 divides the route provided from the navigation device 50 into a plurality of blocks (for example, divides the route into intervals of 100 [m] with respect to a vehicle progress direction), and determines a recommended lane for each block by referring to second map information 62. The recommended lane determination unit 61 determines which number of lane a certain number spaced apart from the left the vehicle travels on. In a case where a branching position, a merging position, or the like is present on the route, the recommended lane determination unit 61 determines the recommended lane so that the subject vehicle M may travel on a reasonable travel route for progressing to a branch destination.

The second map information 62 is map information with accuracy higher than that of the first map information 54. For example, the second map information 62 may include information on the center of a lane or information on a boundary of a lane. The second map information 62 may include road information, traffic regulations information, address information (an address and a postal code), facility information, telephone number information, and the like. The road information includes information indicating a type of a road such as an expressway, a toll road, a national highway, a prefectural road, or information on the number of lanes on the road, the area of an emergency parking zone, the width of each lane, a gradient of the road, the position of the road (three-dimensional coordinates including the longitude, the latitude, and the height), the curvature of a curve of a lane, the positions of junction and branch points of a lane, a sign provided on the road, and the like. The second map information 62 may be updated at any time by accessing another device using the communication device 20.

The vehicle sensors 70 include a vehicle speed sensor that detects the speed of the subject vehicle M, an acceleration sensor that detects the acceleration, a yaw rate sensor that detects the angular speed around a vertical axis, a direction sensor that detects the direction of the subject vehicle M, and the like.

For example, the driving operation elements 80 may include an accelerator pedal, a brake pedal, a shift lever, a steering wheel, and other operation elements. An operation sensor that detects an operation amount or the presence or absence of an operation is attached to the driving operation elements 80. A detection result of the operation sensor is output to any one functional constituent or a plurality of functional constituents among the master control unit 100, the driving support control unit 200, the automatic driving control unit 300, the travel driving force output device 500, the brake device 510, and the steering device 520.

For example, the vehicle interior camera 90 may image a face of the occupant (in particular, the occupant sitting on the seat of the driver) sitting on the seat installed in the interior of the vehicle. The vehicle interior camera 90 is a digital camera using a solid imaging element such as a CCD or a CMOS. For example, the vehicle interior camera 90 may periodically image the occupant. A captured image of the vehicle interior camera 90 is output to the master control unit 100.

[Various Control Devices]

For example, the vehicle system 1 includes the master control unit 100, the driving support control unit 200, and the automatic driving control unit 300. The master control unit 100 may be integrated with any one of the driving support control unit 200 and the automatic driving control unit 300.

[Master Control Unit]

The master control unit 100 switches the degree of the driving support or controls the HMI 400. For example, the master control unit 100 includes a switching control unit 110, an HMI control unit (equipment controller) 120, an operation element state determination unit 130, and an occupant state monitoring unit 140. Each of the switching control unit 110, the HMI control unit 120, the operation element state determination unit 130, and the occupant state monitoring unit 140 is realized by a processor such as a central processing unit (CPU) executing a program. Part or all of such functional units may be realized by hardware such as a large scale integration (LSI), an application specific integrated circuit (ASIC), a field-programmable gate array (FPGA), or may be realized by cooperation between software and hardware. The program may be stored in a storage device such as a hard disk drive (HDD) or a flash memory in advance, or may be stored in a detachable storage medium such as a DVD or a CD-ROM and the storage medium may be mounted on a drive device installed in a storage device.

For example, the switching control unit 110 switches the degree of the driving support on the basis of an operation signal input from a predetermined switch (for example, a main switch and an automatic switch that will be described later) included in the HMI 400. For example, the switching control unit 110 may cancel the driving support and switch the driving support to manual driving on the basis of an operation instructing acceleration, deceleration, steering, or the like with the driving operation element 80 such as the acceleration pedal, the brake pedal, the steering wheel, or the like. Details of a function of the switching control unit 110 will be described later.

The switching control unit 110 may switch the degree of the driving support on the basis of an action plan generated by an action plan generation unit 323. For example, the switching control unit 110 may end the driving support at an end schedule point of the automatic driving prescribed by the action plan.

The HMI control unit 120 outputs a notification or the like related to switching of the degree of the driving support to the HMI 400. The HMI control unit 120 may output information on a process result by one or both of the operation element state determination unit 130 and the occupant state monitoring unit 140 to the HMI 400. The HMI control unit 120 may output information received by the HMI 400 to one or both of the driving support control unit 200 and the automatic driving control unit 300. Details of a function of the HMI control unit 120 will be described later.

For example, the operation element state determination unit 130 determines whether or not the steering wheel included in the driving operation elements 80 is being operated (specifically, in a case where the driver is actually intentionally performing an operation, it is assumed that a state is an immediately operable state or gripped state). Details of a function of the operation element state determination unit 130 will be described later.

The occupant state monitoring unit 140 monitors the state of at least the occupant sitting on the seat of the driver of the subject vehicle M on the basis of the captured image of the vehicle interior camera 90. For example, the occupant state monitoring unit 140 may determine whether or not the occupant is monitoring the surroundings of the subject vehicle M as one type of monitoring. Details of a function of the occupant state monitoring unit 140 will be described later.

[Driving Support Control Unit]

The driving support control unit 200 executes the driving support of the first degree. For example, the driving support control unit 200 executes ACC, LKAS and other driving support controls as the driving support of the first degree. For example, when ACC is executed, the driving support control unit 200 controls the travel driving force output device 500 and the brake device 510 such that the subject vehicle M travels while maintaining a constant inter-vehicle distance between the subject vehicle M and a preceding traveling vehicle, on the basis of the information acquired from the object recognition device 16. That is, the driving support control unit 200 performs acceleration and deceleration control (speed control) based on the inter-vehicle distance with respect to the preceding traveling vehicle. When LKAS is executed, the driving support control unit 200 controls the steering device 520 so that the subject vehicle M travels while maintaining (lane keeping) a travel lane on which the subject vehicle M is currently traveling. That is, the driving support control unit 200 performs a steering control for maintaining lane. The driving support of the first degree may include various controls other than the automatic driving (the driving support of the second degree and the third degree) that do not request the occupant to operate the driving operation elements 80.

[Automatic Driving Control Unit]

The automatic driving control unit 300 executes the driving support of the second degree and the third degree. For example, the automatic driving control unit 300 includes a first control unit (controller) 320 and a second control unit 340. Each of the first control unit 320 and the second control unit 340 is realized by a processor such as a CPU executing a program. Part or all of such functional units may be realized by hardware such as an LSI, an ASIC, or an FPGA, or may be realized by a cooperation of software and hardware.

For example, the first control unit 320 includes an outside space recognition unit 321, a subject vehicle position recognition unit 322, and the action plan generation unit 323.

The outside space recognition unit 321 recognizes a state such as the position, the speed, and the acceleration of a surrounding vehicle, on the basis of the information input from the camera 10, the radar device 12, and the viewfinder 14 through the object recognition device 16. The position of a surrounding vehicle may be indicated by a representative point such as a center of gravity or a corner of the surroundings vehicle or may be indicated by a region expressed by an outline of the surroundings vehicle. The "state" of the surroundings vehicle may include an acceleration or jerk of the surroundings vehicle, or an "action state" (for example, whether or not the surroundings vehicle is changing lane or trying to change lane).

The outside space recognition unit 321 may recognize at least one of the above-described surroundings vehicle, an obstacle (for example, a guardrail, a utility pole, a parked vehicle, a person such as a pedestrian, and the like), a road shape, and other objects.

For example, the subject vehicle position recognition unit 322 recognizes the lane (travel lane) on which the subject vehicle M is traveling and a relative position and an orientation of the subject vehicle M with respect to the travel lane. For example, the subject vehicle position recognition unit 322 may recognize the travel lane by comparing a pattern of road lane markings (for example, an arrangement of solid lines and broken lines) obtained from the second map information 62 with a pattern of a road lane marking of the surroundings of the subject vehicle M recognized from the image captured by the camera 10. For the recognition, the position of the subject vehicle M acquired from the navigation device 50 and the process result by the INS may be included.

Figure 2:
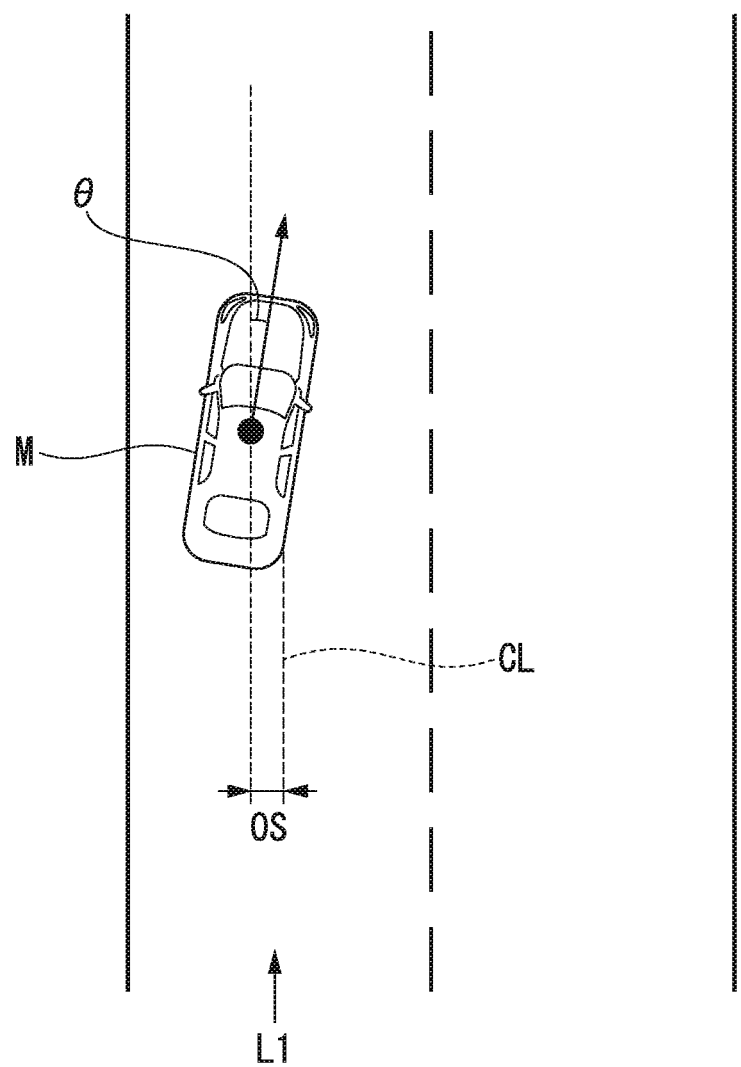
FIG. 2 is a diagram illustrating a manner in which a relative position and an orientation of a subject vehicle M with respect to a travel lane are recognized by a subject vehicle position recognition unit.

In addition, for example, the subject vehicle position recognition unit 322 recognizes the position and the orientation of the subject vehicle M with respect to the travel lane. FIG. 2 is a diagram illustrating a manner in which a relative position and an orientation of the subject vehicle M with respect to a travel lane L1 are recognized by the subject vehicle position recognition unit 322. For example, the subject vehicle position recognition unit 322 recognizes a deviation OS from a travel lane center CL of a reference point (for example, a center of gravity) of the subject vehicle M and an angle θ formed with respect to a line connecting the travel lane center CL to a direction of travel of the subject vehicle M, as the relative position and the orientation of the subject vehicle M with respect to the travel lane L1. Alternatively, the subject vehicle position recognition unit 322 may recognize the position or the like of the reference point of the subject vehicle M with respect to right side or left side of the travel lane L1 as the relative position of the subject vehicle M with respect to the travel lane. The relative position of the subject vehicle M recognized by the subject vehicle position recognition unit 322 is provided to the recommended lane determination unit 61 and the action plan generation unit 323.

The action plan generation unit 323 generates an action plan such that the subject vehicle M can perform automatic driving to a destination, or the like. For example, the action plan generation unit 323 may determine events to be sequentially executed in automatic driving control such that the subject vehicle M can travel on a recommended lane determined by the recommended lane determination unit 61 and adapt to a surrounding situation with respect to the subject vehicle M. The event is information that prescribes a travel manner of the subject vehicle M. For example, in the automatic driving of the embodiment, the event includes a constant speed travel event for traveling on the same travel lane at a constant speed, a low speed following event for following the preceding traveling vehicle at a low speed (for example, 60 [km/h] or less), a lane change event for changing the travel lane of the subject vehicle M, an overtaking event for overtaking the preceding traveling vehicle, a merge event for merging with vehicles at a merge point, a branch event for allowing the subject vehicle M to travel in a target direction at a branch point of the road, an emergency stop event for performing emergency stopping of the subject vehicle M, and the like. In some cases, during the execution of such events, an action for avoidance may be planned on the basis of the surrounding situation (the presence of surrounding vehicles or a pedestrian, lane narrowing due to a roadwork, or the like) of the subject vehicle M.

The action plan generation unit 323 generates a target trajectory on which the subject vehicle M will travel in the future. The target trajectory is expressed by sequentially arranging points (trajectory points) which the subject vehicle M will reach. A trajectory point is a point which the subject vehicle M should reach at each of predetermined travel distances. Alternatively, a target speed and a target acceleration for each of predetermined sampling times (for example, about every one tenth [sec]) may be generated as part of the target trajectory. The trajectory point may be a position where the subject vehicle M should reach at a sampling time of each predetermined sampling time. In this case, information on the target speed and the target acceleration is expressed by an interval between the trajectory points.

Figure 3:
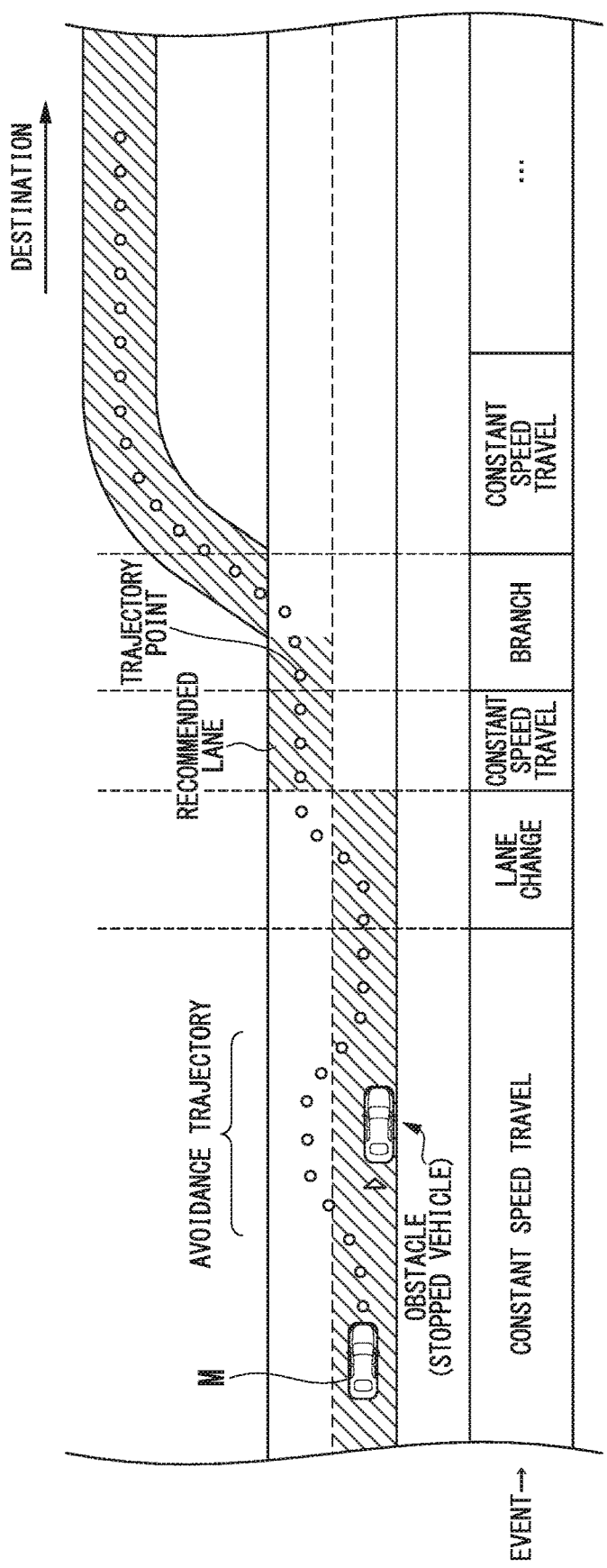
FIG. 3 is a diagram illustrating a manner in which a target trajectory is generated on the basis of a recommended lane.

FIG. 3 is a diagram illustrating a manner in which the target trajectory is generated on the basis of the recommended lane. As shown in the drawing, the recommended lane is set so that traveling to the destination along the route is convenient. When reaching a position at a predetermined distance before a point of switching to the recommended lane (the position may be determined according to the kind of event), the action plan generation unit 323 may start a lane changing event, a branching event, a merging event, or the like. During the execution of each event, in a case where it is necessary to avoid an obstacle, an avoidance trajectory is generated as shown in the drawings.

Figure 4:
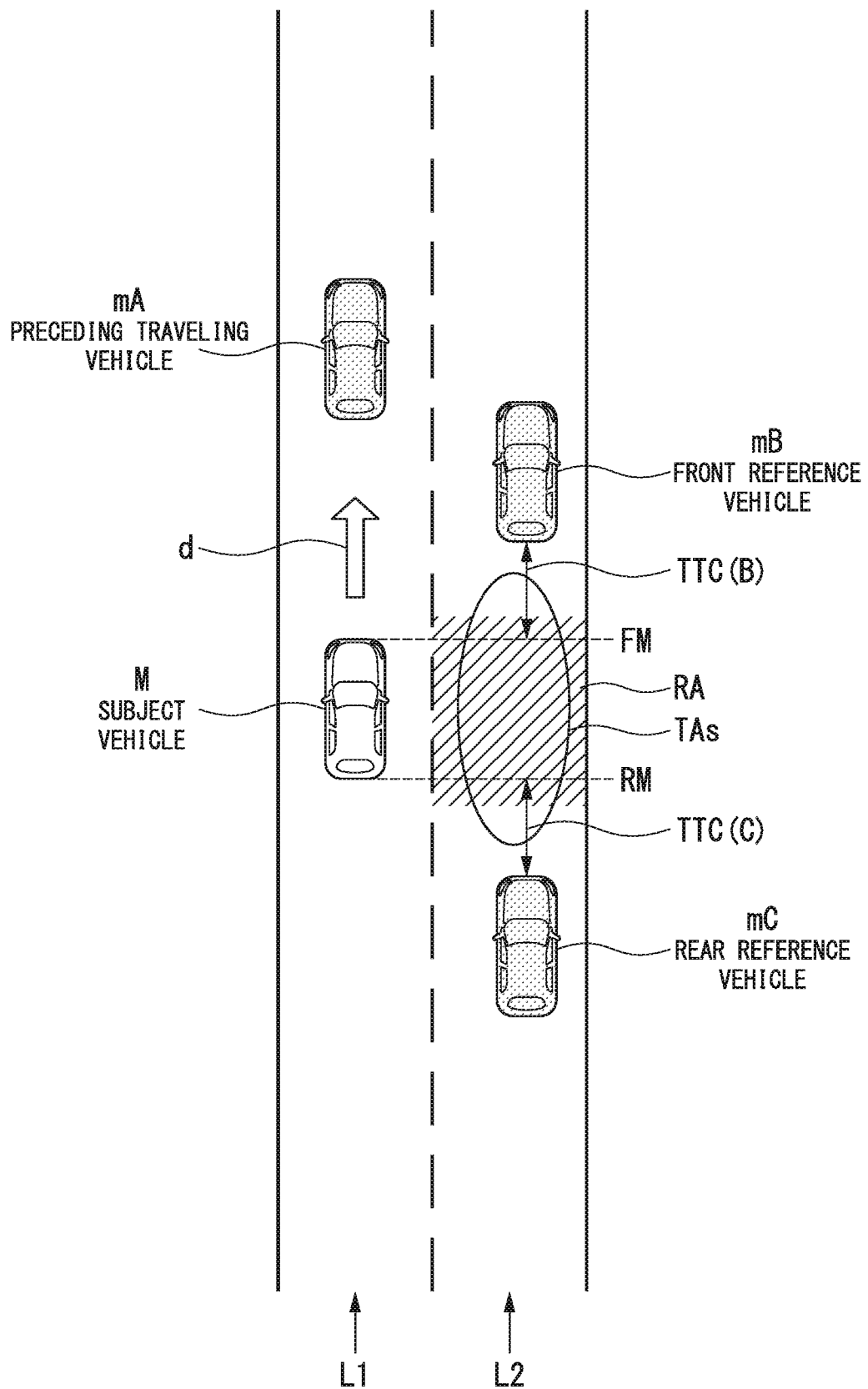
FIG. 4 is a diagram (part 1) illustrating a process at the time of lane change.
Figure 5:
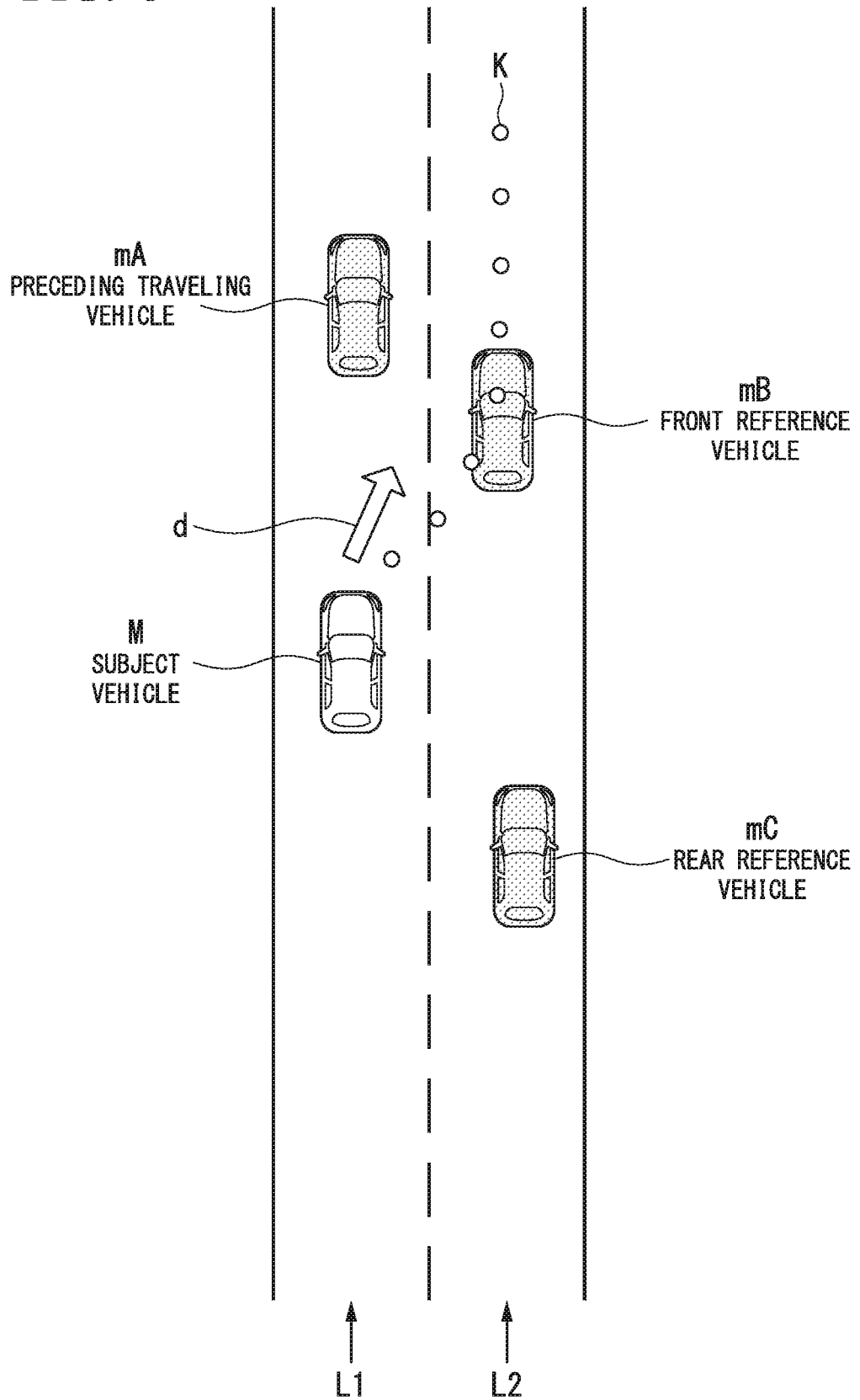
FIG. 5 is a diagram (part 2) illustrating the process at the time of lane change.

In a case where a lane change event is started, the action plan generation unit 323 generates the target trajectory for the lane change. FIGS. 4 and 5 are diagrams illustrating a process when the lane is changed. First, the action plan generation unit 323 selects two surroundings vehicles which are traveling on an adjacent lane L2 with respect to a lane change destination that is an adjacent lane adjacent to the lane (subject lane) L1 on which the subject vehicle M travels, from surroundings vehicles, and sets a lane change target position TAs between these two surroundings vehicles. In the following description, a surroundings vehicle that travels immediately before the lane change target position TAs in the adjacent lane will be referred to as a front reference vehicle mB, and a surroundings vehicle that travels immediately after the lane change target position TAs in the adjacent lane will be referred to as a rear reference vehicle mC. The lane change target position TAs is a relative position based on a positional relationship between the subject vehicle M, the front reference vehicle mB, and the rear reference vehicle mC.

In the example of FIG. 4, a manner in which the action plan generation unit 323 sets the lane change target position TAs is shown. In the drawing, a reference numeral mA denotes the preceding traveling vehicle, a reference numeral mB denotes the front reference vehicle, and a reference numeral mC denotes the rear reference vehicle. An arrow d denotes a progress (travel) direction of the subject vehicle M. In a case of the example of FIG. 4, the action plan generation unit 323 sets the lane change target position TAs between the front reference vehicle mB and the rear reference vehicle mC on the adjacent lane L2.

Next, the action plan generation unit 323 determines whether or not a first condition for determining whether or not the lane change is possible is satisfied at the lane change target position TAs (that is, the position between the front reference vehicle mB and the rear reference vehicle mC).

For example, the first condition may be a condition in which there is not part of the surroundings vehicle in a prohibition area RA provided in the adjacent lane and a TTC between the subject vehicle M and the front reference vehicle mB and between the subject vehicle M and the rear reference vehicle mC is larger than a threshold value. This determination condition is an example of a case where the lane change target position TAs is set to the side of the subject vehicle M. In a case where the first condition is not satisfied, the action plan generation unit 323 resets the lane change target position TAs. At this time, the subject vehicle M may wait until a timing at which the lane change target position TAs satisfying the first condition can be set or perform a speed control for moving to the side of the lane change target position TAs by changing the lane change target position TAs.

As shown in FIG. 4, for example, the action plan generation unit 323 projects the subject vehicle M onto the lane L2 of the lane change destination of the subject vehicle M and sets the prohibition area RA having a slight margin distance in front and behind thereof. The prohibition area RA is set as an area extending from one end to the other end in a lateral direction of the lane L2.

In a case where no surroundings vehicles are present in the prohibition area RA, for example, the action plan generation unit 323 assumes an extension line FM and an extension line RM that respectively extend virtually from the front end and the rear end of the subject vehicle M to the side of the lane L2 which is the lane change destination. The action plan generation unit 323 calculates a collision margin time TTC (B) between the extension line FM and the front reference vehicle mB and a collision margin time TTC(C) between the extension line RM and the rear reference vehicle mC. The collision margin time TTC(B) is a time derived by dividing the distance between the extension line FM and the front reference vehicle mB by a relative speed of the subject vehicle M and the front reference vehicle mB. The collision margin time TTC(C) is a time derived by dividing the distance between the extension line RM and the rear reference vehicle mC by a relative speed of the subject vehicle M and the rear reference vehicle mC. In a case where the collision margin time TTC(B) is larger than a threshold value Th(B) and the collision margin time TTC(C) is larger than a threshold value Th(C), a trajectory generation unit 118 determines that the first condition is satisfied. The threshold values Th(B) and Th(C) may be the same value or different values.

In a case where the first condition is satisfied, the action plan generation unit 323 generates a trajectory candidate for the lane change. In the example of FIG. 5, the action plan generation unit 323 assumes that the preceding traveling vehicle mA, the front reference vehicle mB, and the rear reference vehicle mC travel in a predetermined speed model, and generates trajectory candidates so that the subject vehicle M does not interfere with the preceding traveling vehicle mA and is positioned between the front reference vehicle mB and the rear reference vehicle mC at any future time on the basis of the speed model of these three vehicles and the speed of the subject vehicle M. For example, the action plan generation unit 323 may smoothly connect the current position of the subject vehicle M, the position of the front reference vehicle mB at any future time, the center of the lane of the lane change destination, and an end point of the lane change to each other, using a polynomial curve such as a spline curve, and dispose a predetermined number of trajectory points K on the curve at equal intervals or unequal intervals. At this time, the action plan generation unit 323 generates a trajectory so that at least one of the trajectory points K is disposed at the lane change target position TAs.

In various occasions, the action plan generation unit 323 generates a plurality of target trajectory candidates, and at that time point, selects an optimum target trajectory appropriate for the route to the destination.

For example, the second control unit 340 may include a travel control unit 342. The travel control unit 342 controls the travel driving force output device 500, the brake device 510, and the steering device 520 so that the subject vehicle M passes through the target trajectory generated by the action plan generation unit 323 according to a scheduled time.

The HMI 400 suggests various pieces of information to the occupant in the vehicle and receives an operation input by the occupant. For example, the HMI 400 may include part or all of various display devices, a light emitting unit, a speaker, a buzzer, a touch panel, various operation switches, a key, and the like. The HMI 400 includes a seat belt device that holds the occupant by a seat belt in a state in which the occupant is seated on the seat. Details of a function of the HMI 400 will be described later.

The travel driving force output device 500 outputs the travel driving force (torque) for enabling the vehicle to travel to driving wheels. For example, the travel driving force output device 500 may include a combination of an internal combustion engine, an electric motor, a transmission, and the like, and an electronic control unit (ECU) that controls the internal combustion engine, the electric motor, the transmission, and the like. The ECU controls the above-described constituents according to the information input from the travel control unit 342 or the information input from the driving operation element 80.

For example, the brake device 510 includes a brake caliper, a cylinder that transfers oil pressure to the brake caliper, an electric motor that generates the oil pressure in the cylinder, and a brake ECU. The brake ECU controls the electric motor according to the information input from the travel control unit 342 or the information input from the driving operation element 80, so that the brake torque corresponding to the control operation is output to each wheel. The brake device 510 may include a mechanism for transferring the oil pressure generated by the operation of the brake pedal included in the driving operation element 80 to the cylinder through a master cylinder as a backup. The brake device 510 is not limited to the constitution described above and may be an electronic control method oil pressure brake device that controls an actuator according to the information input from the travel control unit 342 or the information input from the driving operation element 80 to transfer the oil pressure of the master cylinder to the cylinder. The brake device 510 includes a plurality of types of brake device such as those using oil pressure or electrical power.

For example, the steering device 520 includes a steering ECU and an electric motor. For example, the electric motor changes the direction of steerable wheels by applying a force to a rack and pinion mechanism. The steering ECU changes the direction of the steerable wheels by driving the electric motor according to the information input from the travel control unit 342 or the information input from the driving operation element 80.

During the manual driving, the information input from the driving operation element 80 is directly output to the travel driving force output device 500, the brake device 510, and the steering device 520. The information input from the driving operation element 80 may be output to the travel driving force output device 500, the brake device 510, and the steering device 520 through the automatic driving control unit 300. Each ECU of the travel driving force output device 500, the brake device 510, and the steering device 520 performs each of operations on the basis of the information input from the driving operation element 80.

[Constitution of HMI 400]

Figure 6:
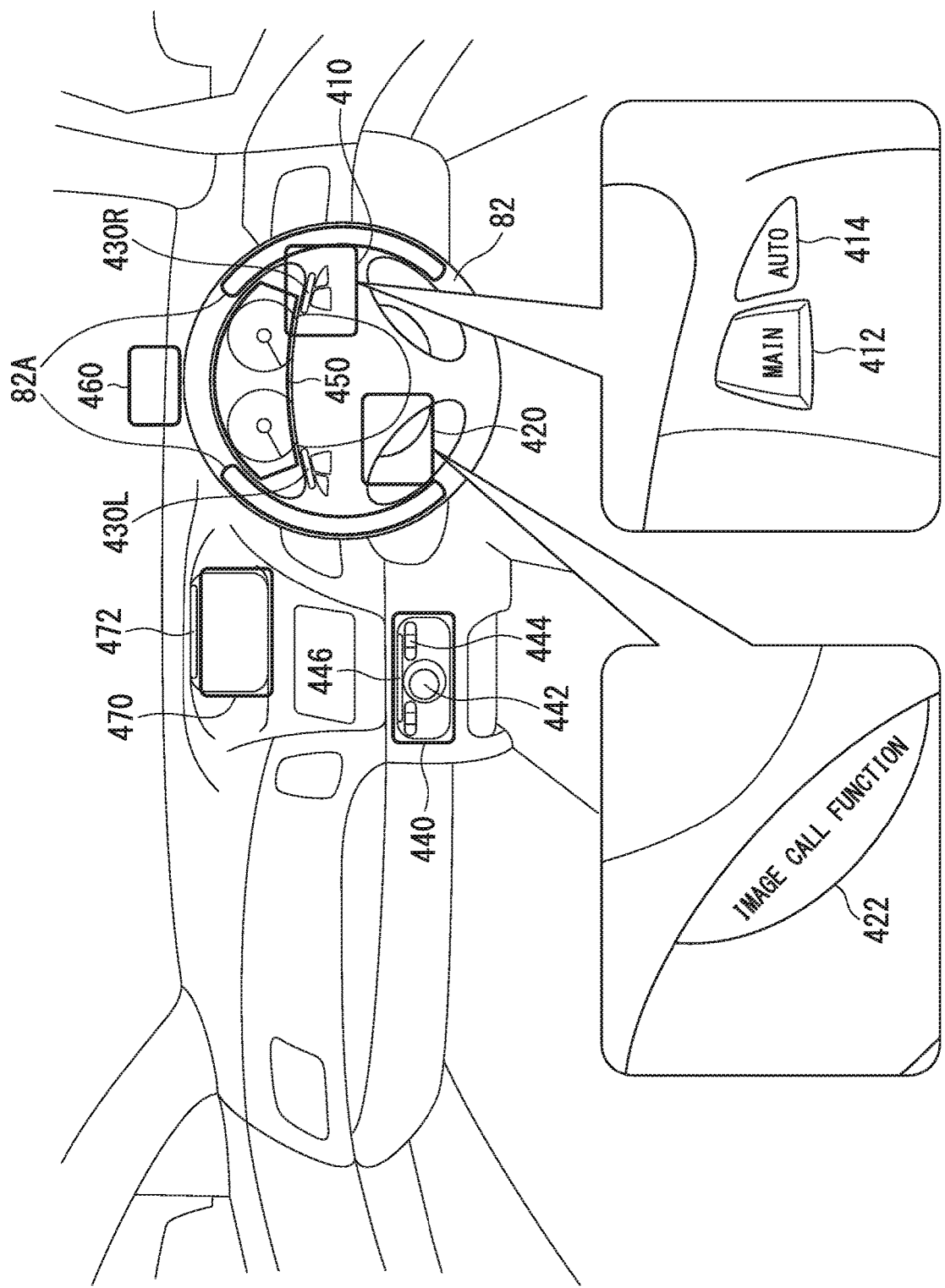
FIG. 6 is a diagram illustrating an example of an HMI in the subject vehicle M.

Hereinafter, a constitution example of the HMI 400 according to an embodiment will be described. FIG. 6 is a diagram illustrating an example of the HMI 400 in the subject vehicle M. For example, the HMI 400 includes a first operation unit 410, a second operation unit 420, light emitting units 430R and 430L, a third operation unit 440, a first display unit 450, a head-up display (HUD) (second display unit) 460, and a third display unit 470.

The first operation unit 410, the second operation unit 420, and the light emitting units 430R and 430L are provided in a steering wheel 82 that is one of the driving operation elements 80. The steering wheel 82 is provided with a grip sensor 82A. For example, the grip sensor 82A may be a capacitance sensor provided along a circumferential direction of the steering wheel 82. The grip sensor 82A detects an object approaching or coming into contact with an area of a detection target as change in capacitance. In a case where the capacitance is equal to or greater than a threshold value, the grip sensor 82A outputs a predetermined detection signal to the operation element state determination unit 130 of the master control unit 100. For example, the threshold value may be set as a value less than a capacitance generated in a case where the occupant grips the steering wheel 82. The grip sensor 82A may output the detection signal indicating the capacitance to the operation element state determination unit 130 regardless of whether or not the capacitance is equal to or greater than a threshold value.

For example, the first operation unit 410 includes a main switch 412 and an automatic switch 414. The main switch 412 is a switch for setting the driving support in a state in which the driving support may be started. The main switch 412 is a switch for starting a process (an internal process) in a preparation step before executing the driving support, that will be described later, or a switch for determining whether or not it is possible to start the driving support.

In a case where the main switch 412 is operated, the subject vehicle M does not immediately start the execution of the driving support but performs the process in the preparation step before executing the driving support. For example, the process in the preparation step is a start of a process of object recognition (specifically, a start of an operation of a Kalman filter, or the like). In a state in which the main switch 412 is operated and the driving support may be started (that is, after a certain time has elapsed since the main switch 412 was operated), in a case where the automatic switch 414 is operated, a control for the driving support is started. That is, the automatic switch 414 is a switch for actually starting the driving support of the first degree in a state in which the driving support may be started.

The second operation unit 420 includes an operation switch 422 for starting provision of an image call function (also referred to as a video phone). For example, the light emitting units 430R and 430L are disposed in a spoke portion extending from the center boss portion of the steering wheel 82 toward an annular rim portion. A lighting state of the light emitting units 430R and 430L is controlled by a control of the HMI control unit 120.

For example, the third operation unit 440 includes a rotation operation unit 442 that protrudes to a front side from a viewpoint of the occupant and a switch operation unit 444. The rotation operation unit 442 is formed in a substantially cylindrical shape and may be rotated around an axis line. The switch operation unit 444 is provided near the rotation operation unit 442 or on a top surface of the rotation operation unit 442. The third operation unit 440 includes a rotation sensor (not shown) such as an encoder that detects the rotation angle and the rotation speed of the rotation operation unit 442, and a displacement sensor (not shown) that detects the displacement of the switch operation unit 444. The third operation unit 440 outputs detection values output from each of the sensors to the master control unit 100. The detection values output to the master control unit 100 are used in operations of an arrow or selection button, a confirmation button, and the like output to a screen of the third display unit 470, or a selection or confirmation of an input character, and the like.

The third operation unit 440 may be a so-called touch panel type operation unit that allows a selection, confirmation operation, or the like to be performed by touching a display screen with a fingertip. The third operation unit 440 is provided with a light emitting unit 446 capable of emitting light of a predetermined wavelength.

For example, the first display unit 450 is a display device that is provided in the vicinity of the front of the seat of the driver in an instrument panel and is able to be seen by the occupant through a gap next to the steering wheel 82 or through the steering wheel 82. For example, the first display unit 450 is a liquid crystal display (LCD), an organic electroluminescence (EL) display device, or the like. On the first display unit 450, information necessary for the travel at the time of the manual driving or at the time of the automatic driving of the subject vehicle M or information on an instruction to the occupant are displayed. For example, the information necessary for the travel at the time of the manual driving of the subject vehicle M is the speed, the engine speed, the remaining fuel amount, the radiator water temperature, the travel distance, and other pieces of information of the subject vehicle M. On the other hand, for example, the information necessary for the travel at the time of the automatic driving of the subject vehicle M is information on the future trajectory of the subject vehicle M, the degree of the driving support, an instruction to the occupant, and the like.

For example, the HUD 460 is disposed at a position higher than that of the first display unit 450. The HUD 460 projects an image on a predetermined image forming unit. For example, by the HUD 460 projecting an image on a portion of a front windshield in front of the seat of the driver, a virtual image is able to be seen from the viewpoint of an occupant sitting on the seat of the driver. A display area of the image projected by the HUD 460 is smaller than a display area of the image on the first display unit 450 and is for preventing the occupant from missing a real object located in front of the drawn image due to the image projected by the HUD 460. In the embodiment, instead of the HUD 460, the front windshield of the subject vehicle M may be used as the second display unit. In this case, for example, a light emitting diode (LED) incorporated in the instrument panel may emit light and the light emission of the LED may be reflected in the front windshield.

For example, the third display unit 470 is attached to the central portion of the instrument panel. For example, the third display unit 470 is an LCD, an organic EL display device, or the like. For example, the third display unit 470 displays an image corresponding to a navigation process executed by the navigation device 50, or a picture of the counterpart in the video phone. The third display unit 470 may display a television program, reproduce a DVD, and display contents of a downloaded movie or the like.

Figure 7:
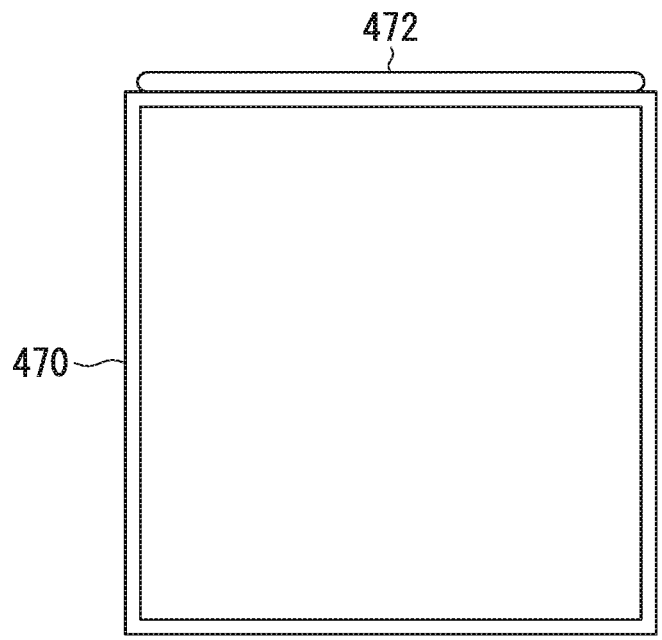
FIG. 7 is a diagram illustrating a first positional relationship between a third display unit and a light emitting unit.

The third display unit 470 may be provided with a light emitting unit 472. FIG. 7 is a diagram illustrating one aspect of a first positional relationship between the third display unit 470 and the light emitting unit 472. For example, the light emitting unit 472 is provided in part or in the vicinity of the third display unit 470. For example, the vicinity is a range in which the shortest distance between the light emitting unit 472 and the third display unit 470 is equal to or less than several [cm] (more specifically, about 3 [cm]). In the example of FIG. 7, the light emitting unit 472 is attached so as to extend along at least one side forming a screen shape of the third display unit 470.

Figure 8:
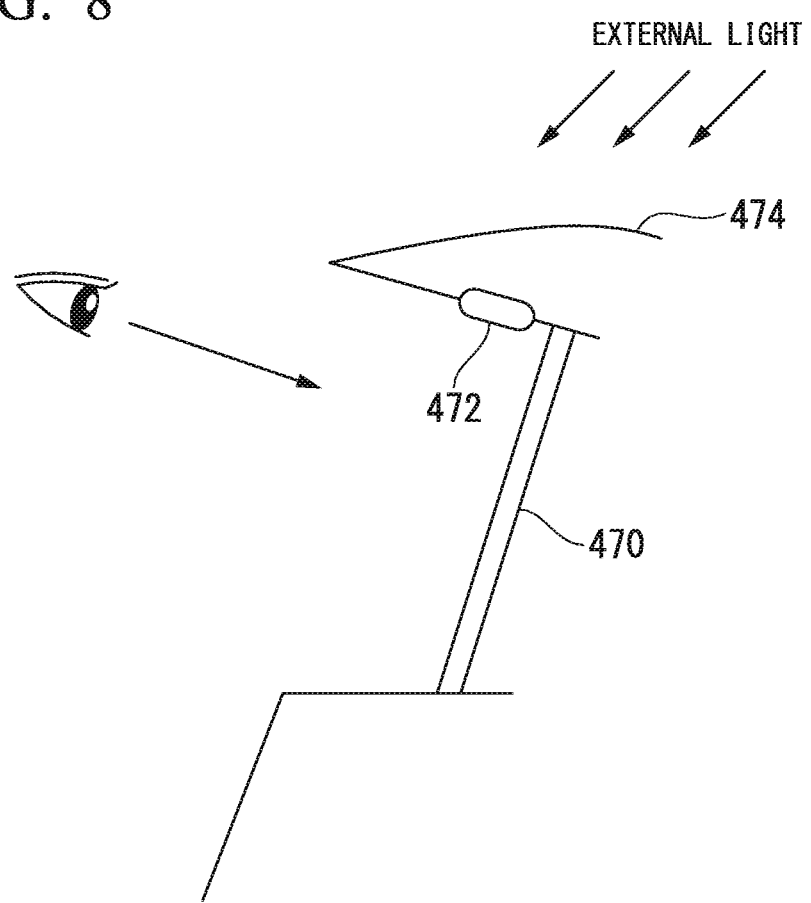
FIG. 8 is a diagram illustrating another aspect of the positional relationship between the third display unit and the light emitting unit.

FIG. 8 is a diagram illustrating another aspect of the positional relationship between the third display unit 470 and the light emitting unit 472. In the example of FIG. 8, the third display unit 470 is provided at a portion below a visor portion 474 of the instrument panel portion at the upper portion in front of the third display unit 470. The light emitted by the light emitting unit 472 is not blocked by the visor portion 474 and may be visually recognized by the occupant. By adopting this shape, the visor portion 474 may minimize irradiation of external light such as sunlight on the third display unit 470 and shield at least part of the external light entering the light emitting unit 472, and thus, visibility for the occupant with respect to the third display unit 470 is improved.

The light emitting unit 472 is controlled by the HMI control unit 120 such that it emits light in a case where the third display unit 470 is usable. For example, the term "usable" means that the third display unit 470 may display an image related to the image call function by an operation of the second operation unit 420, or the third display unit 470 may display a movie or an image related to a television program by an operation of the third operation unit 440.

Figure 9:
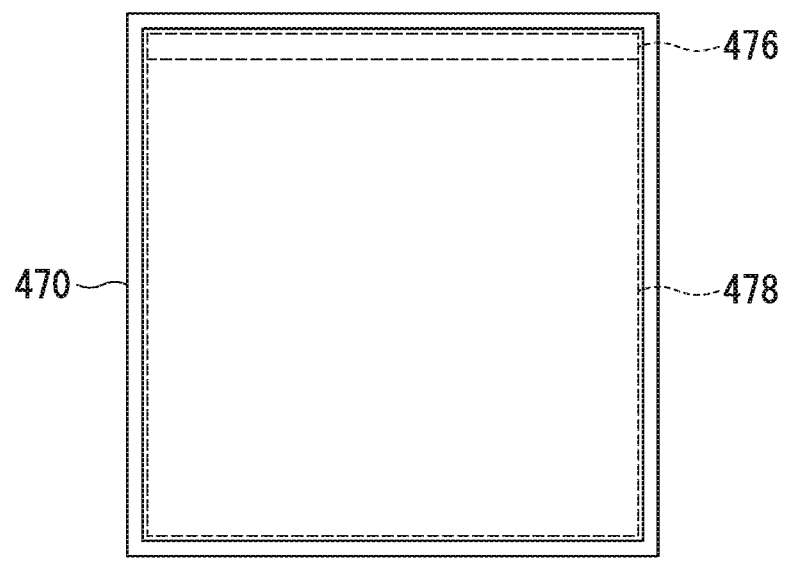
FIG. 9 is a diagram illustrating making a notification that the third display unit is usable using an area of a portion of a screen of the third display unit.

FIG. 9 is a diagram illustrating making a notification that the third display unit 470 is usable using an area of the portion of a screen of the third display unit 470. The HMI control unit 120 allocates a first display area 476 and a second display area 478 to the entire screen area of the third display unit 470. The first display area 476 is a pixel area extending along any one side of the entire screen of the third display unit 470. In a case where the third display unit 470 is usable, the HMI control unit 120 turns on the light of the first display area 476 and causes the first display area 476 to blink using one or both of a predetermined color or a predetermined shape. Thereby, it is possible to notify the occupant that the third display unit 470 is in a usable state without providing the light emitting unit 472.

The HMI control unit 120 displays the details of an operation of the second operation unit 420 or the third operation unit 440 or the details to be realized by an operation, on the second display area 478.

[Display Control of HMI 400 Related to Automatic Driving]

Next, the display control of the HMI 400 related to the automatic driving will be described. A layout on a display screen described below is merely an example and may be arbitrary changed. The layout refers to a disposition, a color, a size, and others.

Figure 10:
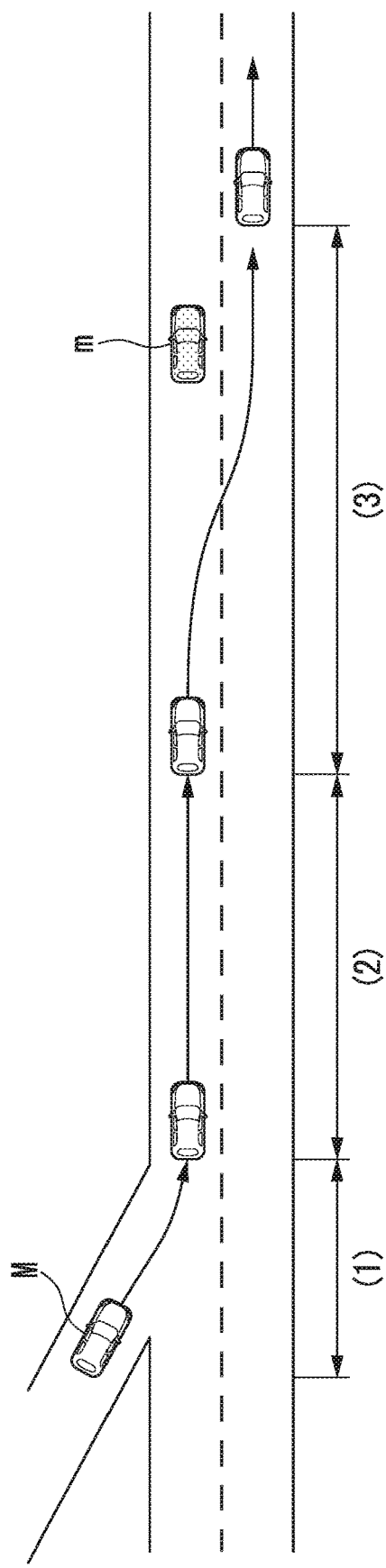
FIG. 10 is a diagram illustrating various scenes in which the subject vehicle M starts from a manual driving to an automatic driving and then the lane change by automatic driving is executed.

FIG. 10 is a diagram illustrating various scenes in which the subject vehicle M starts from the manual driving to the automatic driving and then the lane change by the automatic driving is executed. In an example of FIG. 10, a scene (1) is a scene in which the subject vehicle M enters an expressway from a general road under manual driving. A scene (2) is a scene in which the subject vehicle M switched from the manual driving to the automatic driving. A scene (3) is a scene in which the subject vehicle M executes the lane change by the automatic driving. Hereinafter, display controls corresponding to each of the scenes (1) to (3) will be described.

<Scene (1)>

For example, the scene (1) is a scene before entering the expressway. In this scene, since the main switch 412 and the automatic switch 414 of the first operation unit 410 have not been operated, the driving support is not executed, and the manual driving is performed. When the manual driving is performed, the HMI control unit 120 displays the information necessary for the occupant of the seat of the driver to manually drive the subject vehicle M using the driving operation element 80 on the first display unit 450. The HMI control unit 120 displays part of the information displayed on the first display unit 450 on the HUD 460. A screen of this case is shown in FIG. 11.

Figure 11:
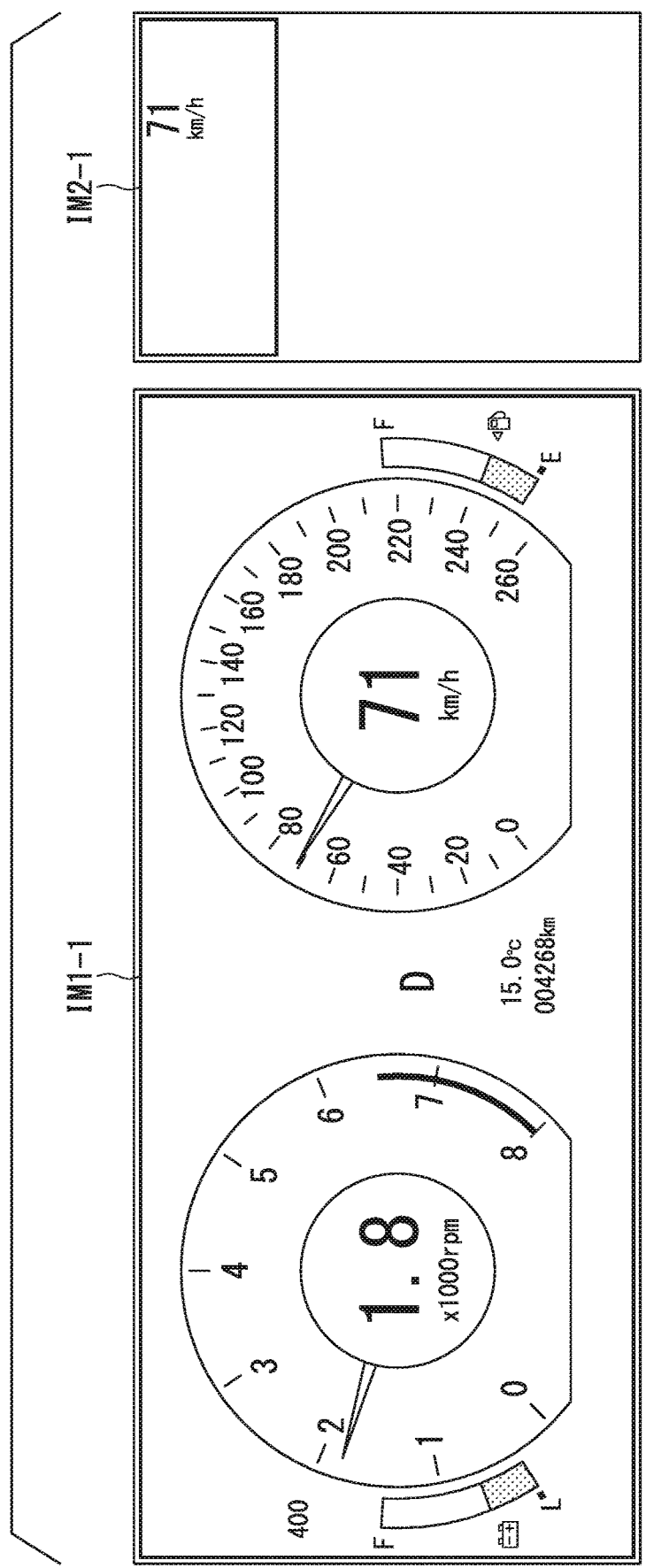
FIG. 11 is a diagram illustrating an example of a first screen and a second screen displayed at the time of manual driving.

FIG. 11 is a diagram illustrating an example of a first screen IM1-1 and a second screen IM2-1 displayed at the time of the manual driving. The first screen IM1-1 is a screen displayed by the first display unit 450, and the second screen IM2-1 is a screen seen by the eyes of the occupant due to the projection by the HUD 460. For example, the HMI control unit 120 displays information on the remaining battery amount, the rotation speed, the shift position, the interior temperature, the travel distance, the travel speed, the fuel remain amount, and the like of the subject vehicle M, as the information necessary for the travel of the subject vehicle M at the time of the manual driving, on the first screen IM1-1. The HMI control unit 120 displays the information on the speed among images displayed on the first screen IM1-1 on the second screen IM2-1 smaller than that of the first screen IM1-1. As described above, since the necessary information is projected by the HUD 460, a recognition area of the image viewed by the eyes of the occupant is smaller than an area of the image displayed by the first display unit 450. Therefore, the HMI control unit 120 displays first information that is relatively detailed (detailed information) on the driving support of the subject vehicle M on the first display unit 450 and displays second information on the driving support that is simple information simpler than the detailed information (simple information) on the HUD 460. For example, the simple information is information of which an information amount is smaller than that of the detailed information. For example, the simple information may be information in which the type or the number of items displayed is smaller than the type or the number of items displayed as the detailed information. The simple information may be an image of which the resolution is reduced, a simplified image, or a deformed image with respect to an image displayed as the detailed information. The second information may be information of which an importance is high or information which is highly urgent among the pieces of first information.

For example, the HMI control unit 120 may display information obtained by extracting part of the detailed information as the simple information on the HUD 460. For example, in FIG. 11, the HMI control unit 120 extracts information indicating the speed of the subject vehicle M from the detailed information displayed on the first screen IM1-1 and displays the extracted information on the second screen IM2-1. As described above, the detailed information is displayed on the first display unit 450 and the simple information is displayed on the HUD 460, and thus it is possible to appropriately provide the information on the driving support and prevent the eyes of the occupant from becoming tired.

<Scene (2)>

In the scene (2), the subject vehicle M enters the expressway. In a case where the HMI control unit 120 receives the operation of the main switch 412 by the occupant, the HMI control unit 120 changes the screens to be displayed on the first display unit 450 and the HUD 460. The screen after the change is shown in FIG. 12.

Figure 12:
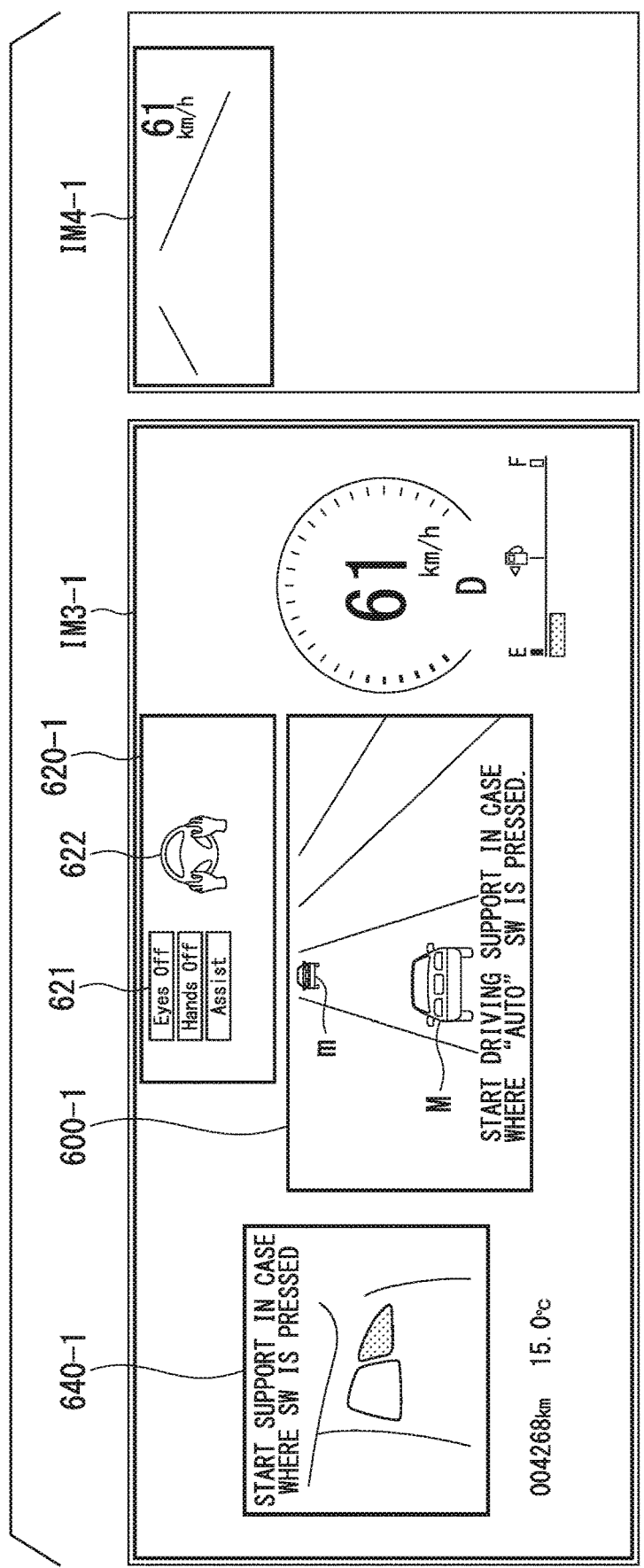
FIG. 12 is a diagram illustrating an example of a third screen and a fourth screen displayed by an operation of a main switch.

FIG. 12 is a diagram illustrating an example of a third screen IM3-1 and a fourth screen IM4-1 displayed by the operation of the main switch 412. The third screen IM3-1 is a screen displayed by the first display unit 450, and the fourth screen IM4-1 is a screen viewed by the eyes of the occupant by the projection by the HUD 460. The same applies to a third screen IM3-X (X is an arbitrary natural number) and a fourth screen IM-X shown in the following drawings. The third screen IM3-X and the fourth screen IM4-X are continuously displayed in a state in which the driving support is executable and in a state in which the driving support is being executed.

The third screen IM3-1 includes a surroundings detection information display area 600-1, a driving support state display area 620-1, and a driving support start operation guide area 640-1 as areas for displaying the information on the driving support. Hereinafter, each area of a third screen IM3-X is referred to as a surroundings detection information display area 600-X, a driving support state display area 620-X, and a driving support start operation guide area 640-X.

The HMI control unit 120 displays the image indicating the road shape in front of the subject vehicle M acquired from the second map information 62, the image indicating the subject vehicle M recognized by the subject vehicle position recognition unit 322, and the image indicating the surroundings vehicle m recognized by the outside space recognition unit 321, in the surroundings detection information display area 600-1. The HMI control unit 120 displays the image indicating all surroundings vehicles m recognized by the outside space recognition unit 321, on the first display unit 450. The HMI control unit 120 may display only surroundings vehicles m that affect the future trajectory of the subject vehicle M among all surroundings vehicles m recognized by the outside space recognition unit 321, on the first display unit 450. Therefore, it is possible to reduce the number of vehicles to be monitored by the occupant and it is possible to reduce a burden of monitoring.

The HMI control unit 120 displays all pieces of information indicating candidates for the state of the driving support (including the automatic driving) executable by the subject vehicle M, in the driving support state display area 620-1. In the example of FIG. 12, an image 621 indicating three indicators "Assist", "Hands Off", and "Eyes Off" is shown as the information indicating the candidate of the state of the driving support. For example, the degree of the driving support is expressed by each indicator alone or a combination of a plurality of indicators.

The indicator "Assist" indicates that the subject vehicle M is executing the driving support in the first degree of the ACC, the LKAS, or the like, or the subject vehicle M is in a state in which the subject vehicle M can perform a transition to the driving support of the first degree. Information on whether the subject vehicle M is executing driving support in the first degree or can perform a transition to driving support of the first degree may be ascertained from a requested action notification image 622 that will be described later.

The indicator "Hands Off" indicates that the subject vehicle is in a state in which although the occupant may not perform an operation on the driving operation element 80, the subject vehicle M is executing the driving support in the second degree in which the occupant is in charge of the surroundings monitoring obligation or the subject vehicle M is in a state in which the subject vehicle M may perform a transition to the driving support of the second degree. Information on whether the subject vehicle M is executing the driving support in the second degree or may perform the transition to the driving support of the second degree may be grasped by the requested action notification image 622.

The indicator "Eyes Off" indicates that the subject vehicle is in a state in which the occupant may not perform an operation on the driving operation element 80 and the subject vehicle M is executing the driving support in the third degree in which the occupant is not in charge of the surroundings monitoring obligation or the subject vehicle M is in a state in which the subject vehicle M may perform a transition to the driving support of the third degree. Information on whether the subject vehicle M is executing the driving support in the third degree or may perform the transition to the driving support of the third degree may be grasped by the requested action notification image 622. In an example of FIG. 12, the state in which the driving support of the subject vehicle M is not executed (a manual driving state) is shown.

The HMI control unit 120 displays the requested action notification image 622 at the display position corresponding to the image 621 indicating the three indicators "Assist", "Hands Off", and "Eyes Off" in the driving support state display area 620-1. The term "corresponding" means that a correspondence may be recognized by a person, due to side by side positioning, vertical alignment, or a guideline indicating correspondence. As an example, the "display position corresponding to the image 621" is a display position adjacent to the image 621 and is a display position several [cm] or less (for example, 3 [cm] or less) upward, downward, to the right, or to the left away from the image 621. For example, the requested action notification image 622 is an image indicating a predetermined action performed by the occupant on the driving operation element 80. For example, the requested action notification image 622 includes an image indicating the driving operation element 80 and an image indicating a predetermined portion of the occupant. For example, the requested action notification image 622 is an image that schematically indicates a positional relationship between the steering wheel 82 and a hand of the occupant.

The HMI control unit 120 displays information for guiding the operation of the occupant that is for starting the driving support, in the driving support start operation guide area 640-1. In an example of FIG. 12, in the driving support start operation guide area 640-1, the start of the driving support is guided by the occupant operating the automatic switch 414.

In addition to or instead of displaying the start of the driving support by the occupant operating the automatic switch 414 in the driving support start operation guide area 640-1, the HMI control unit 120 may cause the speaker included in the HMI 400 to output sound indicating that the driving support has been started by the occupant operating the automatic switch 414.

At least part of the pieces of the information displayed in each of the surroundings detection information display area 600-1, the driving support state display area 620-1, and the driving support start operation guide area 640-1 may be displayed in another display area. In the third screen IM3-1, the information on the travel distance, the temperature inside the vehicle, the fuel, the speed, and the shift position of the subject vehicle M may be displayed.

With respect to the detailed information displayed on the third screen IM3-1, the HMI control unit 120 displays the simple information obtained by extracting the part of the detailed information on the fourth screen IM4-1 of the HUD 460. On the fourth screen M4-1 of the HUD 460, the information on the road shape in front of the subject vehicle M and the information on the speed of the subject vehicle M are displayed among the pieces of the information on the driving support displayed on the display screen IM3-1 of the first display unit 450.

In a state shown in FIG. 12, in a case where the operation of the automatic switch 414 by the occupant is detected, the master control unit 100 causes the driving support control unit 200 to execute the driving support of the first degree. The HMI control unit 120 changes the screens to be displayed on the first display unit 450 and the HUD 460 to, for example, screens shown in FIG. 13.

Figure 13:
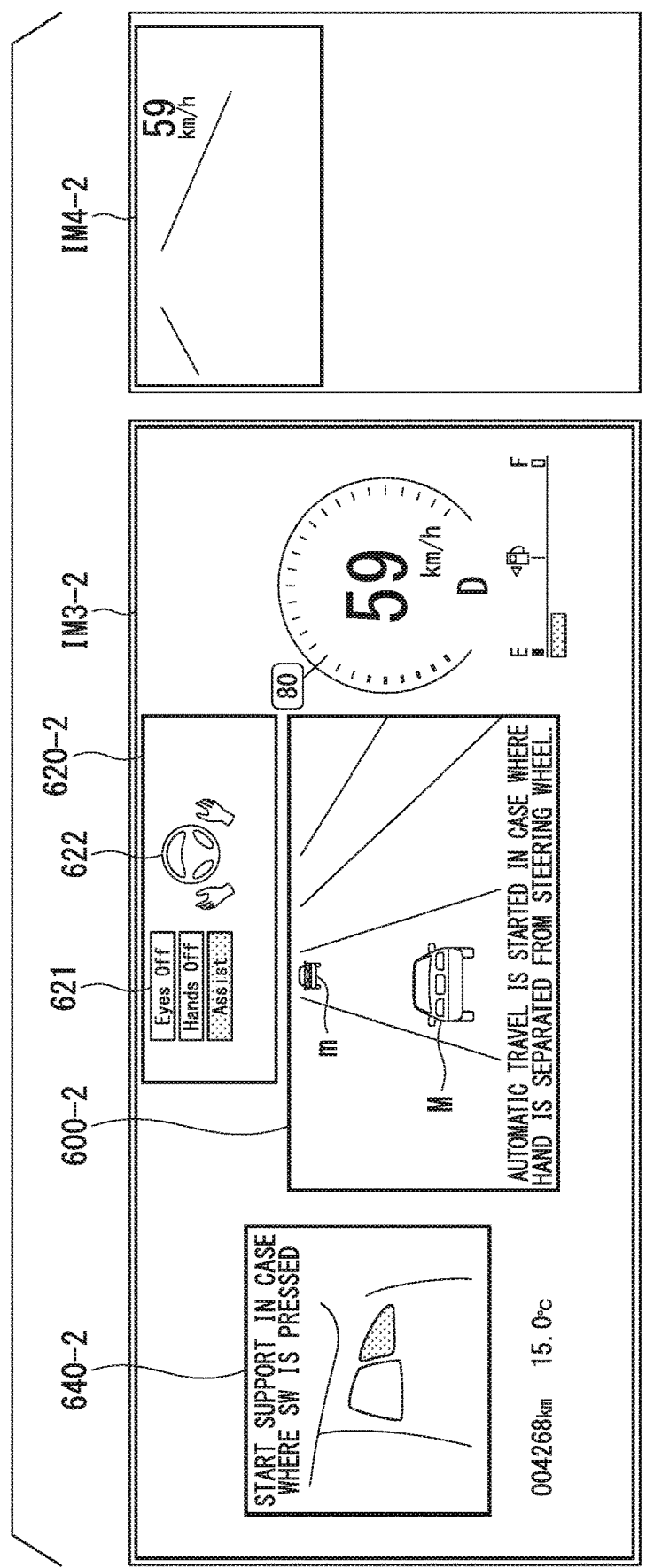
FIG. 13 is a diagram illustrating an example of screens displayed on a first display unit and a head-up display (HUD) in a case where an automatic switch is being operated.

FIG. 13 is a diagram illustrating an example of screens IM3-2 and IM4-2 displayed on the first display unit 450 and the HUD 460 in a case where the automatic switch 414 is operated. The HMI control unit 120 displays the image indicating the degree of the driving support that is being executed so that the image indicating the degree of the driving support that is being executed is distinguishable from an image indicating a degree of another driving support. For example, the HMI control unit 120 highlights and displays the image of the indicator "Assist" in a driving support state display area 620-2 of the third screen IM3-2. Therefore, the occupant may ascertain that the driving support of the first degree is being performed.

Here, as the requested action notification image 622, the HMI control unit 120 displays a moving image for requesting the occupant to perform an operation necessary for the transition to the degree of the driving support corresponding to the "Hands Off" (automatic driving) as the requested action notification image 622. For example, the moving image is an image including a dynamic object in which a predetermined object dynamically moves as time passes by. The moving image includes an animation.

For example, in a case where the driving support of the first degree is being executed and the driving support of the second degree is executable, the HMI control unit 120 displays the requested action notification image 622 schematically indicating an operation content of the occupant for a state in which the hand of the occupant is removed from the steering wheel 82 in the driving support state display area 620-2 of the third screen IM3-2. The requested action notification image 622 is an image including information on an operation method of the occupant for switching the driving support to the driving support of the second degree.

Figure 14:
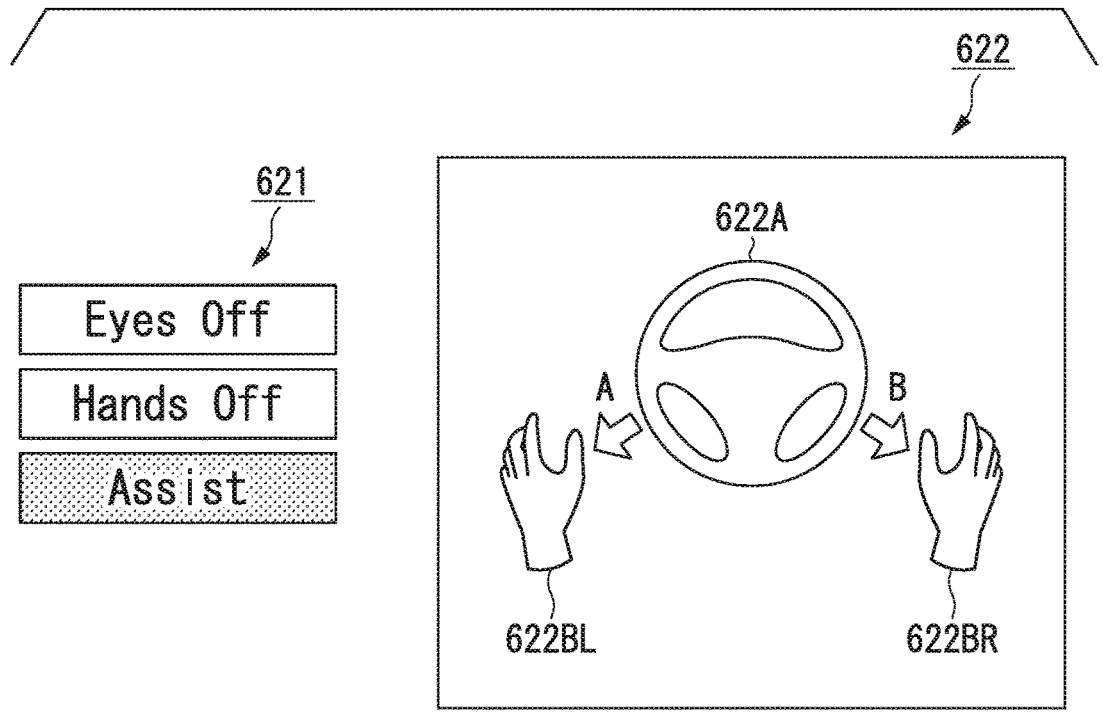
FIG. 14 is a diagram illustrating an example of an image displayed in a driving support state display area when driving support of a first degree is executed.

FIG. 14 is a diagram illustrating an example of an image displayed in the driving support state display area 620-2 when the driving support of the first degree is executed. The HMI control unit 120 displays the image 621 indicating the three indicators and the requested action notification image 622 in the driving support state display area 620-2. For example, the requested action notification image 622 includes an image 622A indicating the steering wheel 82 and images 622BL and 622BR indicating the hands of the occupant.

For example, the HMI control unit 120 may display an animation in which the images 622BL and 622BR indicating the hands of the occupant are removed from the image 622A indicating the steering wheel 82 in directions of arrows A and B. The HMI control unit 120 may highlight and display the image 622A indicating the steering wheel 82 and the images 622BL and 622BR indicating the hands of the occupant. Therefore, since the image indicating the indicator "Assist" is highlighted and displayed among images 621 indicating the three indicators, the occupant may intuitively grasp that the driving support of the first degree is being executed. In addition, the occupant may intuitively grasp that an action of separating the hand from the steering wheel 82 is requested by the animation of the requested action notification image 622.

In addition to or instead of the requested action notification image 622 of the image 622A indicating the steering wheel 82 and the images 622BL and 622BR indicating the hands of the occupant, the HMI control unit 120 may display an image schematically indicating a positional relationship between the accelerator pedal and a foot of the occupant or an image schematically indicating a positional relationship between the brake pedal and the foot of the occupant as the requested action notification image 623, in the driving support state display area 620-2 of the third screen IM3-2.

Figure 15:
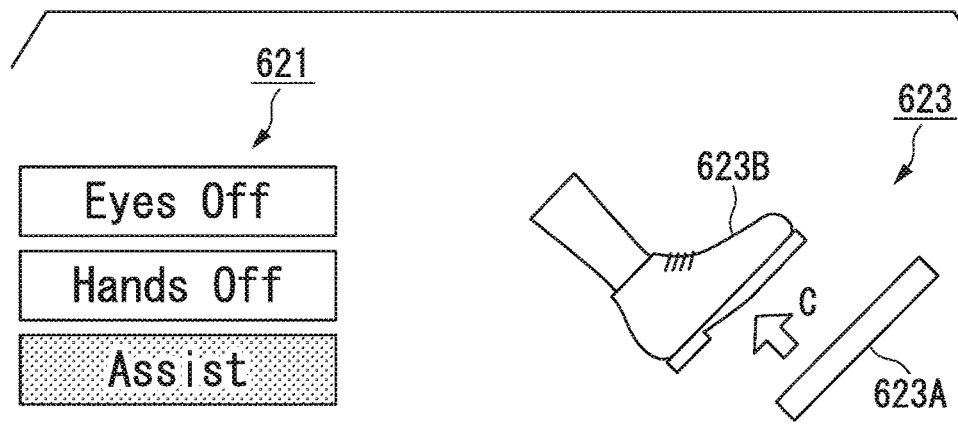
FIG. 15 is a diagram illustrating a display example of a requested action notification image including an accelerator pedal and a foot of an occupant.

FIG. 15 is a diagram illustrating a display example of a requested action notification image 623 including the accelerator pedal and the foot of the occupant. The HMI control unit 120 displays the image 621 indicating the three indicators and the requested action notification image 623 in the driving support state display area 620-2 shown in FIG. 15. The requested action notification image 623 includes an image 623A indicating the accelerator pedal and an image 623B indicating the foot of the occupant. For example, in a case where the driving support of the first degree is being executed and the driving support of the second degree is executable, the HMI control unit 120 displays an animation in which the image 623B indicating the foot of the occupant is being separated from the image 623A indicating the accelerator pedal in a direction of an arrow C in order to switch the driving support to the driving support of the second degree. The HMI control unit 120 may highlight and display the image 623A indicating the accelerator pedal and the image 623B indicating the foot of the occupant. Therefore, the occupant may intuitively grasp that an action of separating the foot from the accelerator pedal is being requested.

The HMI control unit 120 may display information indicating that driving support has been started by the occupant executing the action corresponding to the requested action notification image 622, on a surroundings detection information display area 600-2. In an example of FIG. 13, information indicating that the driving support (an "automatic travel" in the drawing") is started in a case where the hand is separated from the steering wheel 82 (a "handle" in the drawing) is displayed in the surroundings detection information display area 600-2.

In a case where the HMI control unit 120 requests the occupant to perform the separation of the hand from the steering wheel 82, the HMI control unit 120 may turn on the light emitting units 430R and 430L provided on the steering wheel 82 or cause the light emitting units 430R and 430L to blink.

In a case where the HMI control unit 120 requests the occupant to perform the separation of the hand from the steering wheel 82, the HMI control unit 120 may output a sound indicating the request from the speaker included in the HMI 400. The HMI control unit 120 may combine a plurality of aspects among the display of the requested action notification image 622, turning on the light emitting units 430R and 430L or causing the light emitting units 430R and 430L to blink, and the sound output corresponding to the action of separating the hand from the steering wheel 82 and may output the combination from various pieces of equipment.

The HMI control unit 120 displays the same information as on the fourth screen IM4-1 on a fourth screen IM4-2 of the HUD 460.

Here, the operation element state determination unit 130 determines whether or not the steering wheel 82 is being gripped by the occupant. For example, the operation element state determination unit 130 determines whether or not the steering wheel 82 is operated on the basis of the output result by the grip sensor 82A described above.

After the automatic switch 414 is operated by the occupant, in a case where the operation element state determination unit 130 determines that the steering wheel 82 is gripped by the occupant, the switching control unit 110 causes the driving support control unit 200 to continue the driving support of the first degree.

In a state in which the automatic switch 414 is operated, in a case where all conditions for the transition to the driving support of the second degree are satisfied and the operation element state determination unit 130 determines that the steering wheel 82 is not gripped by the occupant, the switching control unit 110 causes the automatic driving control unit 300 to execute the driving support of the second degree (that is, the automatic driving).

Figure 16:
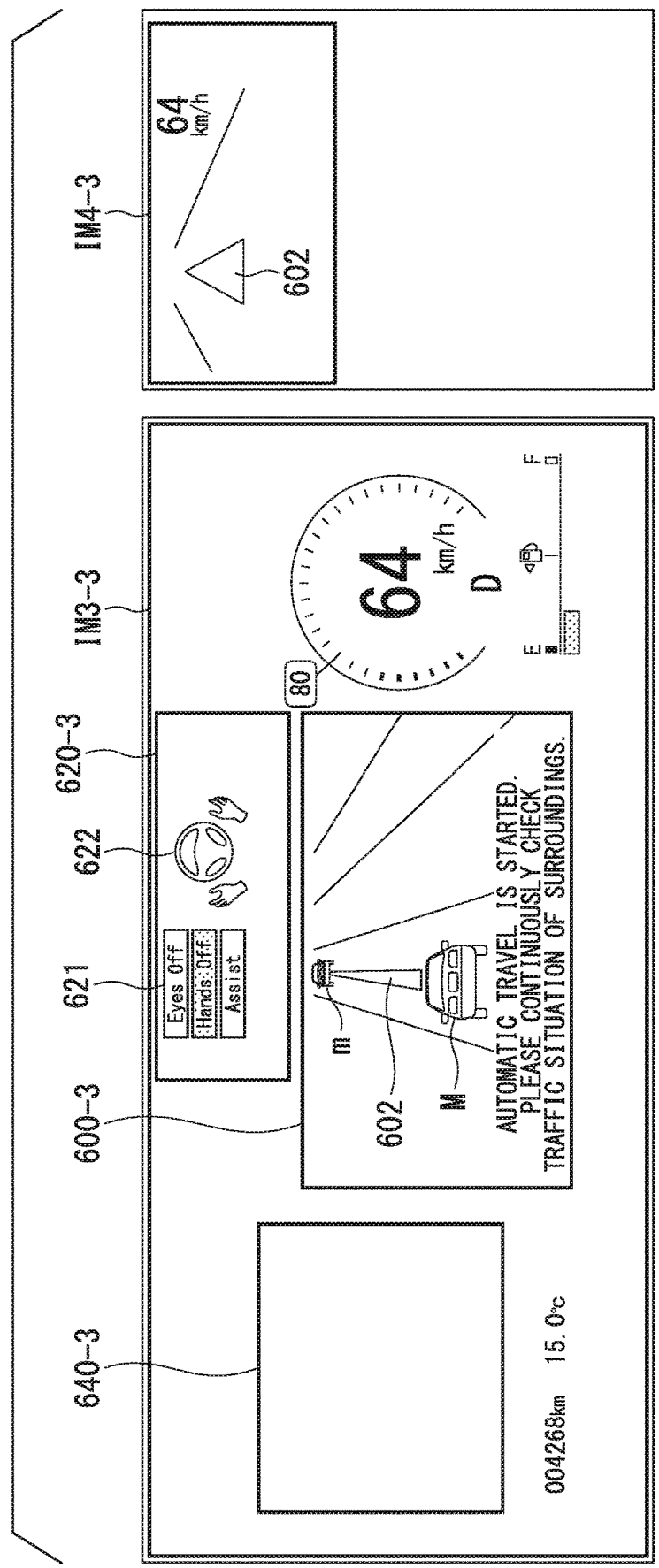
FIG. 16 is a diagram illustrating an example of the screens displayed on the first display unit and the HUD during driving support of a second degree.

In a case where the automatic driving control unit 300 executes the driving support of the second degree, the HMI control unit 120 changes the screens displayed on the first display unit 450 and the HUD 460 to, for example, screens shown in FIG. 16.

FIG. 16 is a diagram illustrating an example of the screens displayed on the first display unit 450 and the HUD 460 during the driving support of the second degree. The HMI control unit 120 highlights and displays the indicator for "Hands Off" corresponding to the driving support of the second degree in a driving support state display area 620-3 of a third screen IM3-3. Therefore, the occupant may grasp that the driving support of the second degree is being performed.

For example, the HMI control unit 120 displays the image indicating the road shape in front of the subject vehicle M acquired from the second map information 62, the image indicating the subject vehicle M recognized by the subject vehicle position recognition unit 322, the image indicating the surroundings vehicle m recognized by the outside space recognition unit 321, and a future trajectory image 602 indicating the future trajectory of the subject vehicle M generated by the action plan generation unit 323, for example, in a surroundings detection information display area 600-3. The HMI control unit 120 displays information for allowing the occupant to continuously monitor a peripheral traffic situation although the driving support of the second degree (the automatic travel in the drawing) is started, in the surroundings detection information display area 600-3.

The occupant state monitoring unit 140 of the master control unit 100 monitors whether the occupant is continuously monitoring the surrounding traffic situation. For example, the occupant state monitoring unit 140 may acquire a face image of the occupant sitting on the seat of the driver from the image captured by the vehicle interior camera 90 and acquire a line of sight direction from the acquired face image. For example, the occupant state monitoring unit 140 may acquire the line of sight direction of the occupant from the captured image of the vehicle interior camera 90 by deep learning using a neural network or the like. For example, a neural network that is learned in order to output the line of sight direction by inputting feature information of the eyes, the nose, the mouth, or the like or the position of the irises, that are obtained by analyzing an unspecified large number of face images may be constructed in advance. In addition, the occupant state monitoring unit 140 may acquire the line of sight direction of the occupant by inputting the face image of the occupant of the subject vehicle M to the neural network.

The occupant state monitoring unit 140 determines whether or not the occupant is performing the surroundings monitoring of the subject vehicle M, by whether or not the line of sight direction of the occupant is within a predetermined range. In a case where the line of sight direction of the occupant is not within the predetermined range or in a case where the occupant state monitoring unit 140 is not able to acquire the line of sight direction of the occupant, the occupant state monitoring unit 140 determines that the occupant is not performing surroundings monitoring. In a case where it is determined that the occupant does not perform the surroundings monitoring, the HMI control unit 120 may issue a warning by sound or the like so as to cause the occupant to perform the surroundings monitoring.

In a case where the line of sight direction of the occupant is included in the range of directions in which the predetermined surroundings may be monitored, the occupant state monitoring unit 140 determines that the occupant performs the surroundings monitoring. In this case, the automatic driving control unit 300 continues the driving support of the second degree. In a case where the driving support of the subject vehicle M is being started, nothing is displayed in a driving support start operation guide area 640-3.

The HMI control unit 120 displays the future trajectory image 602 indicating the future trajectory of the subject vehicle M in addition to the same information as the fourth screen IM4-2 on the fourth screen IM4-3 of the HUD 460.

<Scene (3)>

In the scene (3), the automatic driving control unit 300 performs the lane change of the subject vehicle by the driving support of the second degree. In this case, the HMI control unit 120 displays a screen corresponding to the driving support on one or both of the first display unit 450 and the HUD 460.

For example, the HMI control unit 120 displays the image indicating the generation of the lane change event of the subject vehicle M executed by the automatic driving control unit 300 in a first aspect at a first timing before a behavior of the subject vehicle M changes (for example, five seconds before the behavior changes).

Figure 17:
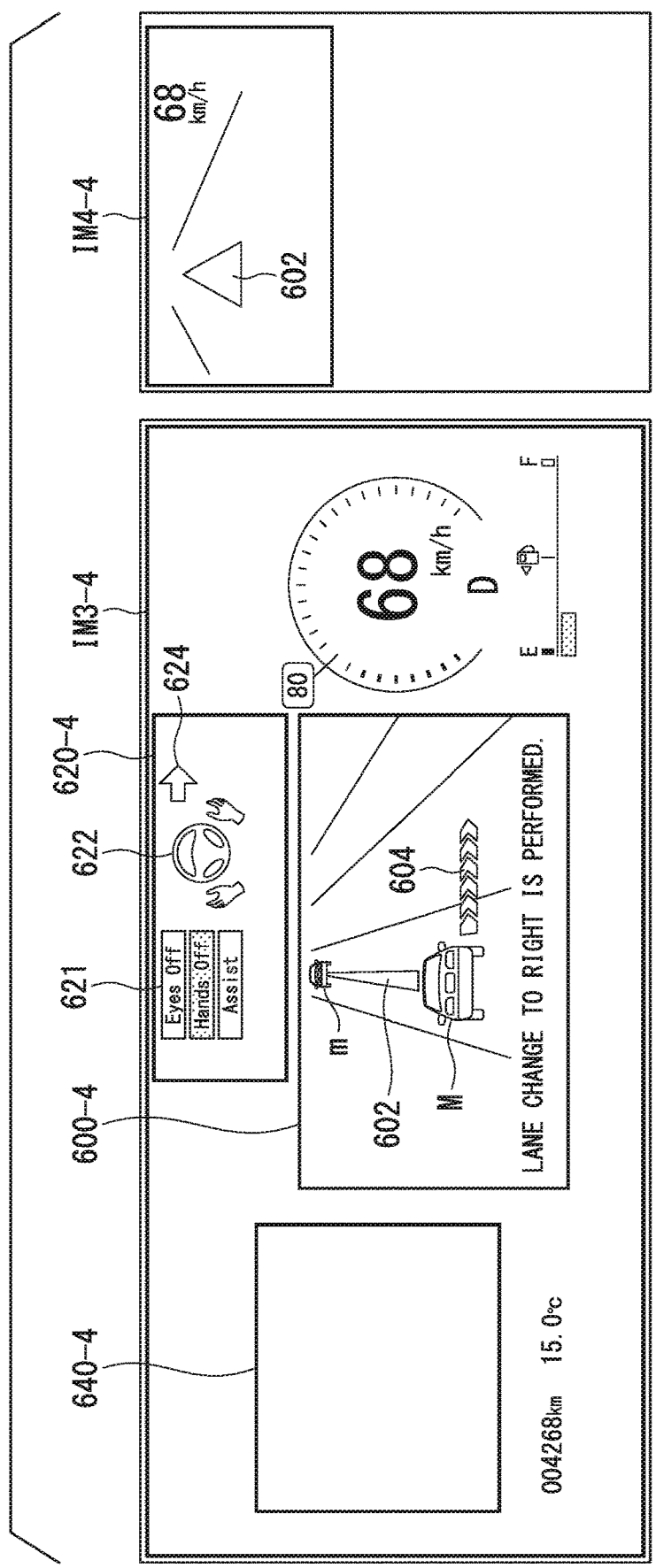
FIG. 17 is a diagram illustrating an example of a third screen 1M and a fourth screen displayed at the time of a start of a lane change.

FIG. 17 is a diagram illustrating an example of a third screen IM3-4 and a fourth screen IM4-4 displayed at the first timing before the behavior of the subject vehicle M changes. In addition to a content displayed in the surroundings detection information display area 600-3, the HMI control unit 120 displays, for example, an image 604 indicating the direction in which the subject vehicle M performs the lane change, in a surroundings detection information display area 600-4 of the third screen IM3-4. In an example of FIG. 17, the image 604 in which the subject vehicle M changes lane to a lane adjacent to the travel lane on the right is displayed.

For example, the image 604 is an image that does not include text. In an example of FIG. 17, the image 604 is a figure indicating a course change direction of the subject vehicle M in a road width direction. For example, the HMI control unit 120 gives an outside frame to the figure indicating the course change direction of the subject vehicle M and displays the image to which the outside fame has been given on the first display unit 450. The HMI control unit 120 divides the image 604 into a plurality of areas, gives an outside frame to each of the plurality of separate areas, and displays the image 604. The HMI control unit 120 may display the outside frames of each of the plurality of divided areas as an animation in which the outside frames of each of the plurality of divided areas are sequentially displayed along the course change direction of the subject vehicle M.

The HMI control unit 120 displays a winker indicator 624 indicating the course change of the subject vehicle M in a driving support state display area 620-4. For example, the winker indicator 624 is a figure such as an arrow indicating the course change direction. The HMI control unit 120 displays the winker indicator 624 on the first display unit 450 at a timing synchronized with the first timing at which the image 604 is displayed.

The HMI control unit 120 displays the same information as the fourth screen IM4-3 on the fourth screen IM4-4 of the HUD 460.

The HMI control unit 120 displays an image in which the image 604 is highlighted and displayed at a second timing after first timing and before the behavior of the subject vehicle M changes (for example, two seconds before the behavior changes), in the surroundings detection information display area 600-4.

Figure 18:
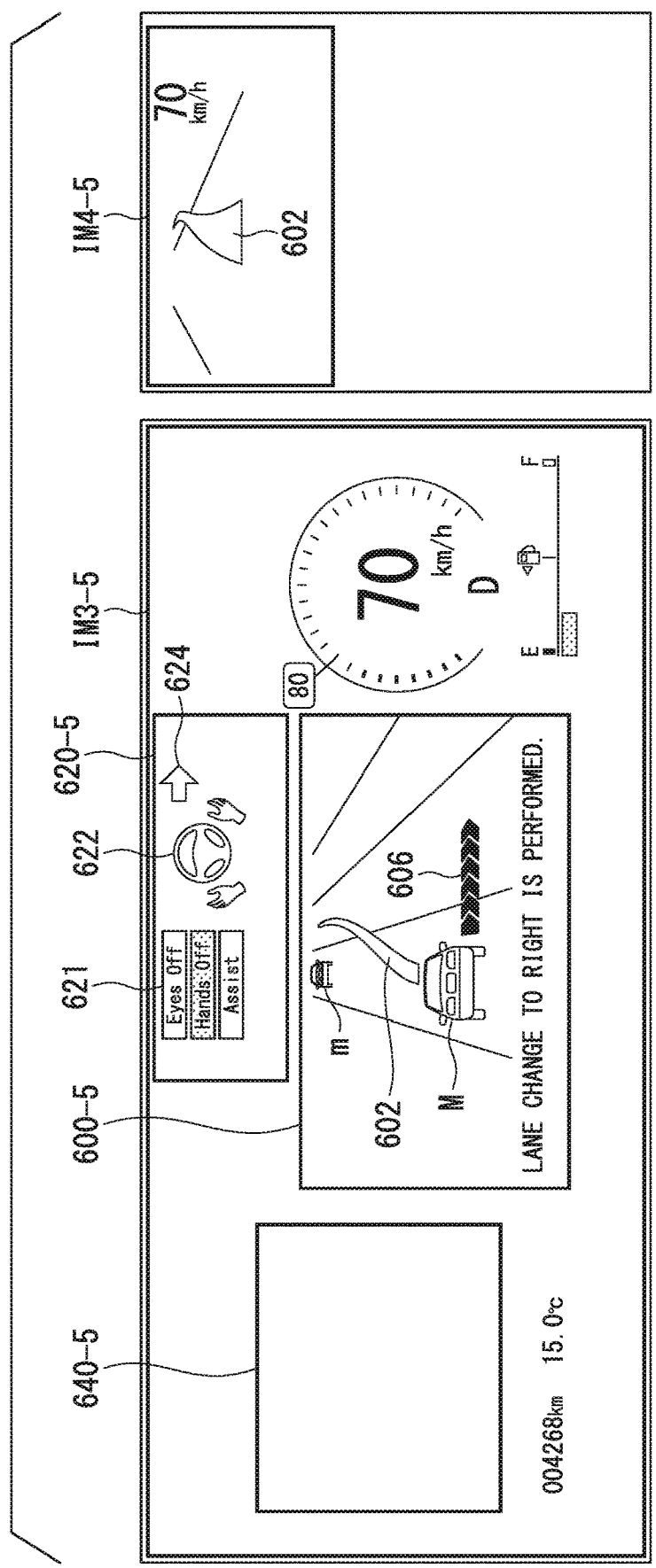
FIG. 18 is a diagram illustrating an example of a third screen and a fourth screen displayed during an execution of the lane change.

FIG. 18 is a diagram illustrating an example of a third screen IM3-5 and a fourth screen IM4-5 displayed at the second timing before the behavior of the subject vehicle M changes. The HMI control unit 120 displays an image 606 in which the image 604 is highlighted and displayed in a surroundings detection information display area 600-5 of the third screen IM3-5. For example, the HMI control unit 120 displays a display mode in which the inside of the outside frame of the image 604 is colored in the surroundings detection information display area 600-5. The HMI control unit 120 may display the outside frame of each of the plurality of areas divided in the image 604 by an animation so that the outside frames are sequentially highlighted and displayed along the course change direction of the subject vehicle M. The HMI control unit 120 may display the image 606 at the first timing and may cause the image 606 to blink at the second timing. The HMI control unit 120 may display the image 606 at the first timing and display the image 606 at the second timing in a color that is more conspicuous that a color displayed at the first timing. Therefore, the occupant can intuitively grasp the course change direction.

The HMI control unit 120 changes the future trajectory image 602 displayed in the surroundings detection information display area 600-5 to a direction corresponding to the course change direction at the timing synchronized with the second timing. Therefore, the occupant may intuitively grasp that the change of the behavior is started in the lane change of the subject vehicle M.

The HMI control unit 120 displays the same information as the fourth screen IM4-4 on the fourth screen IM4-5 of the HUD 460. The HMI control unit 120 changes the future trajectory image 602 displayed on the fourth screen IM4-5 of the HUD 460 in the direction corresponding to the course change direction at the timing synchronized with the second timing and displays the future trajectory image 602.

<Process Flow Corresponding to Scenes (1) to (3)>

Figure 19:
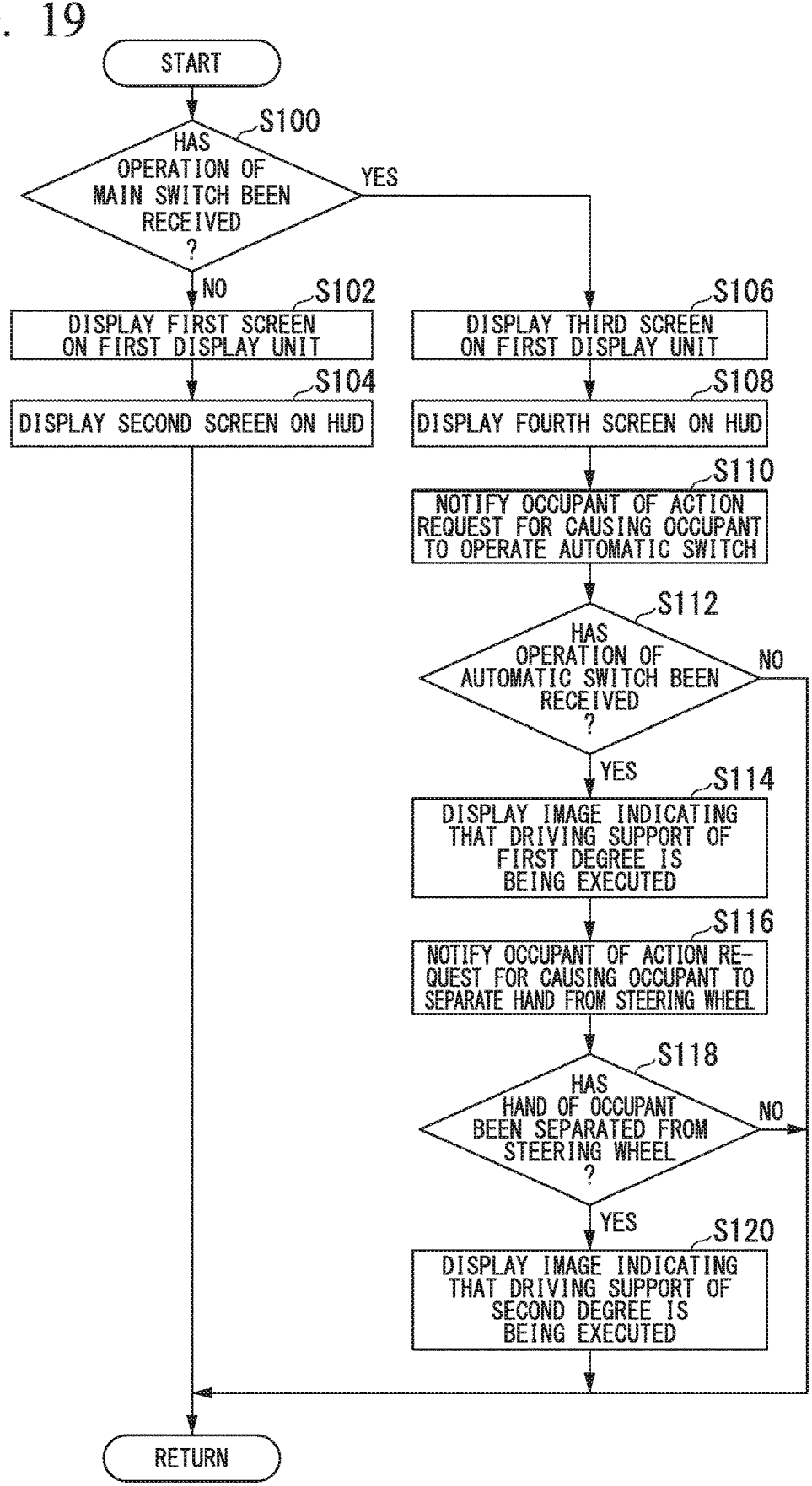
FIG. 19 is a flowchart illustrating an example of a flow of a process executed by an HMI control unit in scenes (1) to (3).

FIG. 19 is a flowchart illustrating an example of the flow of a process executed by the HMI control unit 120 in the scenes (1) to (3). First, the HMI control unit 120 determines whether or not the main switch 412 is operated (step S100). In a case where the main switch 412 is not operated, the HMI control unit 120 displays the first screen IM1-1 on the first display unit 450 of the subject vehicle M (step S102) and displays the second screen IM2-1 on the HUD 460 (step S104).

In addition, in a case where the operation of the main switch 412 is received, the HMI control unit 120 displays the third screen IM3-1 on the first display unit 450 (step S106) and displays the fourth screen IM4-1 on the HUD 460 (step S108). Details of the process of step S106 will be described later.

Next, the HMI control unit 120 notifies the occupant of the operation request for causing the occupant to operate the automatic switch (step S110). Next, the HMI control unit 120 determines whether or not the operation of the automatic switch 414 is received (step S112). In a case where the automatic switch 414 is operated, the HMI control unit 120 displays the image indicating that the driving support of the first degree is being executed on the third screen IM3-1 and the fourth screen IM4-1 (step S114). Next, the HMI control unit 120 notifies the occupant of the action request for causing the occupant to separate the hand from the steering wheel 82 (step S116).

Next, the HMI control unit 120 determines whether or not the hand of the occupant is separated from the steering wheel 82 on the basis of the determination result of the operation element state determination unit 130 (step S118). In a case where the hand of the occupant is separated from the steering wheel 82, the HMI control unit 120 displays the image indicating that the driving support of the second degree is being executed on the third screen IM3-3 (step S120). Details of the process of step S120 will be described later. Therefore, the process of the present flowchart is ended.

Figure 20:
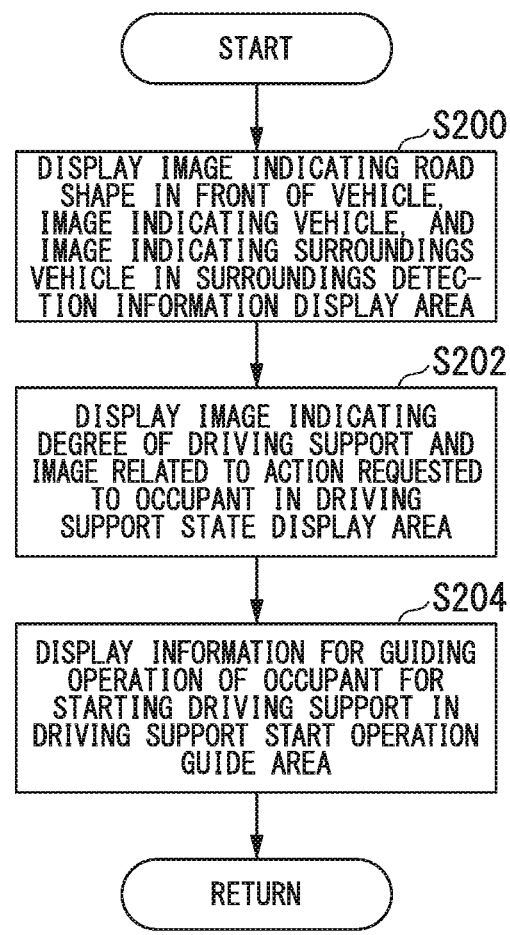
FIG. 20 is a flowchart illustrating an example of a process in which the HMI control unit displays the third screen 1M on the first display unit.

Next, the details of the process of step S106 will be described. FIG. 20 is a flowchart illustrating an example of the process in which the HMI control unit 120 displays the third screen IM3-1 on the first display unit 450. In the example of FIG. 20, the HMI control unit 120 displays the image indicating the road shape in front of the vehicle, the image indicating the vehicle, and the image indicating the surroundings vehicle, in the surroundings detection information display area 600-1 (step S200). Next, the HMI control unit 120 displays the image indicating the degree of the driving support and the image related to the action requested to the occupant, in the driving support state display area 620-1 (step S202). Next, the HMI control unit 120 displays the information for guiding the operation of the occupant for starting the driving support, in the driving support start operation guide area 640-1 (step S204). Therefore, the process of the present flowchart is ended.

Figure 21:
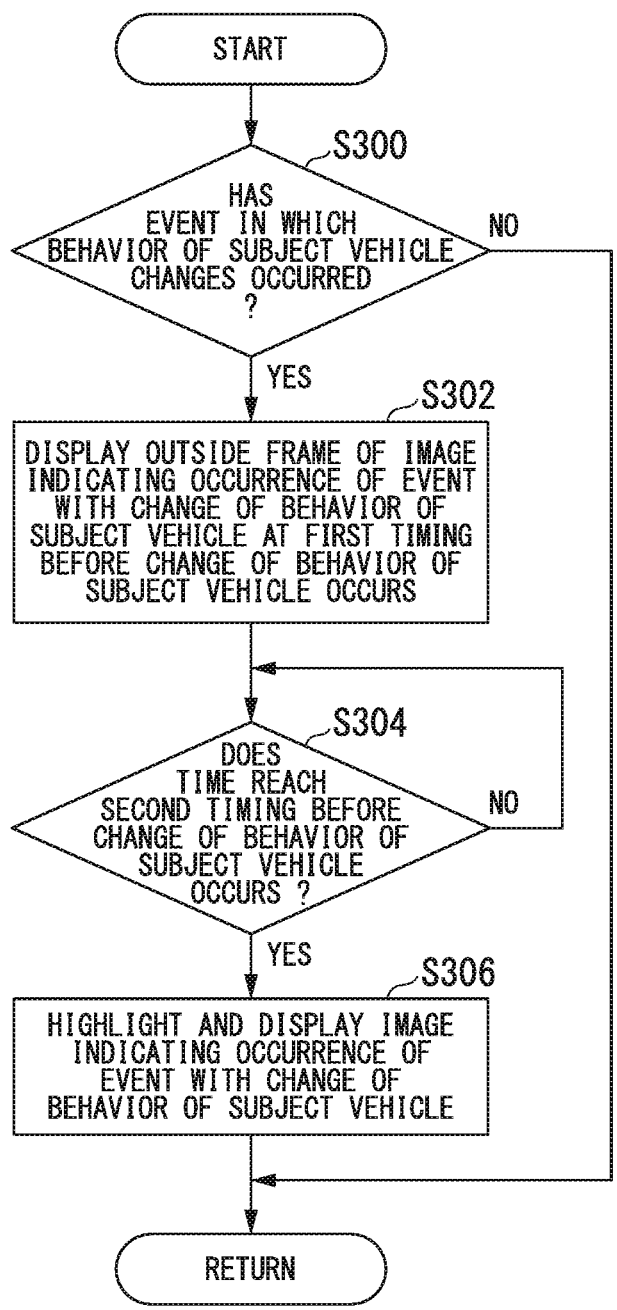
FIG. 21 is a flowchart illustrating an example of a display control process in a case where an event in which a behavior of the subject vehicle M changes occurs.

Next, a display control process in a case where an event in which the behavior of the subject vehicle M changes occurs in a state in which the image indicating that the driving support of the second degree is being executed is displayed in the process of step S120 will be described. FIG. 21 is a flowchart illustrating an example of the display control process in a case where the event in which the behavior of the subject vehicle M changes occurs. The process of FIG. 21 is repeatedly executed during the execution of the driving support of the second degree or the third degree. During execution of automatic driving, in FIG. 21, the automatic driving control unit 300 determines whether or not an event in which the behavior of the subject vehicle M is changed by the automatic driving has occurred (step S300). In a case where the event in which the behavior of the subject vehicle M changes occurs, the HMI control unit 120 displays the image indicating the occurrence of the event with the change of the behavior of the subject vehicle M at the first timing before the change of the behavior of the subject vehicle M occurs (step S302).

Next, the HMI control unit 120 determines whether or not the second timing has been reached before the change of the behavior of the subject vehicle M occurs (step S304). In a case where the time does not reach the second timing before the change of the behavior of the subject vehicle M occurs, the HMI control unit 120 waits until the time reaches the second timing, and in a case where the time reach the second timing, the HMI control unit 120 highlights and displays the image indicating the occurrence of the event with the change of the behavior of the subject vehicle M (step S306). Therefore, the process of the present flowchart is ended. It is possible to enable the occupant to grasp the timing at which the behavior of the vehicle changes by the process of FIG. 21.

Figure 22:
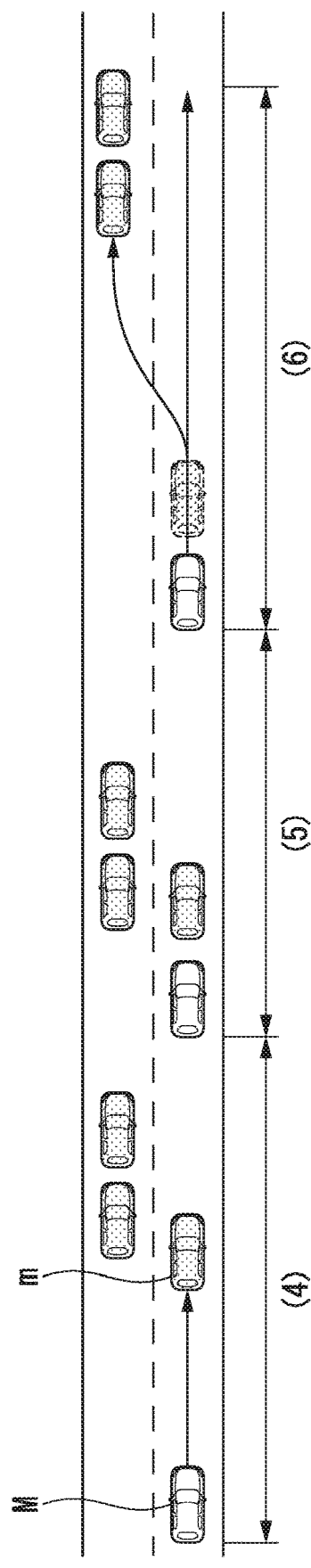
FIG. 22 is a diagram illustrating various scenes in which a driving support of a third degree is executed with respect to the subject vehicle M and then the driving support from the third degree to the second degree is executed.

Next, scenes (4) to (6) will be described. FIG. 22 is a diagram illustrating various scenes in which the driving support of the third degree is executed with respect to the subject vehicle M and then the driving support from the third degree to the second degree is executed. In an example of FIG. 22, the scene (4) is a scene in which the subject vehicle M follows the surroundings vehicle m while in a traffic jam, and thus the driving support of the subject vehicle M is switched from the second degree to the third degree. The term "follow" means, for example, traveling while maintaining a constant relative distance between the subject vehicle M and the preceding traveling vehicle (inter-vehicle distance). The scene (5) is a scene in which the subject vehicle M is executing the low speed following travel by the driving support of the third degree. The low speed following travel (a traffic jam pilot (TJP)) is a control aspect for following the preceding traveling vehicle at a predetermined speed or less. The predetermined speed is, for example, 60 [km/h] or less. The low speed following travel is activated when the speed of the subject vehicle M is equal to or less than the predetermined speed and the distance between the subject vehicle M and the preceding traveling vehicle m is within a predetermined distance (confirmation). In the low speed following travel, it is possible to realize the automatic driving with high reliability by continuously performing a relatively easy control such as following the preceding traveling vehicle on a crowded road. The activation condition of the low speed following travel may be the fact that the subject vehicle M travels at the predetermined speed or less or the subject vehicle M follows the preceding traveling vehicle m. The scene (6) is a scene in which the driving support of the subject vehicle M is switched from the third degree to the second degree. Hereinafter, display controls corresponding to each of the scenes (4) to (6) will be described.

<Scene (4)>

In the scene (4), the automatic driving control unit 300 has not yet reached low speed following traveling and performs an acceleration control of the subject vehicle M. In this case, the HMI control unit 120 displays the image corresponding to the driving support on one or both of the first display unit 450 and the HUD 460.

Figure 23:
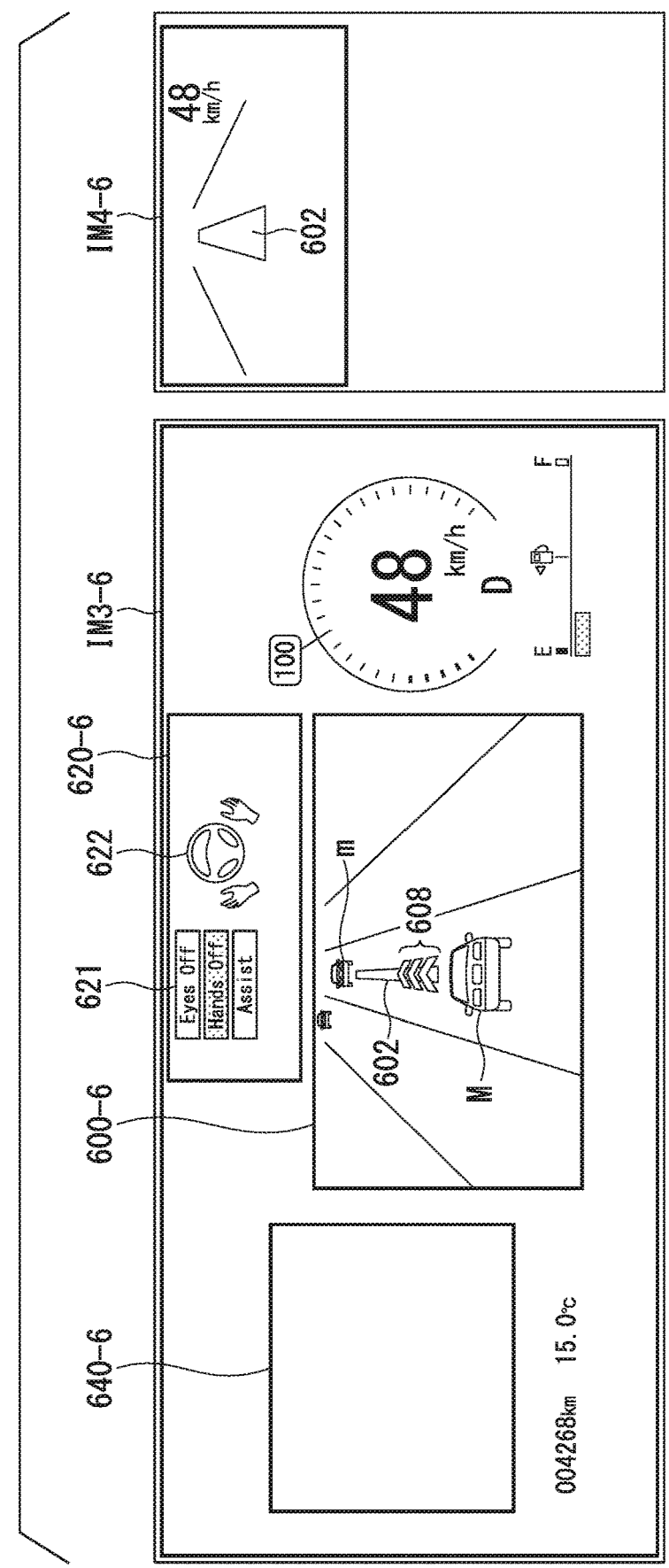
FIG. 23 is a diagram illustrating an example of a third screen and a fourth screen displayed at the time of an acceleration control of the subject vehicle.

FIG. 23 is a diagram illustrating an example of a third screen IM3-6 and a fourth screen IM4-6 displayed at the time of the acceleration control of the subject vehicle M. In the screen shown in this drawing, the activation condition of the low speed following travel is not yet satisfied. The HMI control unit 120 displays an image 608 indicating that the acceleration control is being executed in a surroundings detection information display area 600-6 of the third screen IM3-6. The image 608 is a figure indicating the acceleration of the subject vehicle M. The image 608 is displayed in front of the image indicating the subject vehicle M. In this case, the HMI control unit 120 may display the image 608 in a display mode in which an outside frame is given to the image 608 at a first timing before the subject vehicle M accelerates and display the image 608 in a display mode in which the inside of the outside frame of the image is colored at a second timing before the subject vehicle M accelerates. At the time of acceleration, the HMI control unit 120 may display an animation in which the image 608 moves in the progress direction of the subject vehicle. Conversely, at the time of a deceleration, the HMI control unit 120 may display an animation in which the image 608 moves toward the subject vehicle. Therefore, the occupant may intuitively grasp that the acceleration control of the subject vehicle M is being executed.

The HMI control unit 120 displays the same information as the fourth screen IM4-5 on the fourth screen IM4-6 of the HUD 460.

<Scene (5)>

In the scene (5), the low speed following travel is executed. In this case, the HMI control unit 120 displays a screen corresponding to the low speed following travel on the first display unit 450 and the HUD 460.

Figure 24:
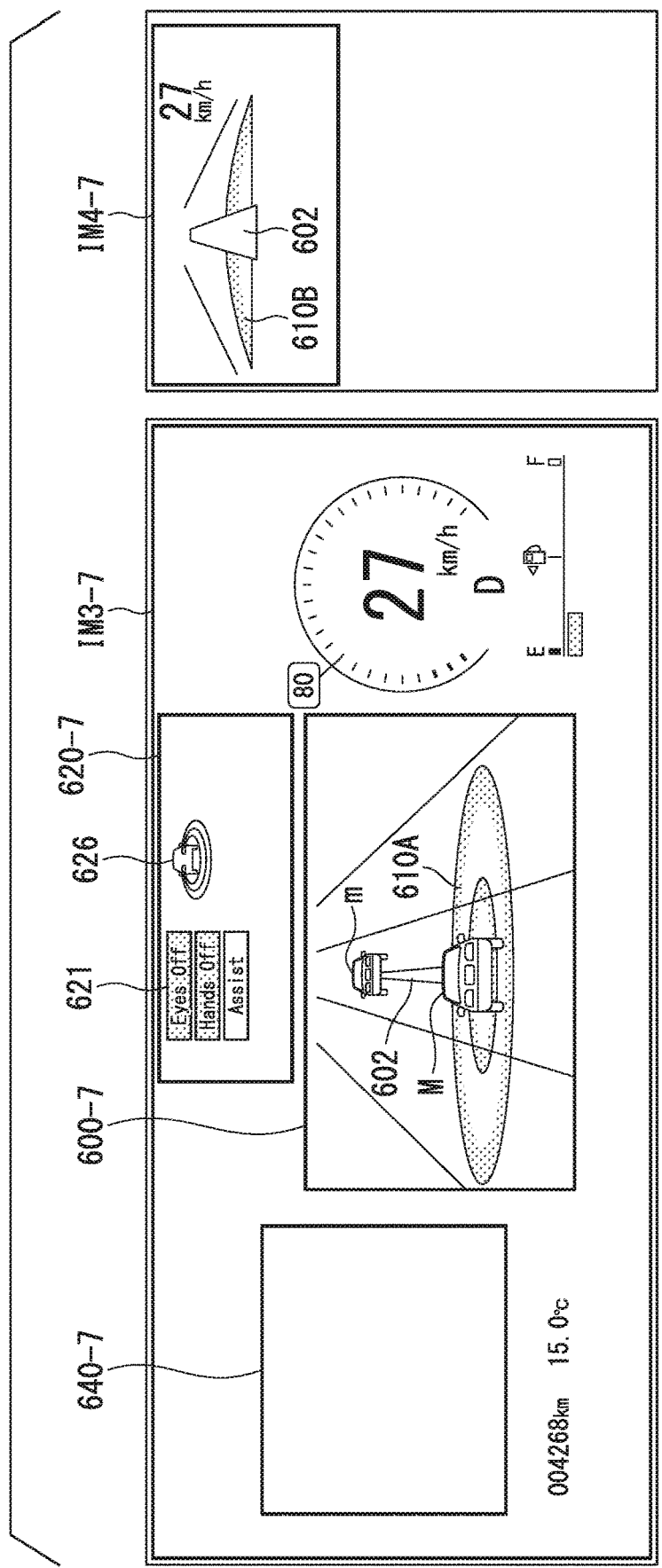
FIG. 24 is a diagram illustrating an example of a third screen and a fourth screen displayed at the time of low speed following travel M.

FIG. 24 is a diagram illustrating an example of a third screen IM3-7 and a fourth screen IM4-7 displayed at the time of the low speed following travel. The HMI control unit 120 displays a surroundings detection image 610A indicating that the driving support of the third degree is being executed in a surroundings detection information display area 600-7.

For example, the surroundings detection image 610A is an image indicating that the monitoring of the surroundings of the subject vehicle M is being performed by the camera 10, the radar device 12, the viewfinder 14, the object recognition device 16, and the outside space recognition unit 321. For example, the surroundings detection image 610A is an animation in which a ripple spreads out from the center of the subject vehicle M toward the outside.

The HMI control unit 120 highlights and displays the images of the indicator "Eyes Off" indicating that the occupant of the subject vehicle M is not in charge of the surroundings monitoring obligation and the indicator "Hands Off" indicating that the operation of the driving operation element 80 is not requested in a driving support state display area 620-7 of the third screen IM3-7. The HMI control unit 120 displays an image 626 indicating that the monitoring of the surroundings of the subject vehicle M is being performed by the camera 10, the radar device 12, the viewfinder 14, the object recognition device 16, and the outside space recognition unit 321, in a driving support state display area 620-7.

In addition to the same information as the fourth screen IM4-6, the HMI control unit 120 displays a surroundings detection image 610B indicating that the driving support of the third degree is being executed on the fourth screen IM4-7 of the HUD 460. For example, the surroundings detection image 610B is an animation in which a ripple spreads out from the center of the subject vehicle M toward the outside.

The HMI control unit 120 associates one or both of an action speed and an action period of the surroundings detection image 610A displayed on the third screen IM3-7 with the surroundings detection image 610B displayed on the fourth screen IM4-7. Therefore, the occupant may intuitively grasp that the surroundings detection image 610A displayed on the third screen IM3-7 and the surroundings detection image 610B displayed on the fourth screen IM4-7 are the same information.

The HMI control unit 120 may perform display in a display mode in which there is thinning out with respect to a display mode (a detailed display mode) of the animation in the surroundings detection image 610A displayed on the third screen IM3-7 as a display mode (a simple display mode) of the surroundings detection image 610B displayed on the fourth screen IM4-7. For example, the HMI control unit 120 sets a display mode in which one or both of the action speed and the action period of a dynamic object (an annular ripple) of the surroundings detection image 610A displayed by the detailed display mode is delayed as the simple display mode.

The HMI control unit 120 may set a display mode in which the number of the dynamic objects in the detailed display mode is reduced as the simple display mode.

The HMI control unit 120 may set the range of a view of an outside space displayed in the surroundings detection information display area 600-7 of the third screen IM3-7 in the detailed display mode and the range of a view of an outside space displayed on the fourth screen IM4-7 in the simple display mode as different from each other. The range of the view of the outside space is a range determined by the direction in which the outside space is viewed from the occupant and the degree of zooming in viewing the outside space from the occupant. For example, the size (for example, the maximum radius) of the annular dynamic object corresponds to the range of the view of the outside space in each image.

In a state in which the occupant is not in obliged to perform the surroundings monitoring, the HMI control unit 120 performs a control for notifying the occupant of usable equipment. For example, in a case where the automatic driving control unit 300 is executing the driving support of the third degree, the third display unit 470 is set to be usable. In this case, as shown in FIG. 7 or FIG. 8, the HMI control unit 120 causes the light emitting unit 470 provided in part or in the vicinity of the third display unit 472 to emit light in a predetermined color.

In a case where the third display unit 470 is usable, as shown in FIG. 9, the HMI control unit 120 may display the first display area 476 among the display areas of the screen in the third display unit 470 using one or both of a predetermined color and a predetermined shape.

In a case where it is necessary to operate the third operation unit 440 for selecting a content displayed on the third display unit 470 or the like, the HMI control unit 120 controls the light emitting unit 476 provided in the third operation unit 440 such that light of a predetermined wavelength is emitted. For example, the HMI control unit 120 causes the light emitting unit 472 and the light emitting unit 476 to emit light of the same wavelength. Therefore, the occupant may intuitively grasp the usable equipment and an operation unit of the equipment.

For example, in a case where the third operation unit 440 is operated in a state in which the third display unit 470 is usable, the HMI control unit 120 displays a screen corresponding to an operation content on the third display unit 470. In a case where the operation switch 422 of the second operation unit 420 is operated in a state in which the third display unit 470 is usable, the HMI control unit 120 displays an image of the call counterpart on the third display unit 470. Therefore, the occupant may enjoy the call while watching the counterpart displayed on the third display unit 470. That is, the occupant may use the video phone.

The HMI control unit 120 associates the image captured by the vehicle interior camera 90 and the sound of the occupant acquired by a microphone (not shown) provided in a vehicle interior, and transmits the image and the sound to a vehicle or a terminal device of the call counterpart.

For example, the imaging element included in the vehicle interior camera 90 may have a sensitivity in the wavelength range of infrared light and visible light. The vehicle interior camera 90 may include a lens filter that blocks infrared light and transmits visible light in the direction of the imaging element. Under the control of the HMI control unit 120, the lens filter is controlled to be positioned at a position where the infrared light entering the vehicle interior camera 90 is blocked (set position) or a position where the infrared light is not blocked (non-set position), by operating a mechanical mechanism. For example, in a case where the image is used in the video phone, the HMI control unit 120 controls the lens filter such that it brought to the set position, and in a case where the image is used in monitoring the occupant, the HMI control unit 120 controls the lens filter to the non-set position. Therefore, the image captured by only the visible light is used in the video phone, and the image captured by the visible light and the infrared light is used in monitoring the occupant. Thus, an image suitable for a purpose is acquired. In particular, in a case where the image is used in the video phone, an image that does not have disharmony is transmitted to a device of the call counterpart or the like.

In the subject vehicle M, instead of the vehicle interior camera 90, a camera dedicated to a video phone may be provided. In this case, the HMI control unit 120 associates the image captured by the camera dedicated to the video phone and the sound acquired by the microphone and transmits the image and the sound to the vehicle or the terminal device of the call counterpart.

<Scene (6)>

In the scene (6), since a preceding traveling vehicle m being followed at low speed is not present, the automatic driving control unit 300 switches the subject vehicle M from the driving support of the third degree to the driving support of the second degree. In this case, as shown in FIG. 25, on the basis of the change of the degree of the driving support, the HMI control unit 120 displays information suggesting a monitoring target or an operation target of the occupant requested to the occupant on one or both of the first display unit 450 and the HUD 460.

Figure 25:
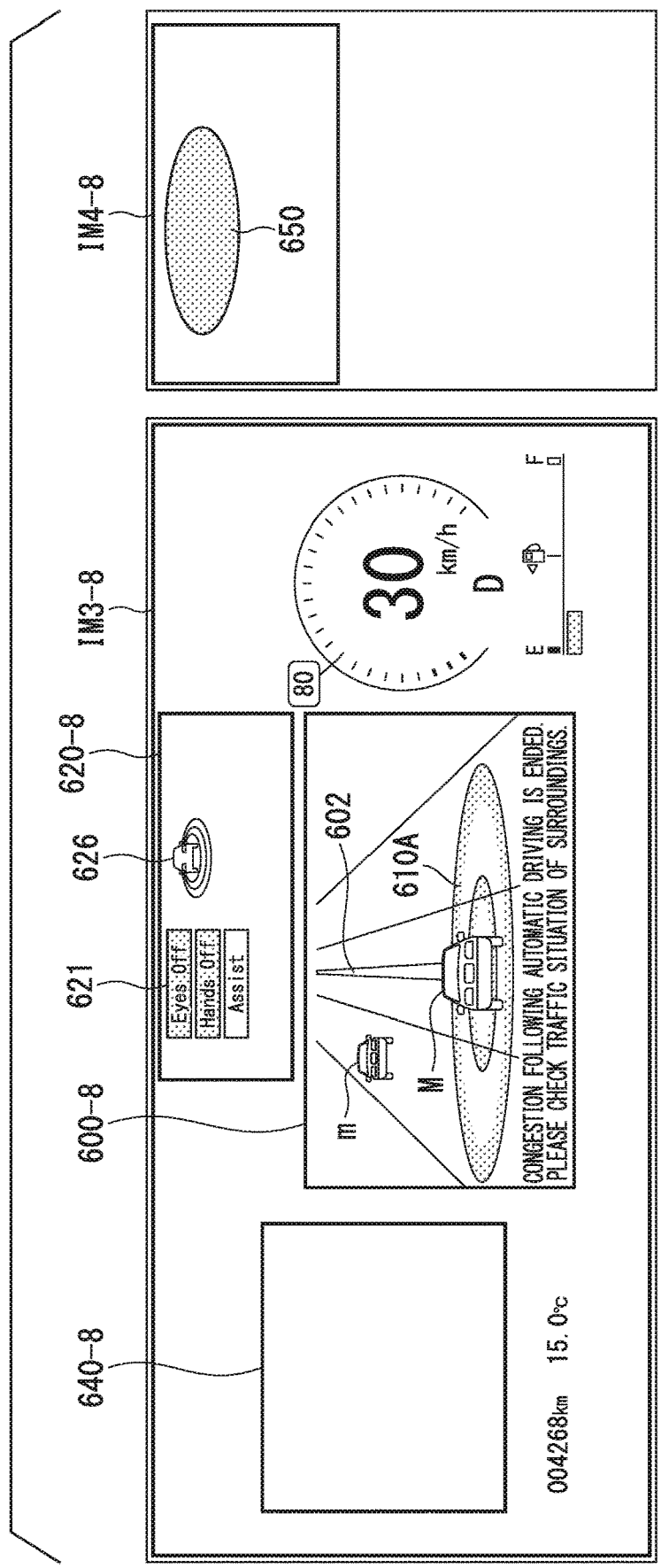
FIG. 25 is a diagram illustrating an example of a third screen and a fourth screen displayed for requesting the occupant to perform surroundings monitoring.

FIG. 25 is a diagram illustrating an example of a third screen IM3-8 and a fourth screen IM4-8 displayed for requesting the occupant to perform the surroundings monitoring. The HMI control unit 120 displays information indicating that the low speed following travel (in the drawing, "congestion following automatic driving") is ended and information for causing the occupant to check the traffic situation of the surroundings, in a surroundings detection information display area 600-8.

The HMI control unit 120 displays a forward line of sight request image 650 for requesting the line of sight of the occupant to be in front of the subject vehicle M on the fourth screen IM4-8. The front line of sight request image 650 is an image including an elliptical area indicating a predetermined area in front of the vehicle M. The front line of sight request image 650 may be a predetermined shape such as a circle or a quadrangle, or may be information such as a mark or a character for calling the attention of the occupant. The HMI control unit 120 may light up the forward line of sight request image 650 or cause the forward line of sight request image 650 to blink in a predetermined color. The HMI control unit 120 may rush the front line of sight to the occupant by causing the LED incorporated in the instrument panel to light and the light emission of the LED to be reflected in the front windshield.

Figure 26:
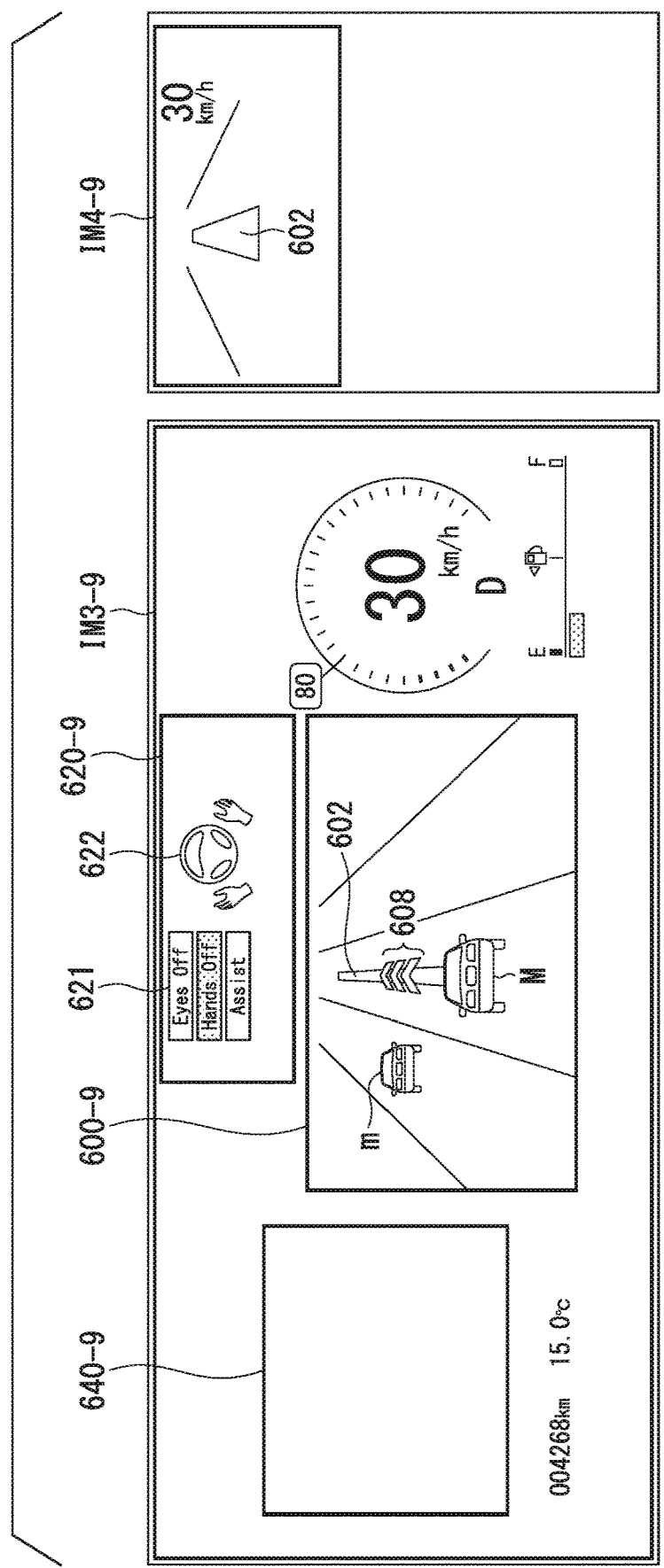
FIG. 26 is a diagram illustrating an example of a third screen and a fourth screen displayed in a case where the driving support is switched from the third degree to the second degree.

The occupant state monitoring unit 140 determines whether or not the occupant is performing the surroundings monitoring by the captured image of the vehicle interior camera 90. In a case where it is determined that the occupant is performing the surroundings monitoring, the switching control unit 110 causes the automatic driving control unit 300 to switch the driving support of the subject vehicle M from the third degree to the second degree. As shown in FIG. 26, the HMI control unit 120 displays an image corresponding to the driving support by the second degree on one or both of the first display unit 450 and the HUD 460.

FIG. 26 is a diagram illustrating an example of a third screen IM3-9 and a fourth screen IM4-9 displayed in a case where the driving support is switched from the third degree to the second degree. In the example of FIG. 26, the subject vehicle M accelerates to a target speed (for example, 80 [km/h]) set by the action plan generation unit 323 by the driving support of the second degree. For example, the HMI control unit 120 displays an image 608 indicating that the acceleration control is being executed in a surroundings detection information display area 600-9 of the third screen IM3-9.

The HMI control unit 120 highlights and displays the indicator for "Hands Off" corresponding to the driving support of the second degree of the subject vehicle M in a driving support state display area 620-9 of the third screen IM3-9. The HMI control unit 120 displays the requested action notification image 622 indicating the operation content of the occupant corresponding to the driving support of the second degree in the driving support state display area 620-9. Therefore, the occupant may intuitively grasp that the driving support of the subject vehicle M is switched from the third degree to the second degree.

<Process Flow Corresponding to Scenes (4) to (6)>

Figure 27:
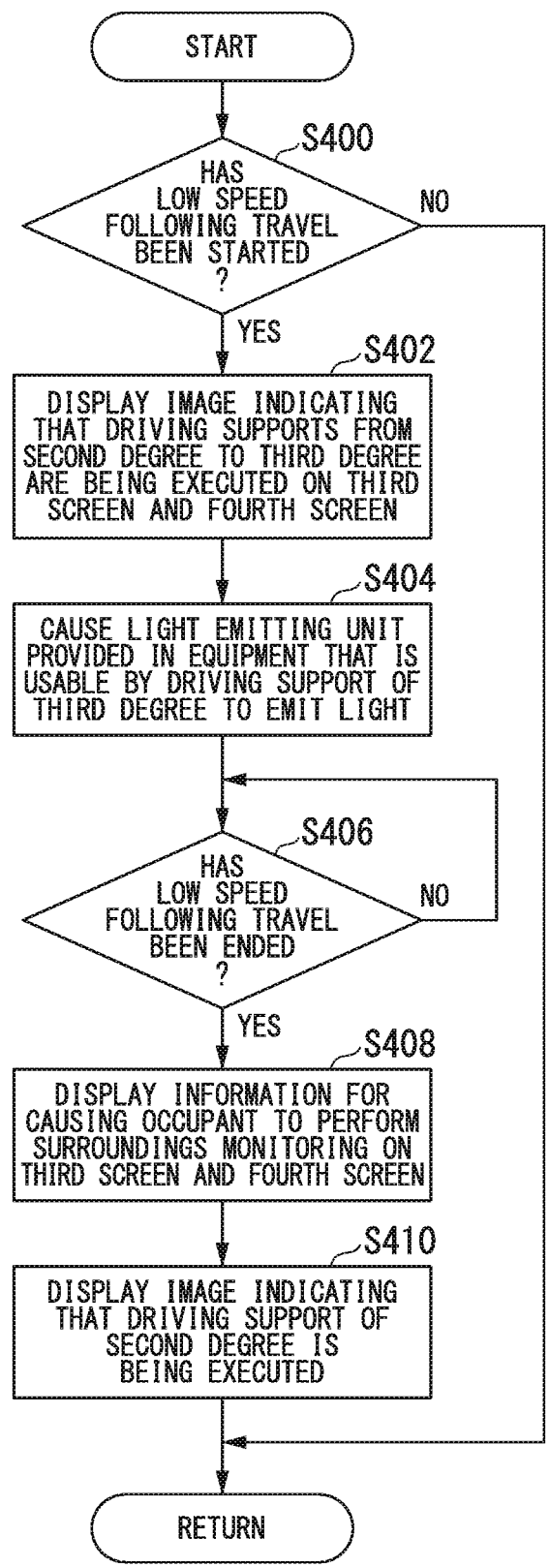
FIG. 27 is a flowchart illustrating an example of a flow of a process executed by the HMI control unit in scenes (4) to (6).

FIG. 27 is a flowchart illustrating an example of the flow of a process executed by the HMI control unit 120 in the scenes (4) to (6). First, the HMI control unit 120 determines whether or not the automatic driving control unit 300 starts the low speed following travel (step S400). In a case where the low speed following travel is started, the HMI control unit 120 displays the image indicating that the driving support of the third degree is being executed on a third screen IM3 and a fourth screen IM4 (step S402). Next, the HMI control unit 120 causes a light emitting unit provided in equipment that is usable by the driving support of the third degree to emit light (step S404).

Next, the HMI control unit 120 determines whether or not the automatic driving control unit 300 ends the low speed following travel of the subject vehicle (step S406). In a case where the low speed following travel is not ended, the image display and the light emission of the light emitting unit are continued by the processes of steps S402 and S404. That is, in the process of step S404, while the equipment is usable, the HMI control unit 120 continues the light emission of the light emitting unit provided in the equipment.

In a case where the low speed following travel is ended, the HMI control unit 120 displays the information for causing the occupant to perform the surroundings monitoring on the third screen IM3 and the fourth screen IM4 (step S408). Next, the HMI control unit 120 displays the image indicating that the driving support of the second degree is being executed (step S410). Therefore, the process of the present flowchart is ended.

As shown in the scenes (4) to (6), in a case where the vehicle has not stopped or in a case where the degree of the driving support is not the third degree, the HMI control unit 120 implements a use restriction on a specific function that causes the line of sight of the occupant to is removed from the surroundings of the vehicle by a use of the specific function. In a case where the vehicle is stopped or in a case where the degree of the driving support is third degree, the HMI control unit 120 releases the use restriction on the specific function. The specific function includes, for example, a video phone function, and is a function of displaying a content that is not related to the control or the travel of the subject vehicle M on the third display unit 470. The content that is not related to the control or the travel of the subject vehicle M is, for example, an image stored in a DVD watched by the occupant as entertainment, an image transmitted from a broadcasting station (an image of a television), an image indicating the call counterpart in a video phone, and the like.

FIG. 28 is a flowchart illustrating a flow of an execution process of the specific function by the HMI control unit 120. In the process of the present flowchart, the specific function is the video phone function. The video phone function is a function of transmitting and receiving an image (a real time image) and a sound to perform a call while viewing an image indicating the call counterpart. The image of the call counterpart is displayed on the third display unit 470. The HMI control unit 120 controls the communication device 20 to establish communication with a communication device of the call counterpart, thereby realizing the video phone function by transmitting and receiving information including the image and the sound.

First, the HMI control unit 120 determines whether or not the subject vehicle M is stopped on the basis of the information acquired from the driving support control unit 200 and the automatic driving control unit 300 (step S500). In a case where the subject vehicle M is stopped, the HMI control unit 120 releases the use restriction on the video phone function (step S502). Therefore, the occupant may use the video phone function.

In a case where the subject vehicle M is not stopped, the HMI control unit 120 determines whether or not the subject vehicle M is performing the low speed following travel on the basis of the information acquired from the automatic driving control unit 300 (step S504). In a case where the subject vehicle M is performing the low speed following travel, the HMI control unit 120 releases the use restriction on the video phone function (step S502). Therefore, the occupant may use the video phone function.

In a case where the subject vehicle is not stopped and does not perform the low speed following travel, the HMI control unit 120 permits a use of only a sound (step S506). Therefore, a process of one routine of the present flowchart is ended.

FIGS. 29A and 29B are diagrams illustrating an example of a manner in which the image displayed on the third display unit 470 changes by the degree of the driving support. As shown in FIG. 29A, for example, in a case where the driving support of the third degree is being executed, the image of the call counterpart is displayed on the third display unit 470 and the sound of the call counterpart is output from the speaker. Therefore, the occupant may use the video phone function. As shown in FIG. 29B, for example, in a case where the driving support transitions from the driving support of the third degree to the driving support of another degree or the manual driving, the image of the call counterpart displayed on the third display unit 470 is stopped and only the sound of the call counterpart is output from the speaker. Therefore, the occupant may monitor the surroundings of the subject vehicle M.

As described above, in a case where the driving support transits to the third degree and the occupant of the subject vehicle M is not requested to perform the surroundings monitoring (in a case of reaching a time T4 in FIG. 37 that will be described later), the HMI control unit 120 may release the use restriction on the specific function to more appropriately control the specific function.

Figure 30:
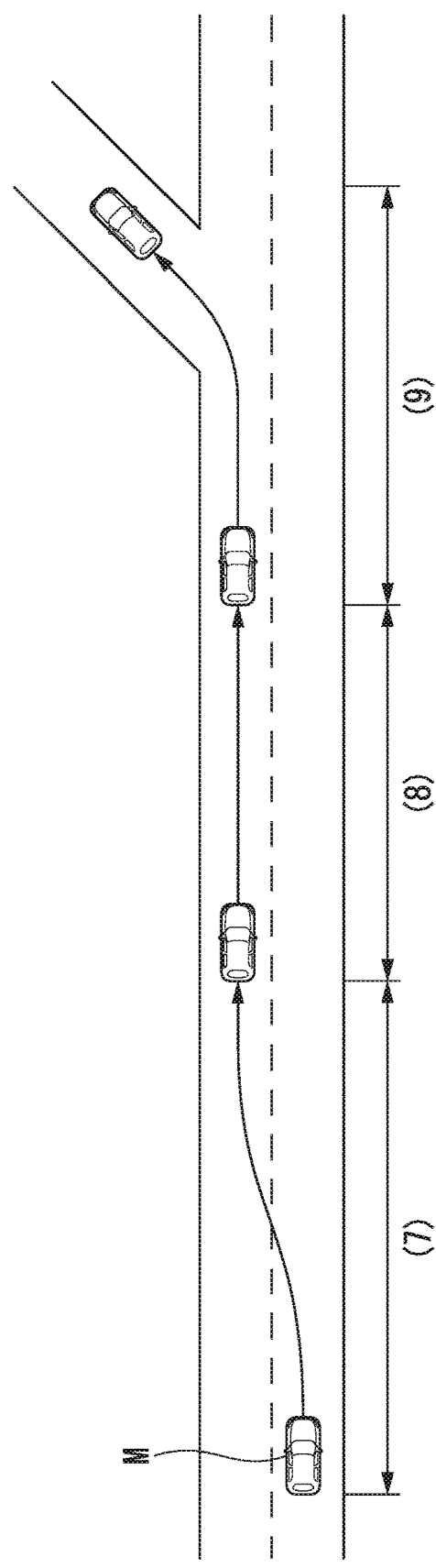
FIG. 30 is a diagram illustrating various scenes in which the subject vehicle M is switched from the driving support of the second degree to a travel by manual driving.

Next, scenes (7) to (9) will be described. FIG. 30 is a diagram illustrating various scenes in which the subject vehicle M is switched from the driving support of the second degree to the travel by the manual driving. In an example of FIG. 30, the scene (7) is a scene in which the subject vehicle M performs the lane change for leaving an expressway based on the action plan. The scene (8) is a scene in which the subject vehicle M switches from the automatic driving to the manual driving. The scene (9) is a scene in which the subject vehicle M moves from the expressway to the general road by the manual driving. Hereinafter, display controls corresponding to each of the scenes (7) to (9) will be described.

<Scene (7)>

In the scene (7), the automatic driving control unit 300 executes driving support for the subject vehicle M performing lane change to the left side. In this case, the HMI control unit 120 displays the image corresponding to the driving support on one or both of the first display unit 450 and the HUD 460. For a display example at the time of the start or execution of the lane change, since the same display is performed as when substituting the content of the lane change to the right lane of the subject vehicle M shown in FIG. 17 and FIG. 18 with the lane change to the left lane, a detailed description thereof will be omitted.

<Scene (8)>

In the scene (8), the automatic driving control unit 300 performs a control for switching the subject vehicle M to the manual driving. In this case, the HMI control unit 120 displays the image for causing the occupant to execute the manual driving on one or both of the first display unit 450 and the HUD 460.

Figure 31:
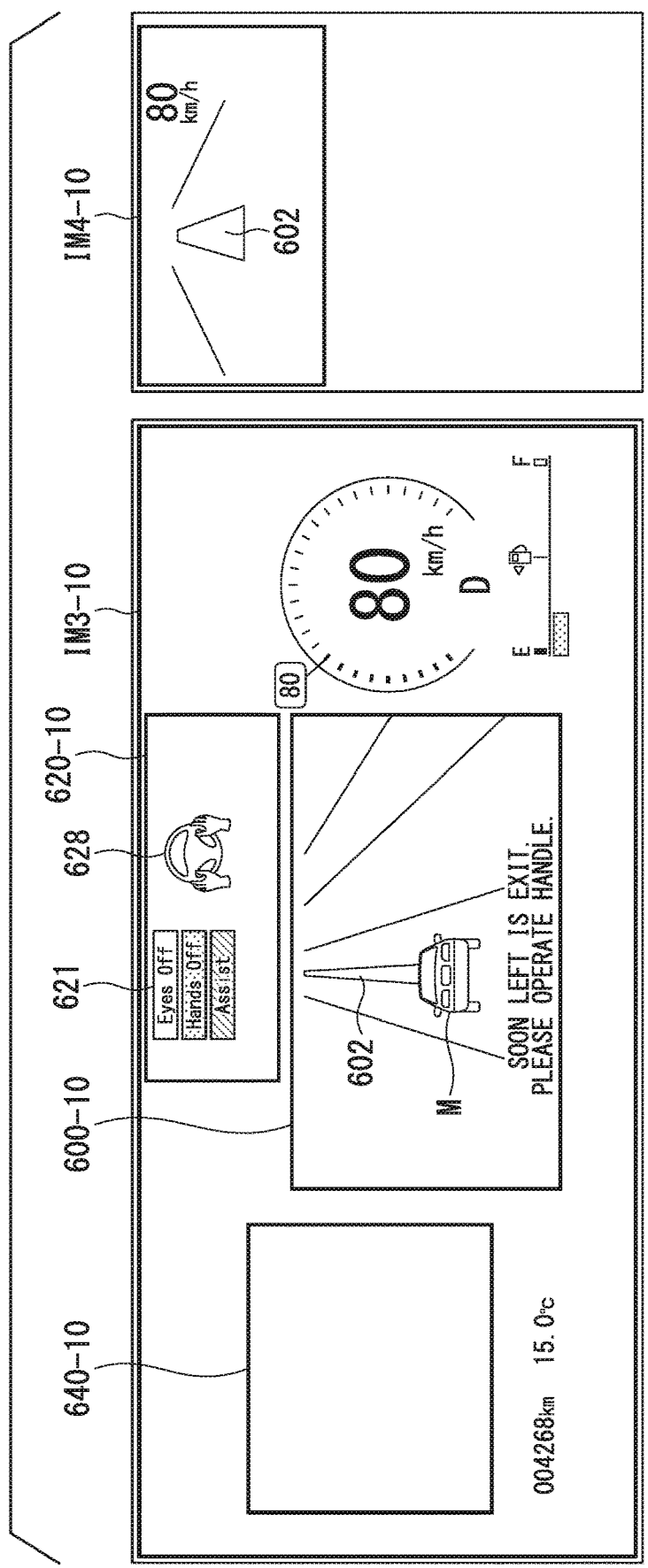
FIG. 31 is a diagram illustrating an example of a third screen 1M and a fourth screen IM displayed at the time of a request for switching the subject vehicle to manual driving.

FIG. 31 is a diagram illustrating an example of a third screen IM3-10 and a fourth screen IM4-10 displayed at the time of the request for switching the subject vehicle to the manual driving. Since an exit of the expressway is approaching, the HMI control unit 120 displays a requested action notification image 628 for requesting the occupant to perform the operation of the steering wheel 82 in a surroundings detection information display area 600-10 of the third screen IM3-10. The HMI control unit 120 may display an animation in which the image indicating the hand of the occupant is approaching to the image indicating the steering wheel 82 as the requested action notification image 628.

The HMI control unit 120 highlights and displays the indicator for "Hands Off" corresponding to the driving support of the second degree and the image of "Assist" corresponding to the driving support of the first degree in a driving support state display area 620-10 of the third screen IM3-10.

Here, the HMI control unit 120 determines whether or not the occupant is gripping the steering wheel 82 on the basis of the determination result of the operation element state determination unit 130. In a case where it is determined that the occupant has not gripped the steering wheel 82 continuously for a predetermined time by the operation element state determination unit 130, the HMI control unit 120 displays an image for intensifying the warning in stages and for causing the occupant to execute the manual driving on one or both of the first display unit 450 and the HUD 460.

Figure 32:
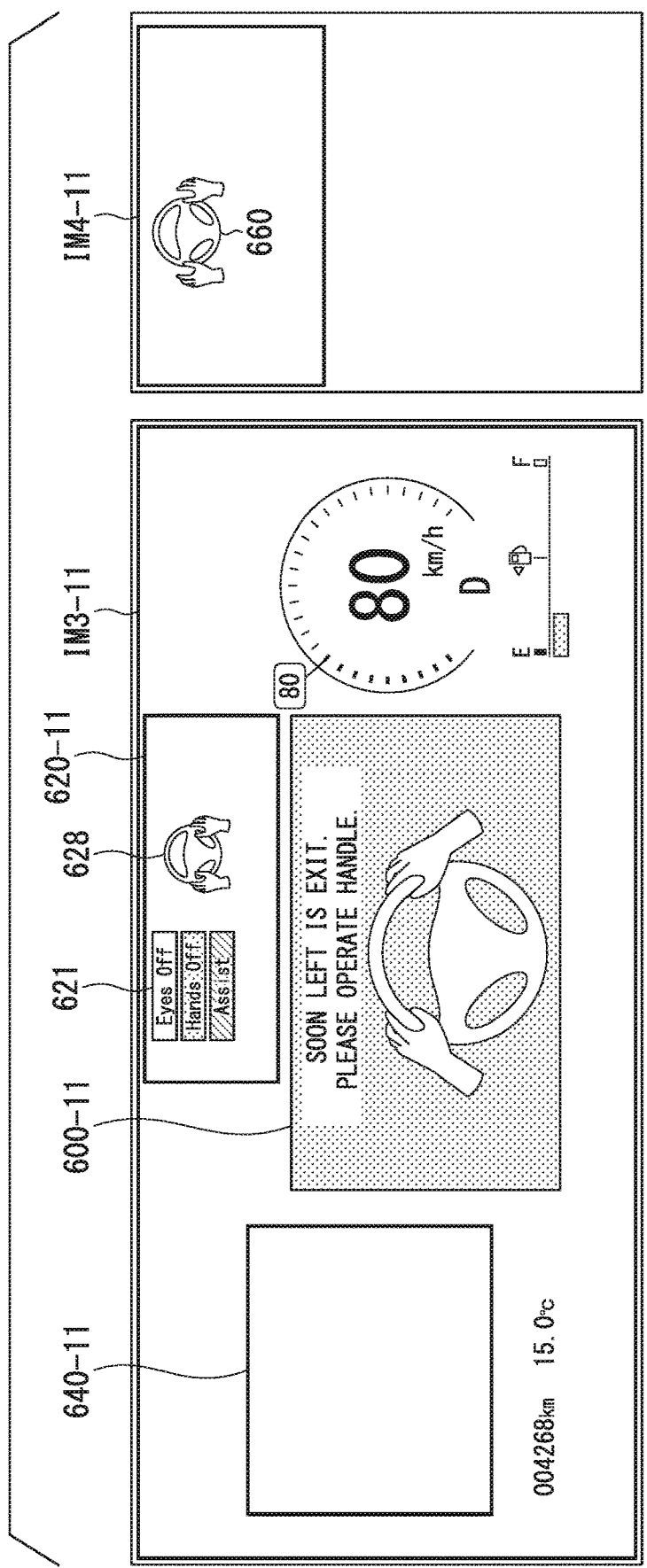
FIG. 32 is a diagram illustrating an example of a third screen 1M and a fourth screen IM in which a warning is intensified for causing the occupant to execute manual driving.

FIG. 32 is a diagram illustrating an example of a third screen IM3-11 and a fourth screen IM4-11 in which the warning is intensified for causing the occupant to execute the manual driving. For example, the HMI control unit 120 displays information implying a monitoring target or an operation target of the occupant requested to the occupant in a more emphasizing manner over the display of the surroundings situation of the subject vehicle M in a driving support state display area 600-11 of the third screen IM3-11. Specifically, instead of the image indicating the road shape in front of the subject vehicle M, the image indicating the subject vehicle M, and the image indicating the future trajectory of the subject vehicle M, the HMI control unit 120 superimposes and displays information indicating that the occupant operates the steering wheel 82 in the driving support state display area 600-11 of the third screen IM3-11.

The HMI control unit 120 displays a requested action notification image 660 that schematically showing a positional relationship between the steering wheel 82 and the hand of the occupant on the fourth screen IM4-11. The HMI control unit 120 may display an animation in which the image indicating the hand of the occupant approaches and grips the image indicating the steering wheel 82 as the requested action notification image 660. The HMI control unit 120 may issue a warning by a sound or the like to cause the occupant to grip the steering wheel 82.

The HMI control unit 120 causes the light emitting units 430R and 430L provided in the steering wheel 82 to emit light, blink, or stop the light emission so as to cause the occupant to grip the steering wheel 82. Therefore, the occupant may easily recognize the content requested to the occupant according to the change of the degree of the driving support.

For example, in a case where the occupant is requested to grip the steering wheel 82 in a state in which the light emitting units 430R and 430L are caused to emit light and blink according to the degree of the driving support of the subject vehicle M, the HMI control unit 120 causes the light emission state of the light emitting units 430R and 430L to be different from the current light emission state. For example, the HMI control unit 120 causes at least one of the light emission, blinking, a light emission color, and a light emission luminance of the light emitting units 430R and 430L to be different from the current light emission state.

In a case where the degree of the driving support changes to a degree lower than the degree of the current driving support, the HMI control unit 120 causes the light emitting units 430R and 430L to emit light, blink, or stop the light emission. Therefore, it is possible to notify the occupant that the driving support is a driving support in which it is highly necessary to grip the steering wheel 82.

In a case where it is determined that the occupant is not gripping the steering wheel 82 continuously for a predetermined time by the operation element state determination unit 130, the HMI control unit 120 may output a sound through the speaker for intensifying the warning in stages. The HMI control unit 120 may operate a vibration unit that vibrates the seat or the seat belt so as to issue a warning by intensifying the vibration of the seat or the seat belt in stages.

Figure 33:
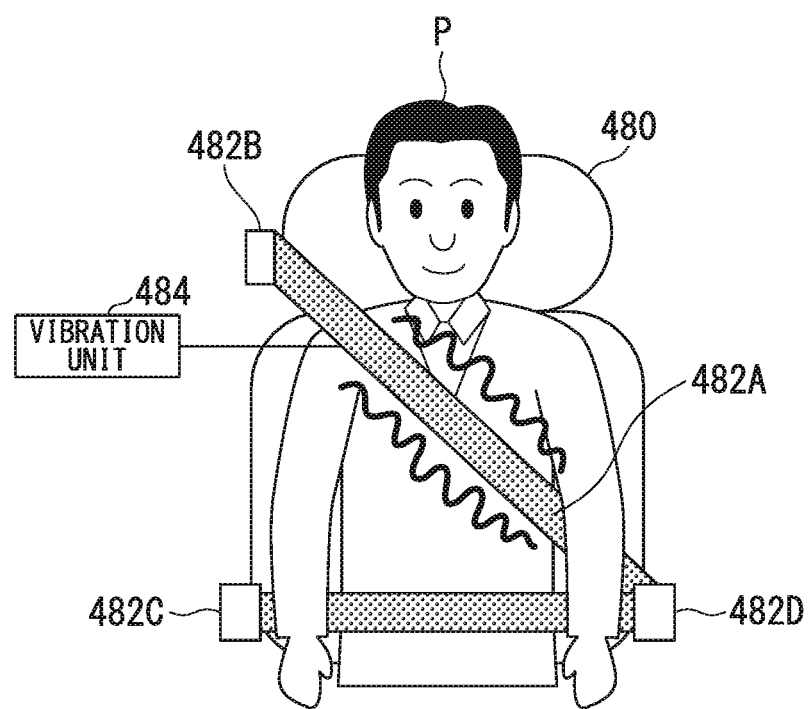
FIG. 33 is a diagram illustrating issuing a warning to the occupant by vibrating a seat belt.

FIG. 33 is a diagram illustrating issuing a warning to the occupant by vibrating the seat belt. In FIG. 31, for example, a seat 480 of the subject vehicle M, a seat belt device 482, and a vibration unit 484 are provided. The seat belt device 482 is a so-called three-point seat belt device. For example, the seat belt device 482 may include a seat belt 482A, a winding portion 482B for winding up the seat belt 482A, an anchor 482C for fixing the seat belt 482A at a predetermined position on the seat 480, and a buckle 482D detachable from a tongue provided on the seat belt 482A. The vibration unit 484 vibrates the seat belt at predetermined time intervals and with a predetermined strength under control of the HMI control unit 120.

The HMI control unit 120 operates the vibration unit 484 at the timing for causing the occupant to grip the steering wheel 82. Therefore, the occupant may intuitively grasp that the manual driving is started by gripping the steering wheel 82.

Figure 34:
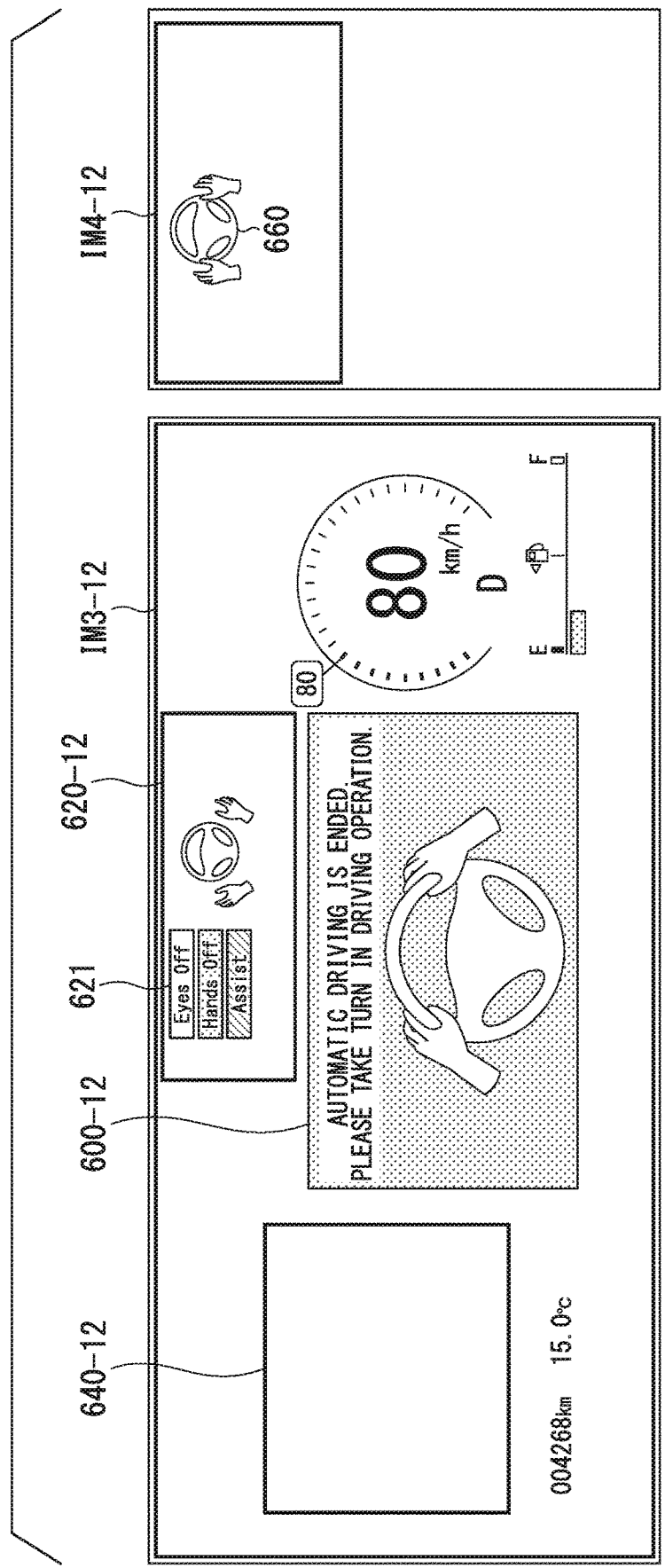
FIG. 34 is a diagram illustrating an example of a third screen and a fourth screen that display information indicating that automatic driving has ended.

In a case where it is determined that the occupant does not grip the steering wheel 82 even a predetermined time has elapsed after the HMI control unit 120 performs the display shown in FIG. 32, by the operation element state determination unit 130, the HMI control unit 120 displays a screen for indicating that the driving support (for example, the automatic driving) is ended as shown in FIG. 34.

FIG. 34 is a diagram illustrating an example of a third screen IM3-12 and a fourth screen IM4-12 that display information indicating that the automatic driving is ended. The HMI control unit 120 displays information for rushing a change of the driving operation for ending the automatic driving so that the information is superimposed on the image indicating the road shape in front of the subject vehicle M, the image indicating the subject vehicle M, and the image indicating the future trajectory of the subject vehicle M, in a driving support state display area 600-12 of the third screen IM3-12. The HMI control unit 120 highlights and displays the indicator for "Hands Off" in a driving support state display area 620-12 of the third screen IM3-12, but the indicator for "Hands Off" may be highlighted and displayed in a color or the like different from that of the highlighted and displayed image shown in FIG. 29.

The HMI control unit 120 displays the requested action notification image 660 that schematically shows the positional relationship between the steering wheel 82 and the hand of the occupant on the fourth screen IM4-12. The HMI control unit 120 may issue a warning using sound or the like which is stronger than in the display on the third screen IM3-11 and the fourth screen IM4-12 shown in FIG. 30 to prompt the occupant to grip the steering wheel 82. For causing the occupant to grip the steering wheel 82, the HMI control unit 120 may cause the light emitting units 430R and 430L to light or to blink. For example, the HMI control unit 120 causes the light emitting units 430R and 430L to light or to blink by shortening the blinking period or causing the light emitting units 430R and 430L to emit light of a plurality of wavelengths in order to intensify the warning.

For example, the HMI control unit 120 may operate the vibration unit 484 at the timing at which the HMI control unit 120 displays the third screen IM3-12 on the first display unit 450 and displays the fourth screen IM4-12 on the HUD 460 to vibrate the seat belt 482A. In this case, the HMI control unit 120 may operate the vibration unit 484 so that the vibration is stronger than the vibration of the seat belt 482A when the images are displayed on the third screen IM3-11 and the fourth screen IM4-11. Therefore, the occupant may intuitively grasp that the automatic driving is ended.

In a case where the operation element state determination unit 130 determines that the occupant does not grip the steering wheel 82 even if a predetermined time has elapsed after the HMI control unit 120 performs the display shown in FIG. 32, the master control unit 100 causes the automatic driving control unit 300 to execute the automatic driving for emergently stopping the subject vehicle M at a predetermined position (for example, a shoulder or a nearest parking area). In this case, as shown in FIG. 35, the HMI control unit 120 displays a screen indicating that the emergency stop of the subject vehicle M is executed by the automatic driving on a third screen IM3-13.

Figure 35:
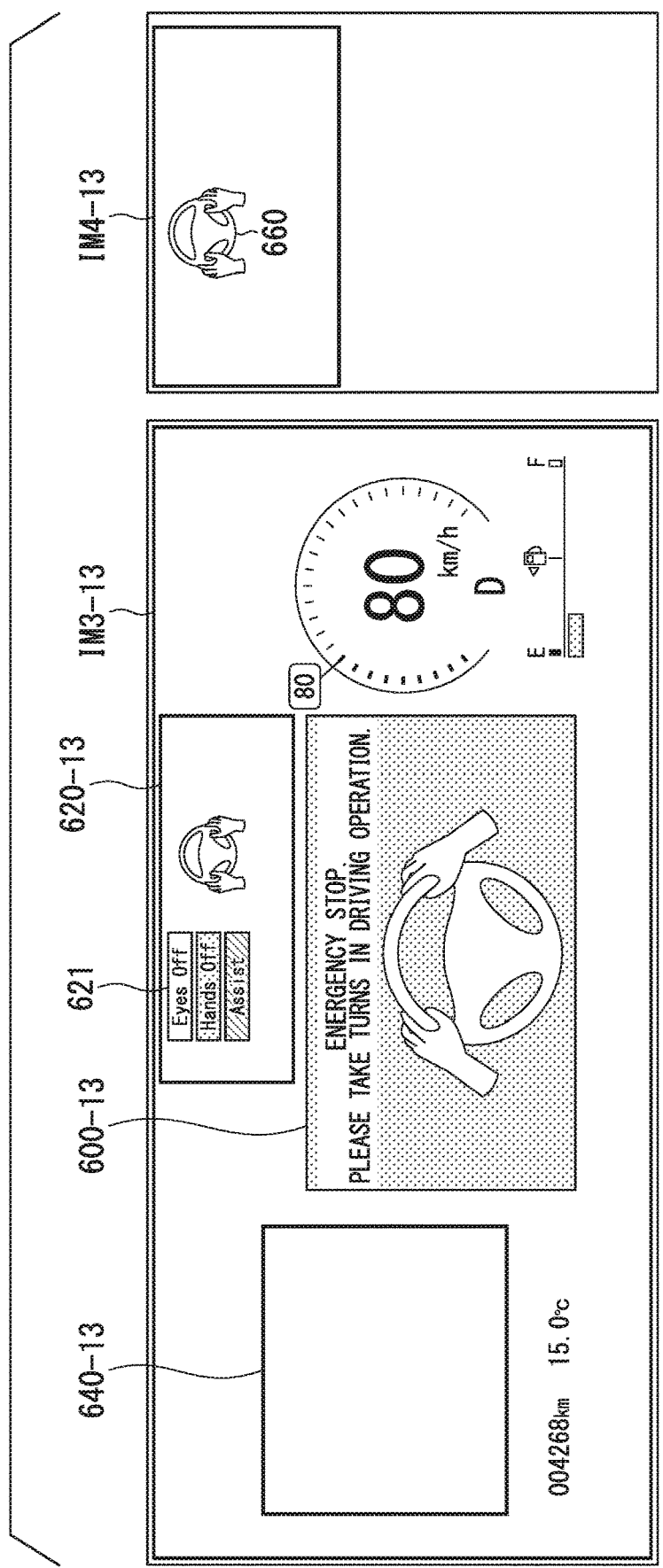
FIG. 35 is a diagram illustrating an example of a third screen and a fourth screen IM at the time of an emergency stop of the subject vehicle M.

FIG. 35 is a diagram illustrating an example of a third screen IM3-13 and a fourth screen IM4-13 at the time of the emergency stop of the subject vehicle M. The HMI control unit 120 displays information indicating that an emergency stop is to be performed in a driving support state display area 600-13 of the third screen IM3-13. A notification of an aspect of the third screen IM3-13 is a stronger warning than notifications of aspects of the third screens IM3-10 to IM3-12.

<Scene (9)>

In the scene (9), the occupant receives an instruction for causing the occupant to grip the steering wheel 82, the occupant grip the steering wheel 82 until the driving support is ended, the manual driving is started, and the subject vehicle M enters the general road from the expressway. The switching control unit 110 switches the driving state of the subject vehicle M to a state in which the occupant performs manual driving of the subject vehicle M. The HMI control unit 120 displays the first screen IM1-1 on the first display unit 450 and displays the second screen IM1-2 on the HUD 460.

<Process Flow Corresponding to Scene (7) to (9)>

Figure 36:
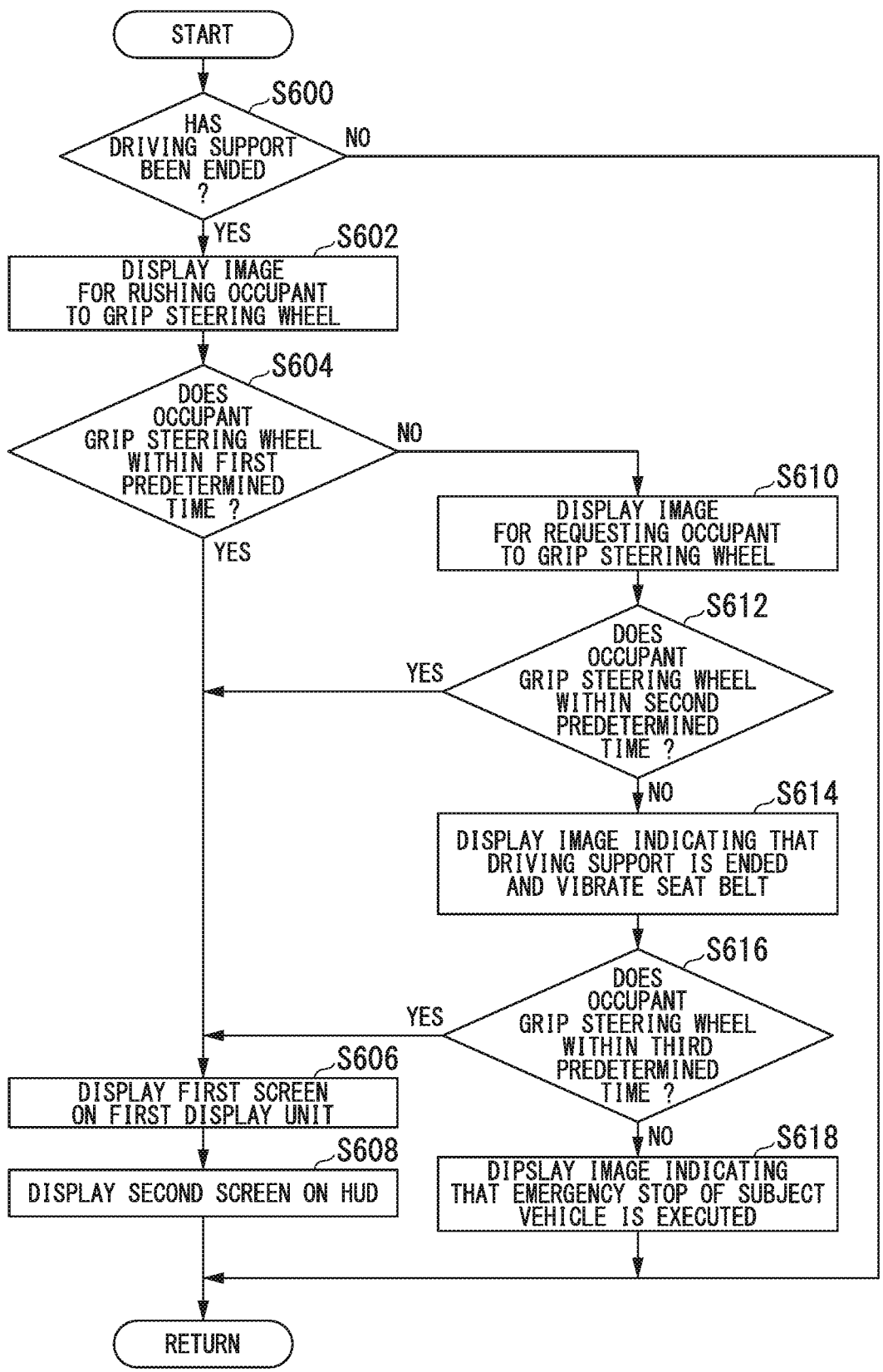
FIG. 36 is a flowchart illustrating an example of a flow of a process executed by the HMI control unit in scenes (7) to (9).

FIG. 36 is a flowchart illustrating an example of a flow of a process executed by the HMI control unit 120 in the scenes (7) to (9). In the present process, as described above, when the automatic driving is being executed, the HMI control unit 120 notifies the occupant of the subject vehicle M of requesting a predetermined action (for example, the grip of the steering wheel 82). In addition, as time passes by after a start of the notification, the HMI control unit 120 changes a notification mode so that the notification is emphasized in stages and outputs the notification to an output unit. The output unit is a display unit that displays an image, a speaker that outputs a sound, or the like. In the present process, the predetermined action is the grip of the steering wheel 82 as an example, but, instead of (in addition to) the grip of the steering wheel 82, the predetermined action may be an action for causing the occupant to monitor the surroundings, the occupant to put the foot on the driving operation element 80 so that the occupant to operate the driving operation element 80 (for example, the accelerator pedal and the brake pedal), or the like.

First, the HMI control unit 120 determines whether or not the driving support is ended (step S600). In a case where the driving support is ended, the HMI control unit 120 displays the image for rushing the occupant to grip the steering wheel 82 (for example, the screen IM3-10) in a state in which the image indicating the trajectory on through which the subject vehicle M travels is maintained on the first display unit 450 (step S602).

Next, the HMI control unit 120 determines whether or not the occupant grips the steering wheel 82 within a first predetermined time by the determination result of the operation element state determination unit 130 (step S604).

In a case where it is determined that the occupant grips the steering wheel 82 within the first predetermined time, the HMI control unit 120 displays a first screen IM1 on the first display unit 450 (step S606) and displays a second screen IM2 on the HUD 460 (step S608).

In step S604, in a case where it is not determined that the occupant grips the steering wheel 82 within the first predetermined time, the HMI control unit 120 displays the image for requesting the occupant to grip the steering wheel 82 (for example, the screen IM3-11) on the first display unit 450 instead of an icon indicting the trajectory through which the subject vehicle M travels (step S610).

Next, the HMI control unit 120 determines whether or not the occupant grips the steering wheel 82 within a second predetermined time by the determination result of the operation element state determination unit 130 (step S612). In a case where it is determined that the occupant grips the steering wheel 82 within the second predetermined time, the HMI control unit 120 displays the first screen IM1 on the first display unit 450 (step S606) and displays the second screen IM2 on the HUD 460 (step S608).

In step S612, in a case where it is not determined that the occupant grips the steering wheel 82 within the second predetermined time, the HMI control unit 120 displays the image indicating that the driving support is ended (for example, the third screen IM3-12) on the first display unit 450 (step S614). At this time, the HMI control unit 120 operates the vibration unit 484 that vibrates the seat belt 482A. In the embodiment, the seat 480 may be provided with a vibration unit that vibrates the seat 480. In this case, in a case where it is not determined that the occupant grips the steering wheel 82 within the second predetermined time, the HMI control unit 120 may operate the vibration unit provided in the seat 480.

Next, the HMI control unit 120 determines whether or not the occupant grips the steering wheel 82 within a third predetermined time by the determination result of the operation element state determination unit 130 (step S616). In a case where it is determined that the occupant grips the steering wheel 82 within the third predetermined time, the HMI control unit 120 displays the first screen IM1 on the first display unit 450 (step S606) and displays the second screen IM2 on the HUD 460 (step S608).

In step S616, in a case where it is not determined that the occupant grips the steering wheel 82 within the third predetermined time, the HMI control unit 120 displays the image indicating that the emergency stop of the subject vehicle M is executed on the first display unit 450 (step S618). Therefore, the process of the present flowchart is ended.

<Switching Timing of Various Pieces of Equipment or Control Related to Driving Support>

Figure 37:
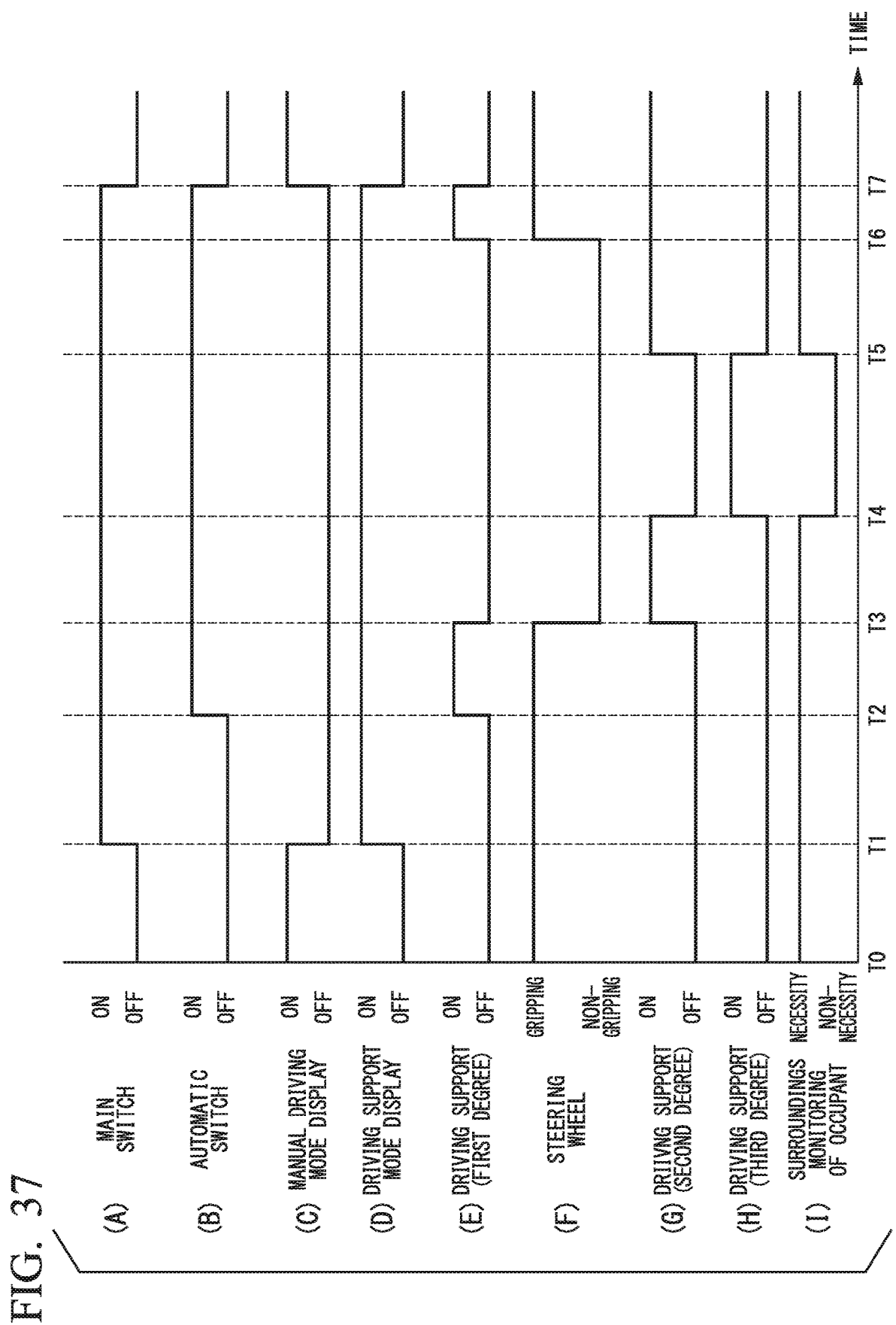
FIG. 37 is a diagram illustrating a switching timing of various pieces of equipment or control related to the driving support.

Here, the switching timing of the various pieces of equipment or the control related to the driving support of the subject vehicle M will be described with reference to the drawings. FIG. 37 is a diagram illustrating the switching timing of the various pieces of equipment or the control related to the driving support.

In FIG. 37, regarding the switching related to the driving support, the switching timings with respect to (A) turning on/off the main switch 412, (B) on/off of the automatic switch 414, (C) on/off of a manual driving mode display, (D) on/off a driving support mode display, (E) on/off of the driving support of the first degree, (F) gripping/non-gripping the steering wheel 82, (G) on/off of the driving support of the second degree, (H) on/off of the driving support of the third degree, and (I) the elapse of time of necessity/non-necessity for the driving monitoring of the occupant are shown.

At time T0, the subject vehicle M is traveling by the manual driving of the occupant. In this case, the main switch 412 and the automatic switch 414 are not operated, and the screens (the first screen IM1 and the second screen IM2) of the manual driving mode are displayed on the first display unit 450 and the HUD 460. At time T0, the driving support (the first degree to the third degree) for the subject vehicle M is not implemented, and the occupant needs to grip the steering wheel 82 and perform the surroundings monitoring.

At time T1, an operation of turning on the main switch 412 is being executed by the occupant. In this case, the screens (the third screen IM3 and the fourth screen IM4) of the driving support mode are displayed on the first display unit 450 and the HUD 460. In a state during the time T1 to T2, the driving control of the driving support is not performed and manual driving is continued.

At time T2, an operation of turning on the automatic switch 414 is being executed by the occupant. In this case, the master control unit 100 causes the driving support control unit 200 to execute the driving support of the first degree. The HMI control unit 120 displays the image indicating that the driving support of the second degree is executed by the occupant separating the hand of the occupant from the steering wheel 82 in a driving support mode display.

At time T3, the occupant is separating the hand from the steering wheel 82 in a state in which the driving support of the second degree is possible by the subject vehicle M. In this case, the switching control unit 110 executes the driving support of the second degree by the automatic driving control unit 300 from the driving support of the first degree by the driving support control unit 200.

At time T4, for example, the driving support of the third degree is executed by the subject vehicle M performing the low speed following travel. In this case, the surroundings monitoring of the occupant is not requested.

At time T5, the driving support of the third degree is ended and the driving support is switched to the driving support of the second degree. Therefore, the surroundings monitoring of the occupant is requested. At the time T5, a display for switching the subject vehicle M from the driving support of the second degree to the manual driving is performed. In this case, in the driving support mode display, the HMI control unit 120 displays the information for causing the occupant to grip the steering wheel 82.

At time T6, the occupant grips the steering wheel 82. In this case, the switching control unit 110 switches the driving support from the driving support of the second degree by the automatic driving control unit 300 to the driving support of the first degree by the driving support control unit 200. The switching control unit 110 switches the subject vehicle M to the manual driving after a predetermined time has elapsed since the driving support of the first degree.

At time T7, the subject vehicle M is switched to the manual driving. In this case, the main switch 412 and the automatic switch 414 are switched off at a time corresponding to when the subject vehicle M is switched to manual driving.

Figure 38:
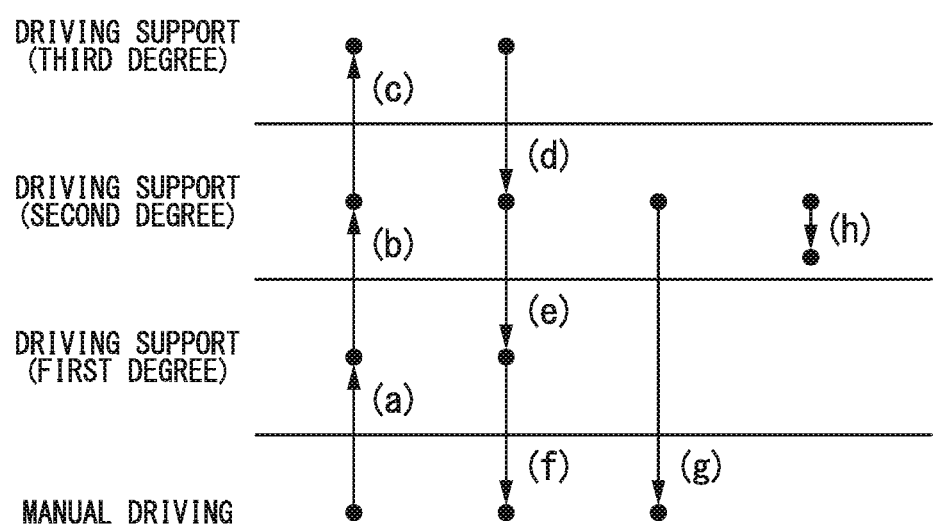
FIG. 38 is a diagram illustrating switching control of the driving support in the embodiment.

Next, the switch process of the driving support in the embodiment will be described. FIG. 38 is a diagram illustrating the switching control of the driving support in the embodiment. The driving control of the subject vehicle M according to the embodiment includes driving control according to the driving support of the first to third degrees and a driving control by the manual driving of the occupant. For example, the switching control unit 110 may switch the driving control according to a switching pattern shown in of FIG. 38(*a*) to (*h*), on the basis of a traveling state of the subject vehicle M and a state of the occupant.

In the switch pattern (a), the switching control unit 110 switches the driving control of the subject vehicle M from the manual driving to the driving support of the first degree. In this case, the switching control unit 110 causes the driving support control unit 200 to execute the driving support of the first degree.

In the switch pattern (b), the switching control unit 110 switches the driving control from the driving support of the first degree to the driving support of the second degree. In this case, the switching control unit 110 causes the automatic driving control unit 300 to execute the driving support of the second degree.

In the switch pattern (c), the switching control unit 110 switches the driving control from the driving support of the second degree to the driving support of the third degree. In this case, the switching control unit 110 causes the automatic driving control unit 300 to execute the driving support of the third degree.

In the switch pattern (d), the switching control unit 110 switches the driving control from the driving support of the third degree to the driving support of the second degree. In this case, the switching control unit 110 causes the automatic driving control unit 300 to execute the driving support of the second degree.

In the switch pattern (e), the switching control unit 110 switches the driving control from the driving support of the second degree to the driving support of the first degree. In this case, the switching control unit 110 causes the driving support control unit 200 to execute the driving support of the first degree.

In the switch pattern (f), the switching control unit 110 switches the driving control from the driving support of the first degree to the manual driving. In this case, the switching control unit 110 causes the subject vehicle M to execute the driving control by the manual driving.

In the switch pattern (g), in a case where a predetermined event occurs in the subject vehicle M while executing the driving support of the second degree, the switching control unit 110 switches the driving control from the driving support of the second degree to the manual driving. For example, the predetermined event is a case where a value received by the automatic driving control unit 300 is different from a value in a predetermined range, a case where a signal from another piece of equipment is blocked, or a case where it is not possible to transmit a signal to control target equipment.

In the switch pattern (h), in a case where the occupant is gripping the steering wheel 82 in a specific scene, the switching control unit 110 causes the automatic driving control unit 300 to continue the driving support of the second degree. For example, the specific scene is a scene in which the subject vehicle M travels through lights (a communication path) such as an interchange or a junction. The switching control unit 110 switches the driving control of the subject vehicle M corresponding to each of the switch patterns.

According to the embodiments described above, the vehicle system 1 includes a control unit that switches between a plurality of driving support modes including a low speed following travel mode in which the subject vehicle travels by following the preceding traveling vehicle at a speed lower than a predetermined speed and executes the driving support, and the HMI control unit 120 that releases the use restriction on the specific function in which a line of sight of the driver is removed from the vehicle surroundings due to a use in a case where the low speed following travel mode is being executed by the control unit. Therefore, it is possible to control more appropriately a function of predetermined equipment.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control system comprising:
a controller configured to support driving of a vehicle by selectively operating in one driving support mode among a plurality of driving support modes including a low speed following travel mode in which the vehicle travels while maintaining a constant inter-vehicle distance between a preceding traveling vehicle that is present in front of the vehicle and the vehicle in a case where a speed of the vehicle is equal to or less than a predetermined speed, wherein the preceding traveling vehicle being a vehicle that is present within a predetermined distance from the vehicle,
a grip sensor provided in a steering wheel of the vehicle and configured to detect whether or not the steering wheel is being gripped by a driver of the vehicle, and
an equipment controller configured to release a use restriction on a specific function in which a line of sight of the driver is removed from surroundings of the vehicle due to its utilization by an occupant of the vehicle in a case where the controller operates in the low speed following travel mode, and not to release the use restriction on the specific function in a case where the vehicle is travelling by a travel mode different to the low speed following travel mode,
wherein the controller is configured to maintain the different travel mode in a case where the grip sensor detects that the steering wheel is being gripped by the driver,
in a case that a condition for operating the low speed following travel mode is not satisfied when the controller operates in the low speed following travel mode, the equipment controller conducts the use restriction on a specific function to display information indicating that the low speed following travel mode is ended and information for requesting the occupant to monitor a traffic situation of the surroundings in a display that is provided in a front of a seat occupied by the driver, wherein the display is presented in an instrument panel.

2. The vehicle control system of claim 1,
wherein the specific function is a video phone function.

3. The vehicle control system of claim 2, further comprising:
a display unit; and
a speaker,
wherein, in a case where the controller is being operated in the low speed following travel mode in a state in which the video phone function is used as the specific function, the equipment controller displays a display of an image of a call counterpart of the video phone function on the display unit, in a case where the controller stops operating in the low speed following travel mode in a state in which the video phone function is used as the specific function, the equipment controller stops a display of an image of the call counterpart of the video phone function on the display unit and continues outputting speech of the call counterpart with the speaker.

4. The vehicle control system of claim 3,
wherein, after stopping the display of the image of the call counterpart on the display unit, in a case where the driving support mode is switched from a state in which operation is not in the low speed following travel mode to the state in which operation is in the low speed following travel mode, the equipment controller displays the image of the call counterpart of which the display was stopped on the display unit again.

5. The vehicle control system of claim 2, further comprising:
an imaging unit configured to image the occupant;
wherein an image captured by the imaging unit is used in the video phone and in monitoring a state of the occupant by an occupant state monitoring controller that monitors the state of the occupant.

6. A vehicle control method that causes an in-vehicle computer to:
support a driving of a vehicle by selectively operating in one driving support mode among a plurality of driving support modes including a low speed following travel mode in which the vehicle travels while maintaining a constant inter-vehicle distance between a preceding traveling vehicle that is present in front of the vehicle and the vehicle in a case where a speed of the vehicle is equal to or less than a predetermined speed, wherein the preceding traveling vehicle being a vehicle that is present within a predetermined distance from the vehicle,
use a grip sensor provided in a steering wheel of the vehicle and configured to detect whether or not the steering wheel is being gripped by a driver of the vehicle, and
release a use restriction on a specific function in which a line of sight of the driver is removed from surroundings of the vehicle due to its utilization by an occupant of the vehicle in a case where the low speed following travel mode is operative, and not release the use restriction on the specific function in a case where the vehicle is traveling by a travel mode different to the low speed following travel mode,
wherein in a case where the grip sensor detects that the steering wheel is being gripped, the in-vehicle computer maintains the different travel mode, and wherein
in a case that a condition for operating the low speed following travel mode is not satisfied when operating in the low speed following travel mode, conducting the use restriction on a specific function to display information indicating that the low speed following travel mode is ended and information for requesting the occupant to monitor a traffic situation of the surroundings in a display that is provided in a front of a seat occupied by the driver, wherein the display is presented in an instrument panel.

7. A non-transitory storage medium storing a program that causes an in-vehicle computer to:
support a driving of a vehicle by selectively operating in one driving support mode among a plurality of driving support modes including a low speed following travel mode in which the vehicle travels while maintaining a constant inter-vehicle distance between a preceding traveling vehicle that is present in front of the vehicle and the vehicle in a case where a speed of the vehicle is equal to or less than a predetermined speed, wherein the preceding traveling vehicle being a vehicle that is present within a predetermined distance from the vehicle, use a grip sensor provided in a steering wheel of the vehicle and configured to detect whether or not the steering wheel is being gripped by a driver of the vehicle, and release a use restriction on a specific function in which a line of sight of the driver is removed from surroundings of the vehicle due to its utilization by an occupant of the vehicle in a case where the low speed following travel mode is operative, and not release the use restriction on the specific function in a case where the vehicle is traveling by a travel mode different to the low speed following travel mode, wherein in a case where the grip sensor detects that the steering wheel is being gripped, the in-vehicle computer maintains the different travel mode, and wherein in a case that a condition for operating the low speed following travel mode is not satisfied when operating in the low speed following travel mode, conducting the use restriction on a specific function to display information indicating that the low speed following travel mode is ended and information for requesting the occupant to monitor a traffic situation of the surroundings in a display that is provided in a front of a seat occupied by the driver, wherein the display is presented in an instrument panel.

8. The vehicle control system of claim 1, wherein the plurality of driving support modes include a low speed following travel mode and an assist mode, the assist mode is that the vehicle travels at the predetermined speed in a case where a condition for operating the low speed following travel mode is not satisfied and there is not a preceding traveling vehicle that is present in front of the vehicle or the assist mode is that the vehicle travels while maintaining a constant inter-vehicle distance between the preceding traveling vehicle and the vehicle in a case where the condition for operating the low speed following travel mode is not satisfied, the equipment controller configured not to release the use restriction on the specific function in a case where the vehicle travels by the assist mode.

9. The vehicle control system of claim 8, wherein in a case where the controller operates in the assist mode, the vehicle is configured to travel at a speed higher than the predetermined speed.

10. The vehicle control system of claim 8, wherein the low speed following travel mode is a mode in which the occupant is not obligated to monitor the surroundings of the vehicle, and the assist mode is a mode in which the occupant is obligated to monitor the surroundings of the vehicle.

11. The vehicle control system of claim 8, wherein in a case where the controller operates in the assist mode, the equipment controller displays information requesting the occupant monitor the traffic situation of the surroundings in the display, wherein in a case where the controller operates in the low speed following travel mode, the equipment controller does not display information requesting the occupant monitor the traffic situation of the surroundings in the display.

* * * * *